United States Patent
Fox et al.

(10) Patent No.: US 11,064,363 B2
(45) Date of Patent: Jul. 13, 2021

(54) SYSTEMS AND METHODS FOR CYBER-PHYSICAL VEHICLE MANAGEMENT, DETECTION AND CONTROL

(71) Applicant: WHITEFOX DEFENSE TECHNOLOGIES, INC., San Luis Obispo, CA (US)

(72) Inventors: Luke Richard Fox, Sacramento, CA (US); Bruce Edward Debruhl, II, Arroyo Grande, CA (US); Zachary N. J. Peterson, San Luis Obispo, CA (US); Clark Savage Turner, Arroyo Grande, CA (US)

(73) Assignee: WhiteFox Defense Technologies, Inc., San Luis Obispo, CA (US)

( * ) Notice: Subject to any disclaimer, the term of this patent is extended or adjusted under 35 U.S.C. 154(b) by 3 days.

(21) Appl. No.: 15/729,550

(22) Filed: Oct. 10, 2017

(65) Prior Publication Data
US 2018/0103036 A1 Apr. 12, 2018

Related U.S. Application Data

(60) Provisional application No. 62/406,834, filed on Oct. 11, 2016.

(51) Int. Cl.
*H04W 12/80* (2021.01)
*H04L 29/06* (2006.01)
(Continued)

(52) U.S. Cl.
CPC ........... *H04W 12/80* (2021.01); *B64C 39/024* (2013.01); *F42B 12/44* (2013.01); *F42B 12/46* (2013.01);
(Continued)

(58) Field of Classification Search
CPC ............ H04L 63/0876; H04L 63/1443; H04L 67/125; H04W 12/007; H04W 12/08;
(Continued)

(56) References Cited

U.S. PATENT DOCUMENTS

| 5,955,992 A | 9/1999 | Shattil |
| 6,331,837 B1 | 12/2001 | Shattil |

(Continued)

FOREIGN PATENT DOCUMENTS

| AU | 762685 | 8/1999 |
| CA | 2321748 | 8/1999 |

(Continued)

OTHER PUBLICATIONS

US 9,690,294 B2, 06/2017, Nevdahs (withdrawn)
(Continued)

*Primary Examiner* — Robert B Leung
(74) *Attorney, Agent, or Firm* — Fitch, Even, Tabin & Flanery LLP

(57) ABSTRACT

A cyber-physical vehicle management system may allow for highly reliable and authentic identity management of cyber-physical systems, unforgeable legal interception devices, and robust relay nodes. A cyber-physical vehicle management system may also provide for human and object bi-directional authenticity verification. In some cases, a cyber physical management system may enable a cyber physical vehicle (CPV) detection and intervention system which may be capable or detection, identification, capture, seizure, and immobilization of CPVs. In some embodiments the CPV detection and intervention system includes a geocoding laser subsystem for determining a location of a CPV.

24 Claims, 37 Drawing Sheets

(51) Int. Cl.
*H04K 3/00* (2006.01)
*H04L 29/08* (2006.01)
*F42B 12/46* (2006.01)
*F42B 12/44* (2006.01)
*B64C 39/02* (2006.01)
*G06F 16/245* (2019.01)
*H04W 4/40* (2018.01)
*H04W 12/069* (2021.01)
*F41H 11/02* (2006.01)
*H04W 12/08* (2021.01)
*H04W 12/03* (2021.01)

(52) U.S. Cl.
CPC ............ *G06F 16/245* (2019.01); *H04K 3/00* (2013.01); *H04K 3/45* (2013.01); *H04K 3/65* (2013.01); *H04K 3/92* (2013.01); *H04L 63/0876* (2013.01); *H04L 63/304* (2013.01); *H04L 67/125* (2013.01); *H04W 4/40* (2018.02); *H04W 12/069* (2021.01); *B64C 2201/042* (2013.01); *B64C 2201/146* (2013.01); *F41H 11/02* (2013.01); *H04K 2203/22* (2013.01); *H04L 63/0823* (2013.01); *H04L 63/101* (2013.01); *H04W 12/03* (2021.01); *H04W 12/08* (2013.01)

(58) Field of Classification Search
CPC .. H04K 3/00; H04K 3/45; H04K 3/92; H04K 3/65; B64C 39/024; B64C 2201/146; B64C 2201/042
See application file for complete search history.

(56) References Cited

U.S. PATENT DOCUMENTS

| | | | |
|---|---|---|---|
| 6,686,879 B2 | 2/2004 | Shattil | |
| 6,882,868 B1 | 4/2005 | Shattil | |
| 6,888,887 B1 | 5/2005 | Shattil | |
| 7,010,048 B1 | 3/2006 | Shattil | |
| 7,076,168 B1 | 7/2006 | Shattil | |
| 7,092,352 B2 | 8/2006 | Shattil | |
| 7,286,604 B2 | 10/2007 | Shattil | |
| 7,317,750 B2 | 1/2008 | Shattil | |
| 7,406,261 B2 | 7/2008 | Shattil | |
| 7,418,043 B2 | 8/2008 | Shattil | |
| 7,430,257 B1 | 9/2008 | Shattil | |
| 7,593,449 B2 | 9/2009 | Shattil | |
| 7,606,137 B2 | 10/2009 | Shattil | |
| 7,639,597 B2 | 12/2009 | Shattil | |
| 7,787,514 B2 | 8/2010 | Shattil | |
| 7,835,455 B2 | 11/2010 | Shattil | |
| 7,839,941 B2 | 11/2010 | Shattil | |
| 7,961,076 B2 | 6/2011 | Kelley | |
| 7,965,761 B2 | 6/2011 | Shattil | |
| 8,098,751 B2 | 1/2012 | Shattil | |
| 8,254,847 B2 | 8/2012 | Sen | |
| 8,582,775 B2 | 11/2013 | Peirce | |
| 8,670,390 B2 | 3/2014 | Shattil | |
| 8,750,264 B2 | 6/2014 | Shatti | |
| 8,929,550 B2 | 1/2015 | Shattil | |
| 8,942,082 B2 | 1/2015 | Shattil | |
| 9,042,333 B2 | 5/2015 | Shattil | |
| 9,048,897 B2 | 6/2015 | Shattil | |
| 9,136,931 B2 | 9/2015 | Shattil | |
| 9,225,471 B2 | 12/2015 | Shattil | |
| 9,270,421 B2 | 2/2016 | Shattil | |
| 9,275,645 B2 | 3/2016 | Hearing | |
| 9,325,805 B2 | 4/2016 | Shattil | |
| 9,359,074 B2 | 6/2016 | Ganesh | |
| 9,412,278 B1 | 8/2016 | Gong | |
| 9,473,226 B2 | 10/2016 | Shattil | |
| 9,485,063 B2 | 11/2016 | Shattil | |
| 9,529,360 B1 | 12/2016 | Melamed | |
| 9,628,231 B2 | 4/2017 | Shattil | |
| 9,646,502 B1 | 5/2017 | Gentry | |
| 9,673,920 B2 | 6/2017 | Sen | |
| 9,688,244 B2 | 6/2017 | Martin | |
| 9,689,976 B2 | 6/2017 | Parker | |
| 9,714,088 B2 | 7/2017 | Canavor | |
| 9,715,009 B1 | 7/2017 | Parker | |
| 9,715,235 B2 | 7/2017 | McGrew | |
| 9,768,842 B2 | 9/2017 | Shattil | |
| 9,774,505 B2 | 9/2017 | Shattil | |
| 9,798,329 B2 | 10/2017 | Shattil | |
| 9,800,448 B1 | 10/2017 | Shattil | |
| 9,806,953 B2 | 10/2017 | Shattil | |
| 9,819,449 B2 | 11/2017 | Shattil | |
| 9,844,061 B2 | 12/2017 | Shattil | |
| 9,858,822 B1 | 1/2018 | Gentry | |
| 9,893,774 B2 | 2/2018 | Shattil | |
| 9,936,514 B2 | 4/2018 | Shattil | |
| 9,967,007 B2 | 5/2018 | Shattil | |
| 9,977,117 B2 | 5/2018 | Parker | |
| 9,996,079 B2 | 6/2018 | Magy | |
| 10,009,208 B1 | 6/2018 | Shattil | |
| 10,014,882 B2 | 7/2018 | Sen | |
| 10,015,034 B1 | 7/2018 | Shattil | |
| 10,015,801 B2 | 7/2018 | Shattil | |
| 10,021,175 B2 | 7/2018 | Shattil | |
| 10,038,584 B1 | 7/2018 | Shattil | |
| 10,051,475 B2 | 8/2018 | Shattil | |
| 10,059,445 B2 | 8/2018 | Meinhart | |
| 10,064,203 B2 | 8/2018 | Shattil | |
| 10,122,694 B2 | 11/2018 | Shattil | |
| 10,142,082 B1 | 11/2018 | Shattil | |
| 10,156,631 B2 | 12/2018 | Parker | |
| 10,158,617 B2 | 12/2018 | Shattil | |
| 10,200,227 B2 | 2/2019 | Shattil | |
| 10,203,559 B2 | 2/2019 | Jia | |
| 10,211,892 B2 | 2/2019 | Shattil | |
| 10,211,932 B2 | 2/2019 | Shattil | |
| 10,249,202 B1 * | 4/2019 | Passe | G08G 5/006 |
| 2002/0034191 A1 | 3/2002 | Shattil | |
| 2003/0147655 A1 | 8/2003 | Shattil | |
| 2004/0086027 A1 | 5/2004 | Shattil | |
| 2004/0100897 A1 | 5/2004 | Shattil | |
| 2004/0141548 A1 | 7/2004 | Shattil | |
| 2004/0210757 A1 | 10/2004 | Kogan | |
| 2004/0213351 A1 | 10/2004 | Shattil | |
| 2005/0232182 A1 | 10/2005 | Shattil | |
| 2006/0227851 A1 | 10/2006 | Shattil | |
| 2007/0025421 A1 | 2/2007 | Shattil | |
| 2007/0211786 A1 | 9/2007 | Shattil | |
| 2008/0075033 A1 | 3/2008 | Shattil | |
| 2008/0261509 A1 | 10/2008 | Sen | |
| 2008/0310484 A1 | 12/2008 | Shattil | |
| 2009/0110033 A1 | 4/2009 | Shattil | |
| 2009/0310586 A1 | 12/2009 | Shatti | |
| 2011/0213879 A1 | 9/2011 | King | |
| 2011/0214059 A1 | 9/2011 | King | |
| 2011/0214061 A1 | 9/2011 | King | |
| 2011/0292976 A1 | 12/2011 | Sen | |
| 2012/0130632 A1 * | 5/2012 | Bandyopadhyay | G01C 17/38 701/446 |
| 2012/0322360 A1 | 12/2012 | Sen | |
| 2014/0098685 A1 | 4/2014 | Shattil | |
| 2014/0140188 A1 | 5/2014 | Shattil | |
| 2014/0140189 A1 | 5/2014 | Shattil | |
| 2014/0146916 A1 | 5/2014 | Shattil | |
| 2014/0146924 A1 | 5/2014 | Shattil | |
| 2014/0219449 A1 | 8/2014 | Shattil | |
| 2014/0241296 A1 | 8/2014 | Shattil | |
| 2014/0247895 A1 | 9/2014 | Shattil | |
| 2015/0009945 A1 | 1/2015 | Shattil | |
| 2015/0023202 A1 | 1/2015 | Shattil | |
| 2015/0244430 A1 | 8/2015 | Shattil | |
| 2015/0263835 A1 | 9/2015 | Shattil | |
| 2015/0270882 A1 | 9/2015 | Shattil | |
| 2015/0302858 A1 | 10/2015 | Hearing | |
| 2015/0303950 A1 | 10/2015 | Shattil | |
| 2015/0323286 A1 * | 11/2015 | Theriault | F41G 3/00 42/111 |

(56) References Cited

U.S. PATENT DOCUMENTS

| | | | |
|---|---|---|---|
| 2015/0350228 A1 | 12/2015 | Baxley | |
| 2016/0094318 A1 | 3/2016 | Shattil | |
| 2016/0094989 A1 | 3/2016 | Shattil | |
| 2016/0119044 A1 | 4/2016 | Shattil | |
| 2016/0140851 A1 | 5/2016 | Levy | |
| 2016/0171896 A1 | 6/2016 | Buchmueller | |
| 2016/0187882 A1 | 6/2016 | Downey | |
| 2016/0196753 A1* | 7/2016 | Jarrell | G08G 5/0069 701/16 |
| 2016/0204990 A1 | 7/2016 | Shattil | |
| 2016/0205016 A1 | 7/2016 | Shattil | |
| 2016/0225264 A1 | 8/2016 | Taveira | |
| 2016/0226892 A1 | 8/2016 | Sen | |
| 2016/0244161 A1* | 8/2016 | McClure | B64C 39/024 |
| 2016/0247405 A1 | 8/2016 | Paczan | |
| 2016/0247407 A1 | 8/2016 | Paczan | |
| 2016/0254889 A1 | 9/2016 | Shattil | |
| 2016/0255140 A1 | 9/2016 | Shattil | |
| 2016/0274578 A1 | 9/2016 | Arwine | |
| 2016/0288905 A1 | 10/2016 | Gong | |
| 2016/0292403 A1 | 10/2016 | Gong | |
| 2016/0292696 A1 | 10/2016 | Gong | |
| 2016/0304217 A1* | 10/2016 | Fisher | B64C 39/024 |
| 2016/0327959 A1 | 11/2016 | Brown | |
| 2017/0024746 A1 | 1/2017 | Putnam | |
| 2017/0026218 A1 | 1/2017 | Shattil | |
| 2017/0034835 A1 | 2/2017 | Shattil | |
| 2017/0039413 A1 | 2/2017 | Nadler | |
| 2017/0039857 A1* | 2/2017 | Kwan | G05D 1/101 |
| 2017/0054480 A1 | 2/2017 | Shattil | |
| 2017/0094527 A1* | 3/2017 | Shattil | H04L 43/18 |
| 2017/0099658 A1 | 4/2017 | Shattil | |
| 2017/0103659 A1* | 4/2017 | Jin | G08G 5/006 |
| 2017/0126458 A1 | 5/2017 | Shattil | |
| 2017/0142135 A1 | 5/2017 | Shattil | |
| 2017/0170972 A1 | 6/2017 | Wu | |
| 2017/0235316 A1 | 8/2017 | Shattil | |
| 2017/0237520 A1* | 8/2017 | Morrow | H04K 3/65 455/1 |
| 2017/0272182 A1 | 9/2017 | Sen | |
| 2017/0279506 A1 | 9/2017 | Shattil | |
| 2017/0285142 A1 | 10/2017 | Parker | |
| 2017/0356726 A1* | 12/2017 | Theiss | F41H 13/0006 |
| 2018/0039287 A1 | 2/2018 | Shattil | |
| 2018/0068567 A1* | 3/2018 | Gong | G08G 5/0078 |
| 2018/0081355 A1* | 3/2018 | Magy | F41H 13/00 |
| 2018/0091908 A1* | 3/2018 | Goel | G08G 5/0082 |
| 2018/0103036 A1 | 4/2018 | Fox | |
| 2018/0103481 A1 | 4/2018 | Shattil | |
| 2018/0234986 A1 | 8/2018 | Shattil | |
| 2018/0262241 A1 | 9/2018 | Shattil | |
| 2018/0310319 A1 | 10/2018 | Shattil | |
| 2018/0313945 A1 | 11/2018 | Parker | |
| 2018/0331732 A1 | 11/2018 | Shattil | |
| 2019/0007105 A1 | 1/2019 | Kimura | |
| 2019/0075091 A1 | 3/2019 | Shattil | |
| 2019/0086938 A1 | 3/2019 | Shattil | |

FOREIGN PATENT DOCUMENTS

| | | | |
|---|---|---|---|
| CN | 1296684 | 5/2001 | |
| CN | 104980210 | 6/2015 | |
| CN | 104994112 | 7/2015 | |
| CN | 105491564 | 11/2015 | |
| CN | 105898741 | 3/2016 | |
| CN | 106385277 | 8/2016 | |
| CN | 105929417 | 9/2016 | |
| CN | 106019264 | 10/2016 | |
| CN | 107004177 | 11/2016 | |
| CN | 106382856 | 2/2017 | |
| CN | 106461396 | 2/2017 | |
| CN | 108349589 | 7/2018 | |
| CN | 108353081 | 7/2018 | |
| DE | 69926343 | 6/2006 | |
| EA | 002914 | 10/2001 | |
| EP | 3234633 | 10/2017 | |
| GB | 2546353 | 7/2017 | |
| GB | 2546438 | 7/2017 | |
| JP | 2018532351 | 11/2018 | |
| JP | 2018534526 | 11/2018 | |
| JP | 2018535351 | 11/2018 | |
| KR | 1020070054049 | 5/2007 | |
| KR | 100734448 | 7/2007 | |
| KR | 20180049154 | 5/2018 | |
| WO | WO 2016/154940 | * 3/2015 | |
| WO | 2016122739 | 8/2016 | |
| WO | 2016154940 | 10/2016 | |
| WO | 2016184563 | 11/2016 | |
| WO | 2017019595 | 2/2017 | |
| WO | 2017044446 | 3/2017 | |
| WO | 2017058966 | 4/2017 | |
| WO | 2018126059 | 7/2018 | |
| WO | 2019023283 | 1/2019 | |

OTHER PUBLICATIONS

US 9,711,054 B2, 07/2017, Gong (withdrawn)

Laros, Shane, "5 Ways to kill Drones" engineering.com, Jun. 25, 2016, https://www.engineering.com/DesignerEdge/DesignerEdgeArticles/ArticleID/12505/5-Ways-to-Kill-Drones.aspx (Year: 2016).*

PCT; International Search Report and Written Opinion of the International Searching Authority for PCT/US2017/055976 dated Jan. 23, 2018.

Bian et al; "A Secure Communication Framework for Large-Scale Unmanned Aircraft Systems"; Integrated Communications, Navigation and Surveillance Conference (ICNS), 2013; IEEE, 2013; 12 pages.

Black; "Over Your Head, Under the Radar: An Examination of Changing Legislation, Aging Case Law, and Possible Solutions to the Domestic Police Drone Puzzle"; Wash. & Lee L. Rev 70; 2013; pp. 1829-1885.

Clarke et al.; "The Regulation of Civilian Drones' Impacts on Public Safety"; Computer Law & Security Review 30,3; Jun. 2014; pp. 263-285.

Clarke; "Appropriate Regulatory Responses to the Drone Epidemic"; Computer Law & Security Review 32,1; Jan.-Feb. 2016; pp. 152-155.

Clarke; "The Regulation of the Impact of Civilian Drones on Behavioural Policy"; Computer Law & Security Review 30,3; Jun. 2014; pp. 286-305.

Clarke; "What Drones Inherit from Their Ancestors"; Computer Law & Security Review 30, 3; Jun. 2014; pp. 247-262.

Goodin; "There's a New Way to Take Down Drones, and it Doesn't Involve Shotguns"; ArsTechnica; Oct. 26, 2016; 6 pages.

Horsman; "Unmanned Aerial Vehicles: A Preliminary Analysis of Forensic Challenges"; Abstract; ScienceDirect; http://www.sciencedirect.com/science/article/pii/S1742287615001097; 2015; downloaded Sep. 5, 2017.

Khandelwal; "Hacker Hijacks a Police Drone from 2km Away with $40 Kit"; http://thehackernews.com/2016/04/hacking-drone.html; 2016; downloaded Sep. 7, 2017.

Podhradsky et al.; "Improving Communication Security of Open Source UAVs: Encripting Radio Control Link"; Unmanned Aircraft Systems (ICUAS); 2017; 7 pages.

Reed et al; "SkyNET: A 3G-Enabled Mobile Attack Drone and Stealth Botmaster"; USENIX Security Conference; 2011; 9 pages.

Wei; "You Can Hijack Nearly Any Drone Mid-flight Using This Tiny Gadget"; http://thehackernews.com/2016/10/how-to-hack-drone.html; 2016; downloaded Sep. 7, 2017.

Won et al.; "A Secure Communication Protocol for Drones and Smart Objects"; Proceedings of the 10th ACM Symposium on Information, Computer and Communications Security; ACM, 2015; 12 pages.

Fox; U.S. Appl. No. 16/510,501, filed Jul. 12, 2019.
Fox; U.S. Appl. No. 16/565,339, filed Sep. 9, 2019.
Fox; U.S. Appl. No. 16/560,865, filed Sep. 4, 2019.

(56) References Cited

OTHER PUBLICATIONS

PCT; International Search Report and Written Opinion of the International Searching Authority for PCT/US2019/49572 dated Dec. 24, 2019.
Ozmen et al; "Compact Energy and Delay-Aware Authentication"; 2018 IEEE Conference on Communications and Network Security (CNS); May 30-Jun. 1, 2018; 9 pages.
EP; Extended European Search Report issued in EP Application No. 17859432.1 mailed from the European Patent Office dated Apr. 28, 2020.
USPTO; Non-Final Office Action issued in U.S. Appl. No. 16/565,339 dated Oct. 21, 2020.

* cited by examiner ial Application No. 62/406,834, filed Oct. 11, 2016, entitled
SYSTEMS AND METHODS FOR CYBER-PHYSICAL VEHICLE MANAGEMENT, DETECTION AND CONTROL This application claims the benefit of U.S. Provisional Application No. 62/406,834, filed Oct. 11, 2016, entitled SYSTEM AND METHOD TO DETECT, IDENTIFY, CAPTURE, AND SEIZE CONTROL OF WIRELESS REMOTE CONTROLLED DEVICES, AUGMENTED WITH INTEGRATED GEOCODING LASER, which is incorporated in its entirety herein by reference.

BACKGROUND OF THE INVENTION

1. Field of the Invention

The present invention relates generally to managing cyber-physical devices, and more specifically to authentication, authorization and secure communication of cyber-physical resources, as well as detection, identification, capture, seizure, and immobilization of these resources when they engage in unauthorized activity.

2. Discussion of the Related Art

A cyber-physical vehicle (CPV) is a vehicle that operates either autonomously or via remote control. There are many varieties of and uses for unmanned CPV systems (e.g. drones). From personal use (e.g. hobbyists), to professional use (e.g. photography, product delivery, etc.), to scientific research, to law enforcement (e.g. use in unsafe situations, surveillance, and patrol), to their use in military operations. Decreasing cost and rapid improvements in technology continue to open up new and exciting applications. However, as with many rapidly developing technologies, there have been undesirable side effects of the growth in the use CPVs. For example, the use of personal drones may interfere with law enforcement or fire safety operations. Drones may also contribute to violations of privacy, or may cause safety hazards when operated by untrained or reckless operators. Regulation is being considered to provide guidance on the safe and authorized use of autonomous or semi-autonomous cyber-physical systems such as drones. However, limitations in technology, security, and legal precedence hinders the development of a legal framework for enforcing the laws and regulations that are in place or that are being proposed.

Similar licensing and registration regulations are normative in the ownership and operation of nearly all vehicles, including motorcycles, automobiles, boats, and airplanes. Enforcement of these regulations on these types of vehicles is made possible due to the cooperation of manufacturers and retailers, the traceability of their sale, their operators typically being physically near or in the vehicle during operation, and the physical constraints on where and when they can operate (e.g. few cars can drive on the ocean, planes may take off and land at an airport). Drones, however, do not share these same qualities, making enforcement of any regulations extremely challenging.

The strong binding of a licensed operator to a registered drone/CPV is also of importance. Without such binding, the takeover and theft of a drone becomes possible. However, this binding needs to be balanced with the need for a lawful takeover of a drone should it be deemed necessary and authorized (e.g. if a drone is behaving illegally).

Naive or voluntary solutions to licensing the ownership and operation of drones may not be sufficient for real-world situations. For example, circumstances may arise in which an operator may wish to forge a credential, impersonate another operator, or broadcast deceptive data. Similarly, some CPVs may encroach on geographically restricted areas, which may interfere with the operations of law enforcement, emergency response, or other authorized operations.

SUMMARY

Several embodiments of the invention advantageously address the needs above as well as other needs by providing A system for interacting with a radio frequency remote-controlled vehicle, comprising: a battery; at least one computing device including a processor, non-transitory memory and a plurality of applications configured to run on the processor; at least one database subsystem coupled to the computing device; at least one radio receiver coupled to the computing device and configured to select specific radio signals; wherein the system is configured to: scan a radio frequency spectrum; detect a vehicle by receiving radio transmissions involving the vehicle; receive radio transmissions from the vehicle, wherein the radio transmissions include data sent from the vehicle; create a unique identifier for the vehicle using at least a portion of the data; and perform a threat assessment for the vehicle using at least a portion of the data.

In a further embodiment, the invention may be characterized as a method for managing cyber-physical devices, comprising: scanning a radio frequency spectrum; detecting a vehicle by receiving radio transmissions involving the vehicle; receiving radio transmissions from the vehicle, wherein the radio transmissions include data sent from the vehicle; creating a unique identifier for the vehicle using at least a portion of the data; and performing a threat assessment for the vehicle using at least a portion of the data.

DETAILED DESCRIPTION

Figure 1:
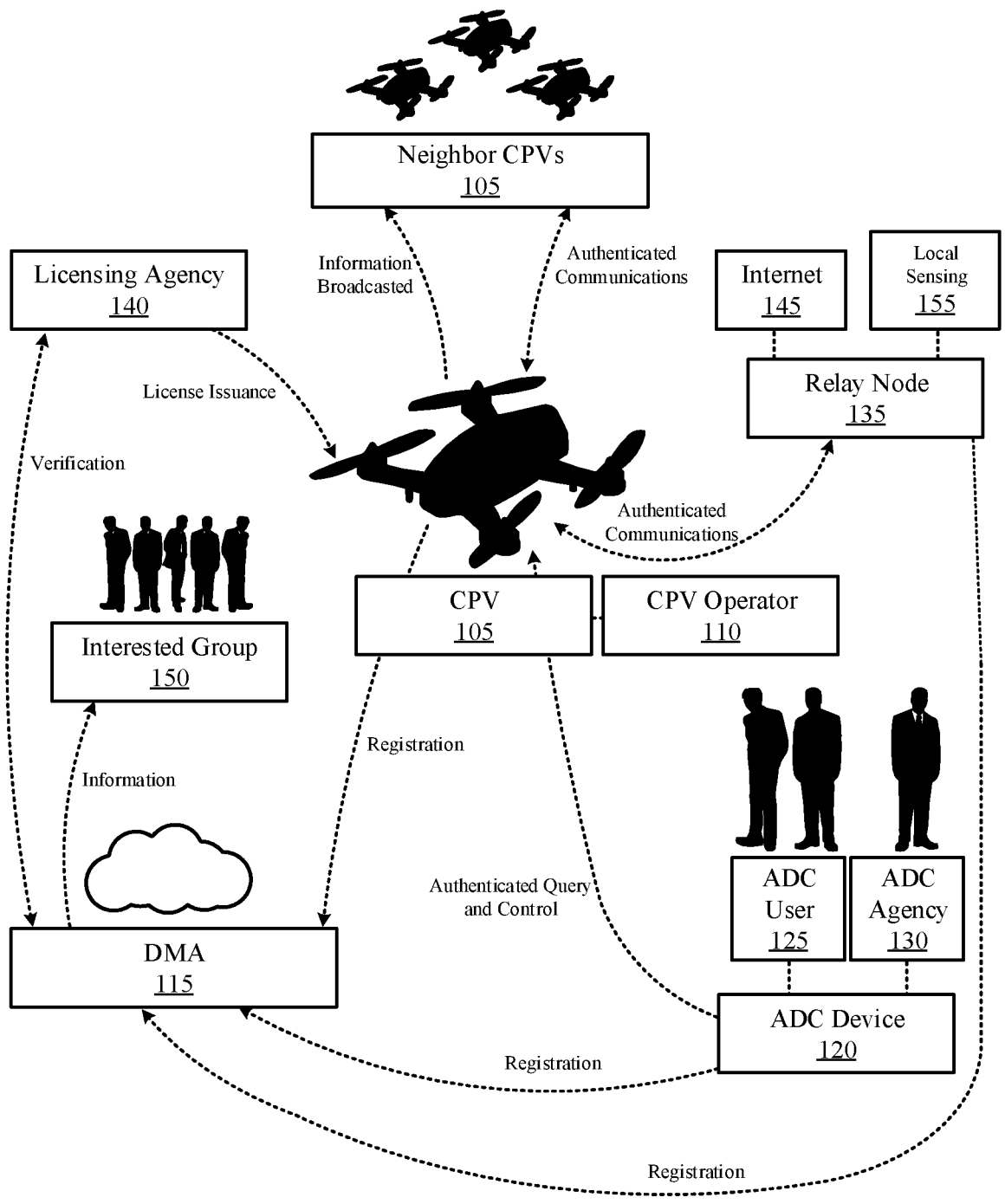
FIGS. 1 and 2 show diagrams of a cyber-physical vehicle management system that supports authentication, authorization and secure communication in accordance with aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Authentication

A cyber-physical vehicle management system may include algorithms, protocols, and a distributed system for supporting public key infrastructure for, and providing novel utility to, the domain of unmanned vehicles, robots, manned vehicles (including airborne vehicles, automotive vehicles, personal mobility devices, and maritime vessels), both autonomous, semi-autonomous, and human-controlled (henceforth collectively known as "drone(s)" or "CPV"(s)). Generally, public-key infrastructure (PKI) is understood to define a set of identities, policies/procedures, and technologies, needed to manage (i.e. create, store, revoke, and distribute) digital certificates useful in encryption, integrity, authentication, and digital signature schemes (such as, but not limited to, Rivest-Shamir-Adleman (RSA), digital signature algorithm (DSA), advanced encryption standard (AES), and data encryption standard (DES)). A cyber-physical vehicle management system may leverage the concepts of PKI to provide a system for the registration, identification, authorization, control, and other functionality of drones (as defined above).

At the core of the system is a drone/CPV management authority (DMA), which is a collection of algorithms, protocols, and systems—as well as the business entity and practices that uses the same—to provide a licensing scheme for drones. The DMA is an authority for managing drone operator licenses (DOLs), which contain identifying information about a drone operator and the drone itself. DOLs are useful for enforcing legal restrictions on operation and ensuring safe movement and operation of drones. In one example, a cyber-physical vehicle management system may be applied to an unmanned aerial system traffic management (UTM) system. However, a cyber-physical vehicle management system may also apply to any cyber-physical vehicular system (which may be generically referred to as "drone(s)" or "CPVs") such as high-value inventory management by robots in a warehouse.

A cyber-physical vehicle management system may enable cryptographically-assured confidentiality and authentic communication channels. To this end, the cyber-physical vehicle management system may utilize cryptographic primitives optimized for constrained devices in constrained environments such as small size, low-power, unguaranteed connectivity, bandwidth-constrained, or low-computational settings. This may prevent drones from being eavesdropped, intercepted, disrupted, or impersonated.

Thus, the cyber-physical vehicle management system may provide services including: legitimate authentication and authorization of CPV movement plans (such as flight plans); application of temporary, permanent, or dynamic geofences; authentication of CPV nodes that seek to communicate with a CPV or other CPV nodes; cryptographically binding together CPV nodes, CPV, and movement plans; and prevention of data snooping to or from a CPV or CPV nodes.

As known in the wart, geofences are designations in space which can be displayed on a visual map. They can either be fixed or dynamic in position and either two dimensional or three dimensional in shape.

Minimally a geofence requires at least two longitude and latitude coordinates to create a circle where one coordinate is the center and the other is a point on the circle. If three or more coordinates are entered, then a polygonal is formed. Additional coordinates can be used to create more complex shapes. At least one altitude can be used to create a defined three dimensional geofence. Otherwise, the geofence is assumed to extend from the ground up into space.

Once the shape (either two or three dimensional) is designated for the geofence, then the positioning of the geofence can be determined. If fixed, then the geofence maintains position without relativity to any points. If dynamic, then the geofence coordinates adjust relative to a single point which could be the location of a mobile sensor. The single point may or may not be within the geofence.

Geofences can have various levels of attributes, such as limitations and permissions required. CPV or CPV behavior that does not abide by these attributes can be managed in a preset manner that is determined by the setting of the geofences. For example, only CPV that are under a certain weight might be able to enter a set geofence. Then if a CPV exceeds this weight, then based on set levels of weight that the CPV is will determine the response how to manage it. An example of CPV behavior is if the CPV is flying too fast in a given geofence, then there will be an appropriate response to this. An example of an attribute for the geofence can also be based on timing such as a geofence that only allows CPV that are rated to operate at night to carry out their movement plans. Response can be passive (e.g. logging) or active (e.g. takeover).

Cyber-physical management techniques may be extensible to larger systems for enforcing the safe and authorized use of autonomous or semi-autonomous cyber-physical systems. This includes unforgeable licensing of vehicles and operators, enforcement of pre-registered flight plans, and, when appropriate, the lawful interception and identification of the CPV.

In some cases, implementation of a cyber-physical vehicle management system may include updating PKI solutions (which include identity attestation, authentication, and revocation) with cryptographic primitives and protocols designed specifically for a distributed and computationally-constrained CPV environment. A cyber-physical vehicle management system may be applicable to a variety of CPV systems including aerial drones and autonomous cars.

Detection/Identification/Capture/Seizure

In some cases, it may be appropriate to gather identification information from a CPV to enforce laws or regulations that may have been violated. For example, local law enforcement may issue citations for violations of law, and if a drone was taken into custody, it must be legally impounded or taken as evidence. There is a therefore a need for uniquely identifying drone information (beyond immediate capture or rerouting of the threat), which can be used to prove a particular drone physically recovered at a crime scene was the intruder drone, i.e. the drone that entered into an area that it shouldn't or did something that it shouldn't have done.

In some cases, a drone may be removed by firing upon it with a weapon or jamming radio control channels. Firing a weapon may create safety risks. For example, debris from a projectile or drone hit could be dangerous to those on the ground. Batteries carried by drones can be highly flammable and even explosive in such situations. Jamming of control channels can affect other radio gear, including gear used by the first responders or support aircraft. Jamming the control channels of an unauthorized drone may have unpredictable effects on the drone's behavior. This may increase the risk of collisions in the air or damages to those on the ground.

A cyber-physical detection and intervention system may provide a low risk, effective, convenient, and field ready solution to the problem of drones intruding into airspace controlled by first responders. The system may also be applicable in other circumstances. A cyber-physical detection and intervention system may offer authorized users an effective, portable, self-contained device that will detect all remote control devices in range; identify them as far as possible for determination of threat status; capture the threatening devices' control channels from the original controllers (with or without their knowledge); and then seize control of the intruders' physical control systems and to visually choose a safe location to send them to and inevitably deactivate them.

Thus, a cyber-physical detection and intervention system may provide for: effective detection of all remote controlled devices in the immediate area and within RF range; identification of CPVs including deriving, recording, and displaying all available information on the individual device under CPV detection and intervention system surveillance; identifying a "whitelist" of devices that are authorized to be part of the mission, eliminating them from "threat" status to prevent CPV detection and intervention system from mistakenly interfering with them; capture of intruder devices that are a threat, taking full and exclusive control of a device from its original controller; ability to choose a location where the device would not be a threat, a target location for its destination and deactivation; use of a detachable, stand-alone subsystem that gives precise position of an object that is merely visually spotted using an optical scope; command and control capability for the threat device's movements in order to direct it to physically move: to the target location for deactivation, to immediately land or otherwise deactivate it in place, to return it to its own point of origination; ability to ensure that the threat does not cause further risks (such as collisions with other objects) when it travels from the high risk area to the target location for deactivation; potential for physical seizure by authorities for further action or prosecution; "anti-tamper self-termination" interlock to ensure the integrity of the system itself: unauthorized tampering with the enclosure results in memory erasure; and methods to perform RF analysis on a raw data stream from a remote controlled device and determine the manufacturer's protocol for encoding and decoding command, control and other telemetry.

FIG. 1 shows a diagram 100 of a cyber-physical vehicle management system that supports authentication, authorization and secure communication in accordance with aspects of the present disclosure. Diagram 100 may include one or more cyber-physical vehicles (CPVs) 105, CPV operator 110, drone management authority (DMA) 115, authoritative drone command (ADC) device 120, ADC user 125, ADC agency 130, relay node 135, licensing agency 140, internet 145, interested groups 150, and local sensing data 155.

A cyber-physical vehicle management system may allow for highly reliable and authentic identity management of cyber-physical systems, unforgeable legal interception devices, and robust relay nodes 135. A cyber-physical vehicle management system may be applied to a system of unmanned aerial vehicles (UAVs) (i.e., an unmanned aerial system traffic management (UTM) system), but it could equally be applied to other autonomous vehicles, automated manufacturing, and other cyber-physical applications. A cyber-physical vehicle management system may provide for human and object bi-directional authenticity verification.

A CPV 105 may be a device such as a UAV or an autonomous car. The CPV 105 may contain computing, sensing, GPS, movement, and communications subsystems. A CPV 105 may also interact with other CPVs 105. A cyber-physical vehicle management system may enable an identity management scheme for authenticated communications between CPVs 105 and other devices. In some cases, a CPV 105 may be an electro-mechanical device intended to move through space under partially or fully automated control.

In some cases, a CPV 105 may be a component of a cyber-physical vehicle system (CPVS). A CPVS may include a CPV 105 and a cyber-physical vehicle node (CPVN) (secondary cyber-physical systems and subsystems that support the functionality and application of the CPV). For example, CPVN might be a weather station one-way communicating to the CPV 105, it may be a remote controller operated by a human that is providing one-way communication for control, or it may be a two-way communication such as the case of an aerial CPV 105 coordinating its flight plan with an automated ground station.

A CPV 105 may communicate with radio signals to other systems such as other CPVs 105 (e.g., in the case of drone swarms). This communication could be to coordinate with each other or simply as one-way communication broadcasting the CPV's existence (and possibly location and other relevant data). CPVs 105 may utilize either one-way receive radio signal communication (e.g. control), one-way send radio signal communication (e.g. data), or two-way send and receive radio signal communication. CPVs 105 may be unmanned in that they lack a human operator within the vehicle (such as drones, remote controlled cars, and bomb disposal robots), but they may have a human controlling them or receiving data from them from afar using radio signals from a CPV 105 node (e.g. a control station, controller, computer).

CPVs 105 may have humans internally acting as either an operator (e.g. an autonomous car like) or as a non-operator (e.g. a sky taxi where the human is an occupant). Radio signals either going to or from the CPV 105 may be detected using a CPV Detector. A CPV detection system may be utilized to control and manage threats such as wirelessly remote-controlled devices, autonomous devices that have a telemetry and control wireless link, drones and robots. The CPV's components, such as the battery in this case, may transmit their own telemetry via a transmitter.

CPV 105 may forward a challenge from an authoritative command device (e.g. ADC device 505) to a drone/CPV operator controller; prepare a cryptographic drone response based on the operator response, the challenge and a drone token stored on the drone/CPV; and send, from the drone/CPV to the authoritative command device (i.e. the ADC device), the drone/CPV response and the operator response. CPV 105 may incorporate aspects of CPV 305 and 2410 as described with reference to FIGS. 3 and 24. In some cases, a cyber-physical vehicle management system may include of a plurality of CPVs 105, each vehicle including a computing device having a unique identity and an operator associated with the vehicle.

A CPV operator 110 may control one or more aspects of CPV operation. For example, a CPV operator 110 may compare a challenge to an operator credential stored on the drone operator controller; prepare a cryptographic operator response based on the operator credential; and return the operator response to the drone.

DMA 115 may be an example of a management authority in communication with a licensing authority and receiving licensing information for each licensed vehicle, wherein the management authority is configured to issue at least one cryptographic authentication token associated with each licensed vehicle and verify the at least one token issued to the vehicle prior to operation of the vehicle. DMA 115 may incorporate aspects of DMA 405 as described with reference to FIG. 4.

In some cases, the management authority is configured to verify the identity of the relay node 135. In order to prove its identity, a drone (or other type of CPV) has to first register its license with the DMA 115. The DMA 115 returns a cryptographically signed drone token (CSDT), which allows for the drone to prove its identity in the future. Once the CSDT has been received by the drone it can be used to verify its identity. The DMA 115 can also be queried by a third-party agency with sufficient court order to verify the registration and licensing.

An authoritative drone command (ADC) device 120 may be an example of an authoritative command device associated with an authoritative command user 125 and an authoritative command agency 130, wherein the authoritative drone command device 120 is configured to query and intercept licensed and unlicensed remote-controlled vehicles; send, from an authoritative command device 120 to a drone (or other CPV), a challenge requesting a response from the drone; verify the drone response and the operator response; determine that the drone is included in a mandated intercept definition; and intercept the drone. ADC device 120 may incorporate aspects of ADC device 505 as described with reference to FIG. 5.

In some cases, the authoritative drone command device 120 is licensed by the licensing authority. An ADC device 120 may be issued to authorized users, such as public safety personnel (e.g. police and firefighters) and governmental agencies. The ADC device 120 allows for lawful query and intercept of CPVs 105. The ADC device 120 should register itself to the DMA 115 to get a valid token allowing for proof of identity. The use of this token allows the ADC to prove its authority to CPVs 105 when it issues an interrogatory or intercept request. Properly using this proof of identity in requests makes it cryptographically unfeasible to implement and deploy an imposter ADC device 120. This allows for CPV 105 operators to be confident that if their device is taken over it is done so legitimately. Furthermore, when a request is made the user is alerted about the identity of the ADC agency 130 empowering them to follow up on perceived unlawful actions.

ADC user 125 may incorporate aspects of ADC user 540 as described with reference to FIG. 5. ADC agency 130 may incorporate aspects of ADC agency 570 as described with reference to FIG. 5.

Relay node 135 may be an example of a component configured for communication with the plurality of vehicles and the management authority. Relay node 135 may incorporate aspects of relay node 605 as described with reference to FIG. 6.

A relay node 135 may be a local or gateway communication device for other CPVs 105. The relay node 135 can be, among other embodiments, fixed stationary (e.g. ground station) or mobile (e.g. UAV, handheld device, or temporary ground station). The relay node 135 establishes mutually authenticated communications with CPV 105 requesting connection. The CPV 105 is then able to request local sensing data 155 (e.g. traffic or weather data) as well as connect to the Internet 145, if the relay node 135 is configured for Internet connection.

Licensing agency 140 may be an example of a licensing authority configured to verify the identity of each licensed vehicle and the operator associated with the vehicle, the licensing authority further configured to license vehicles.

In some cases, cyber-physical vehicle management system may include or coordinate with a third-party licensing agency 140. The licensing agency 140 can either be a government agency, such as the Federal Aviation Administration (FAA), or an independent organization, such as an independent certificate authority. The licensing agency 140 authenticates and authorizes the drone and drone pilot but has no method to continually monitor and verify whether the drone is properly licensed. A cyber-physical vehicle management system may provide two components for monitoring the license issued by the licensing agency 140.

Figure 2:
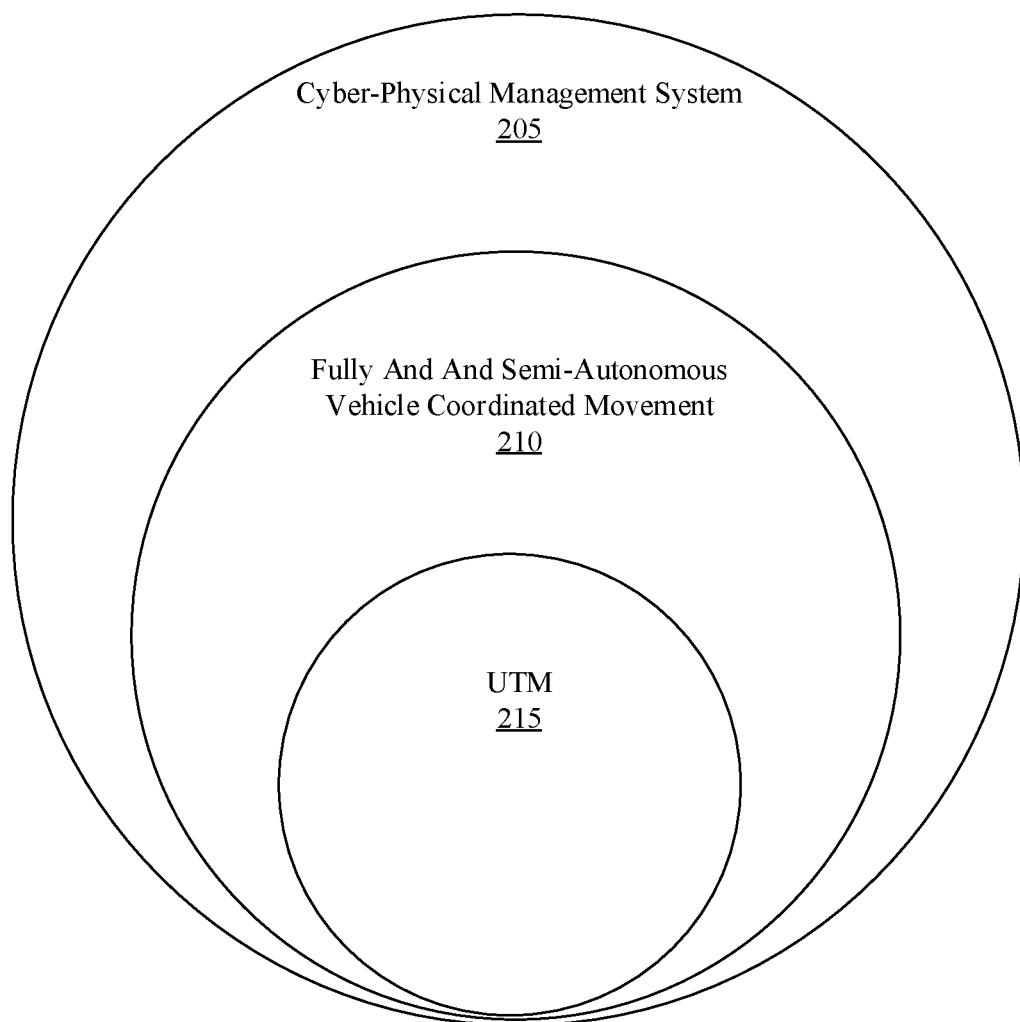

FIG. 2 shows a diagram 200 of a cyber-physical vehicle management system 205 that supports authentication, authorization and secure communication in accordance with aspects of the present disclosure. Diagram 200 represents logical sets wherein the set of cyber-physical vehicle management systems 205 may include the set of fully and semi-autonomous vehicle coordinated movement 210. Similarly, the set of fully and semi-autonomous vehicle coordinated movement systems 210 may include a UTM 215. The present disclosure indicates that a cyber-physical vehicle management systems 205 may be applied to mode applications than the fully and semi-autonomous vehicle coordinated movement systems 210 and UTM 215 scenario described in much of the present disclosure.

A cyber-physical vehicle management system 205 may allow for highly reliable and authentic identity management of cyber-physical systems, unforgeable legal interception devices, and robust relay nodes. A cyber-physical vehicle management system 205 may be applied to a system of UAVs (i.e., a UTM 215), but it could equally be applied to other autonomous vehicles, automated manufacturing, and other cyber-physical applications. A cyber-physical vehicle management system 205 may provide for human and object bi-directional authenticity verification.

Beyond the applications to UTM 215, a cyber-physical vehicle management system 205 can be applied to a breadth of other applications. These applications include manned and unmanned un-, semi-, and fully-autonomous vehicle systems such as aquatic-, aerial-, and ground-based. Some other application examples include personal moving systems (e.g. wheelchairs and golf carts), supply chain management, and authenticated service providers.

A cyber-physical vehicle management system 205 may also be used to manage unmanned autonomous aquatic vehicles, both submersible and non-submersible. Defense applications include unmanned aquatic anti-pirate vehicles for high value targets. It is also just a matter of time before hobbyist boats and submersibles proliferate in numbers. Beyond hobbyist applications, it is conceivable to have scientific and industrial applications. For example, small submersibles could be used for surveying before drilling, tracking animals, or measuring currents. In the case of autonomous boats and submersibles, the proposed technology could trivially be extended to include sonar and other under-water communications. Given the slow speeds of underwater radio, the signature and encryption algorithms chosen would need to minimize communications. This is feasible due to the extensible nature of our process. The ability for an authority to use an ADC-like device has many useful applications. For one, a military ship could be equipped with an ADC device to intercept hobbyist devices that wander too close. Similar devices could be used on oil platforms and in the protection of delicate natural resources, such as protected animal species.

Self-driving vehicles including passenger carrying cars, personal transportation systems, unmanned delivery vehicles, and manned (or unmanned) first responder vehicles are all on the horizon. An unmanned first-responder vehicle, could be used to patrol streets for reckless driving, speeding, and looking for suspicious behavior. Manned autonomous first-responder vehicles could also be used to allow for police having more freedom in observation. Self-driving delivery vehicles could allow for a reduction in labor and decreased delivery costs while improving the efficiency of last mile delivery. Similarly, personal moving systems could allow for small vehicles to deliver people to their desired endpoint. In all of these applications, identity may be maintained and legal intercept allowed.

For example, consider a personal delivery system. If someone is able to load an explosive into the delivery vehicle and tell it to deliver to a random person, this could lead to bad scenarios. In order to avoid this, a user credential, like the one we propose, could be used to bind identity of the loaded product. This would allow for tracking of all deliveries. This would also allow for lawful inspection by law enforcement agencies using an ADC-like device. A supply chain is another natural application of our process. Potential things to include are robots, equipment distribution, manufacturing process, automated supply chain management, and fixed or mobile warehouse robots.

A cyber-physical vehicle management system 205 can also be applied to authenticating a privileged or trusted service provider. For example, it may be that you are meeting with a new lawyer and want to prove their identity. In order to do this, a cyber-physical vehicle management system may verify they are both a licensed lawyer and the specific lawyer they claim to be. Likewise, verification for law enforcement officers and doctors is of immediate need. Before having to submit to your vehicle being pulled over, you can verify that the flashing lights behind you is indeed from a law enforcement officer. Hospitals can use a cyber-physical vehicle management system for bidirectional verification of credentials and required actions, such as a patient verifying the person administering medicine or performing surgery is who they say they are and the doctor or nurse verifying that the correct patient is being administered the correct medicine or having the correct operation.

A cyber-physical vehicle management system 205 may be applied to robots used by law enforcement and other agencies to investigate and dispose of potential explosives or other safety-threatening objects will ensure that only commands from an authorized agent are accepted by the robot. Else, the robot may accept commands from a nefarious agent which could cause the robot put the law enforcement officers in danger. Further, the data received by the authorized agents needs to be validated to ensure that a nefarious agent is not relaying false information with the intent to deceive law enforcement, and therefore potentially causing them to make an incorrect threat assessment.

A cyber-physical vehicle management system 205 may be applied can be used to ensure keyless entry systems are only used by authorized users at authorized times with authenticity ensured, for example, a person could allow a delivery person to open a door to leave a package ensuring only an authorized delivery person could do so and that the action is traceable to the delivery person.

A cyber-physical vehicle management system 205 may have a wide variety of applications where secure, authenticated, and trusted communication is desired and would enhance the user experience or security, or would allow for further innovation that requires the features that a cyber-physical vehicle management system provides. The communication can be omni- or bi-directional, i.e. purely broadcasting or creating a communication link. The scope of a cyber-physical vehicle management system extends beyond the example used for UTM into un-, semi-, and fully-autonomous vehicles and other platforms, whether manned or unmanned. The scope expands further than that into any need for secure identity management and authentication, specifically beneficial for applications that do not have constant access to the Internet or systems that need a failsafe or backup in the event that an internet connection is lost.

Fully and semi-autonomous vehicle coordinated movement 210 may include coordination across land, water, sky and space. The coordinated vehicles may include drones, robots, airplanes, cars, and wheelchairs. The UTM 215 may also include a system of legal entities to interrogate and seize control of unlawful drones.

Figure 3:
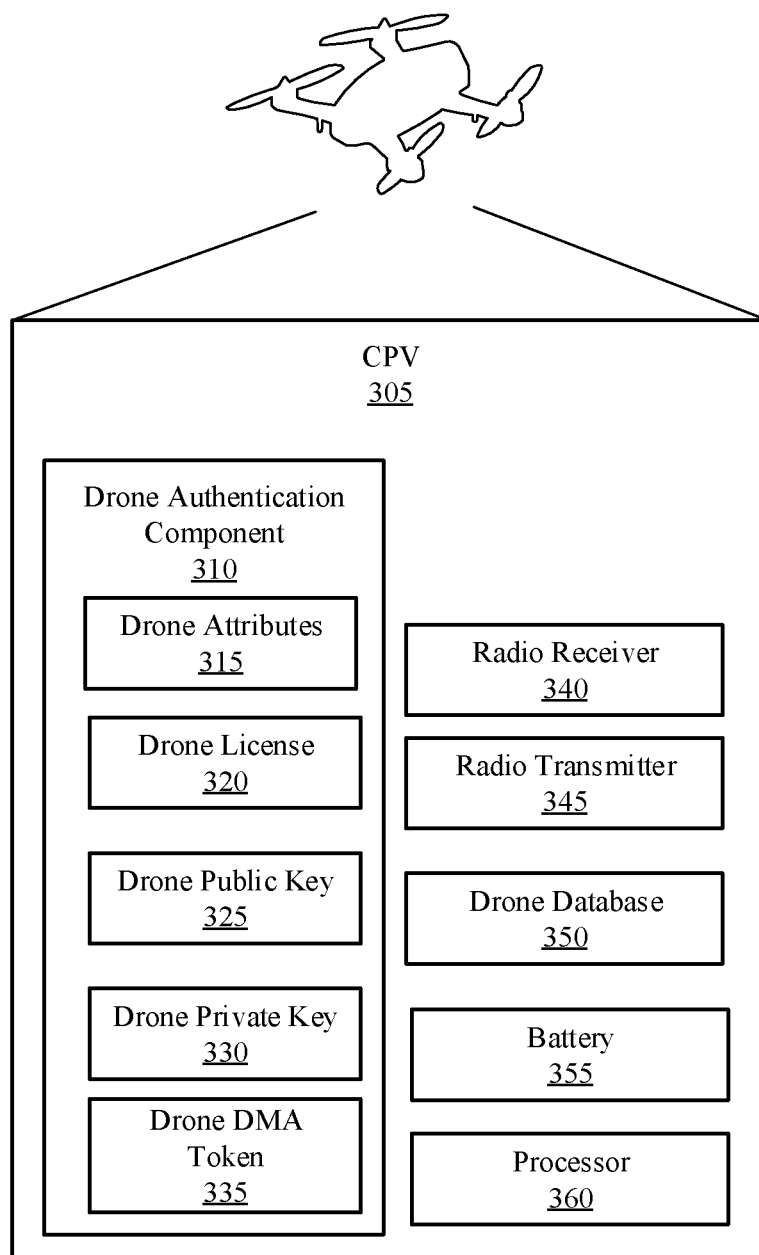
FIG. 3 shows a diagram of a cyber-physical vehicle (CPV) that supports authentication, authorization and secure communication in accordance with aspects of the present disclosure.

FIG. 3 shows a diagram 300 of a CPV 305 that supports authentication, authorization and secure communication in accordance with aspects of the present disclosure.

The CPV 305 may be a device such as a UAV or an autonomous car. The CPV includes a CPV battery 355 and a CPV processor 360. The CPV 305 may contains computing, sensing, GPS, movement, and communications subsystems. A CPV 305 may also interact with other CPVs 305. A cyber-physical vehicle management system may enable an identity management scheme for authenticated communications between CPVs 305 and other devices. A CPV 305 is an electro-mechanical device intended to move through space under partially or fully automated control. In some cases, the CPV 305 may be a component of the CPVS.

The CPVS may include the CPV 305 and a CPVN (secondary cyber-physical systems and subsystems that support the functionality and application of the CPV). For example, CPVN might be a weather station one-way communicating to the CPV 305, it may be a remote controller operated by a human that is providing one-way communication for control, or it may be a two-way communication such as the case of an aerial CPV 305 (e.g. drone) coordinating its flight plan with an automated ground station.

The CPV 305 may communicate with radio signals to other systems such as other CPVs 305 (e.g., in the case of drone swarms). This communication could be to coordinate with each other or simply as one-way communication broadcasting the CPV's existence (and possibly location and other relevant data). CPVs 305 may utilize either one-way receive radio signal communication (e.g. control), one-way send radio signal communication (e.g. data), or two-way send and receive radio signal communication. CPVs 305 may be unmanned in that they lack a human operator within the vehicle (such as drones, remote controlled cars, and bomb disposal robots), but they may have a human controlling them or receiving data from them from afar using radio signals from a CPV node (e.g. a control station, controller, computer).

CPVs 305 may have humans internally acting as either an operator (e.g. an autonomous car like) or as a non-operator (e.g. a sky taxi where the human is an occupant). Radio signals either going to or from the CPV 305 may be detected using a CPV Detector. A CPV detection system may be utilized to control and manage threats such as wirelessly remote-controlled devices, autonomous devices that have a telemetry and control wireless link, drones and robots. The CPV's components, such as the battery 355 in this case, may transmit their own telemetry via a transmitter.

CPV 305 may be one of a plurality of vehicles, each vehicle including a computing device having a unique identity and an operator associated with the vehicle. The CPV 305 may forward a challenge to the drone operator controller; prepare a cryptographic drone response based on the operator response, the challenge and a drone token stored on the drone; and send, from the drone to the authoritative command device, the drone response and the operator response. CPV 305 may incorporate aspects of CPV 105 and 2410 as described with reference to FIGS. 1 and 24. In some examples, CPV 305 may include drone authentication component 310, radio receiver 340, radio transmitter 345, drone database 350, the CPV battery 355, and the CPV processor 360.

Drone authentication component 310 may verify, using a drone public key 325 and a drone token stored on a remote controlled drone, a signature on a drone token using a cryptographic signature verification algorithm; verify that the drone license 320 is valid; perform a challenge and response protocol between the drone and a controller; verify that the drone operator license is valid; and exchange future cryptographic keys by the drone and the drone controller. In some examples, drone authentication component 310 may include drone attributes 315, drone license 320, drone public key 325, drone private key 330, and drone DMA token 335.

Radio receiver 340 may scan a radio frequency spectrum and receive radio transmissions, wherein the radio transmissions include data sent from a vehicle or from a vehicle controller. In some cases, the data includes at least one of information about the vehicle, information about activity of the vehicle, and telemetry data. Radio receiver 340 may incorporate aspects of radio receiver 635, 2475, and 2525 as described with reference to FIGS. 6, 24, and 25.

In some cases, a CPVS comprises a radio transmitter 345. Radio transmitter 345 may incorporate aspects of radio transmitter 640, 2480, and 2530 as described with reference to FIGS. 6, 24, and 25.

Figure 4:
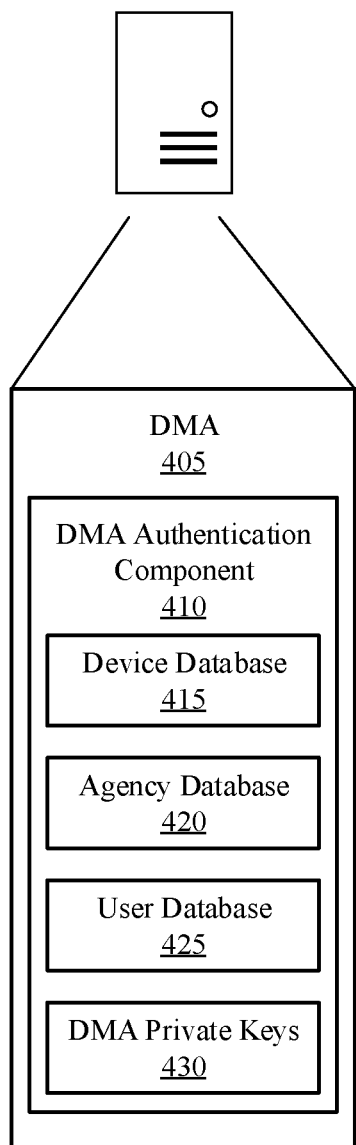
FIG. 4 shows a diagram of a drone/CPV management authority (DMA) that supports authentication, authorization and secure communication in accordance with aspects of the present disclosure.

FIG. 4 shows a diagram 400 of a DMA 405 that supports authentication, authorization and secure communication in accordance with aspects of the present disclosure. In some cases, DMA 405 may be an example of an organization, which may utilize computer systems to implement the functions described herein.

DMA 405 may be an example of a management authority in communication with the licensing authority and receiving licensing information for each licensed vehicle, wherein the management authority is configured to issue at least one cryptographic authentication token associated with each licensed vehicle and verify the at least one token issued to the vehicle prior to operation of the vehicle. DMA 405 may incorporate aspects of DMA 115 as described with reference to FIG. 1. In some examples, DMA 405 may include DMA authentication component 410. In some cases, the management authority is configured to verify the identity of the relay node.

In order to prove its identity, the drone/CPV has to first register its license with the DMA 405. The DMA 405 returns a CSDT, which allows for the drone/CPV to prove its identity in the future. Once the CSDT has been received by the drone it can be used to verify its identity. The DMA 405 can also be queried by a third-party agency with sufficient court order to verify the registration and licensing.

DMA authentication component 410 may receive data associated with a drone/CPV operator, the data including an operator license, a plurality of operator attributes, an operator cryptographic public key, and an operator cryptographic private key via a secure channel; determine that the operator attributes match the operator license and that no operator token has been previously issued for the operator license; generate a cryptographically signed operator token including the operator attributes, the operator license and the operator cryptographic public key; and send the operator token to a drone/CPV operator.

DMA authentication component 410 may also receive data associated with a drone/CPV, the data including a drone license, a plurality of drone attributes, a drone cryptographic public key, and a drone cryptographic private key via a secure channel; determine that the drone attributes match the drone license and that no drone token has been previously issued for the drone license; generate a cryptographically signed drone token including the drone attributes, drone license and the drone cryptographic public key; and send the drone token to the drone/CPV.

DMA authentication component 410 may also receive data associated with a controller of an authoritative command device, the data including a user license, a plurality of user attributes, a user cryptographic public key, and a user cryptographic private key via a secure channel; determine that the user attributes match the user license and that no user token has been previously issued for the user license; generate a cryptographically signed user token including the user attributes, the user license and the user cryptographic public key; and send the user token to the controller of the authoritative command device.

DMA authentication component 410 may also receive data associated with an authoritative command device, the data including a device license, a plurality of device attributes, a device cryptographic public key, and a device cryptographic private key via a secure channel; determine that the device attributes match the device license and that no device token has been previously issued for the device license; generate a cryptographically signed device token including the device attributes, the device license and the device cryptographic public key; and send the device token to the authoritative command device.

DMA authentication component 410 may also receive data associated with an authoritative command agency, the data including an agency license, a plurality of agency attributes, an agency cryptographic public key, and an agency cryptographic private key via a secure channel; determine that the agency attributes match the agency license and that no agency token has been previously issued for the agency license; generate a cryptographically signed agency token including the agency attributes, the agency license and the agency cryptographic public key; and send the agency token to the authoritative command agency. In some examples, DMA 405 authentication component may include device database 415, agency database 420, user database 425, and DMA 405 private keys.

In some cases, the operator cryptographic public key includes the operator license and the operator attributes. In some cases, the operator attributes include at least one of a name, an address, an expiration date, an issue date, and a unique identifier. In some cases, the drone cryptographic public key includes the drone license and drone attributes. In some cases, the drone attributes include at least one of a drone operator name, a drone operator address, and drone date of manufacturing.

Figure 5:
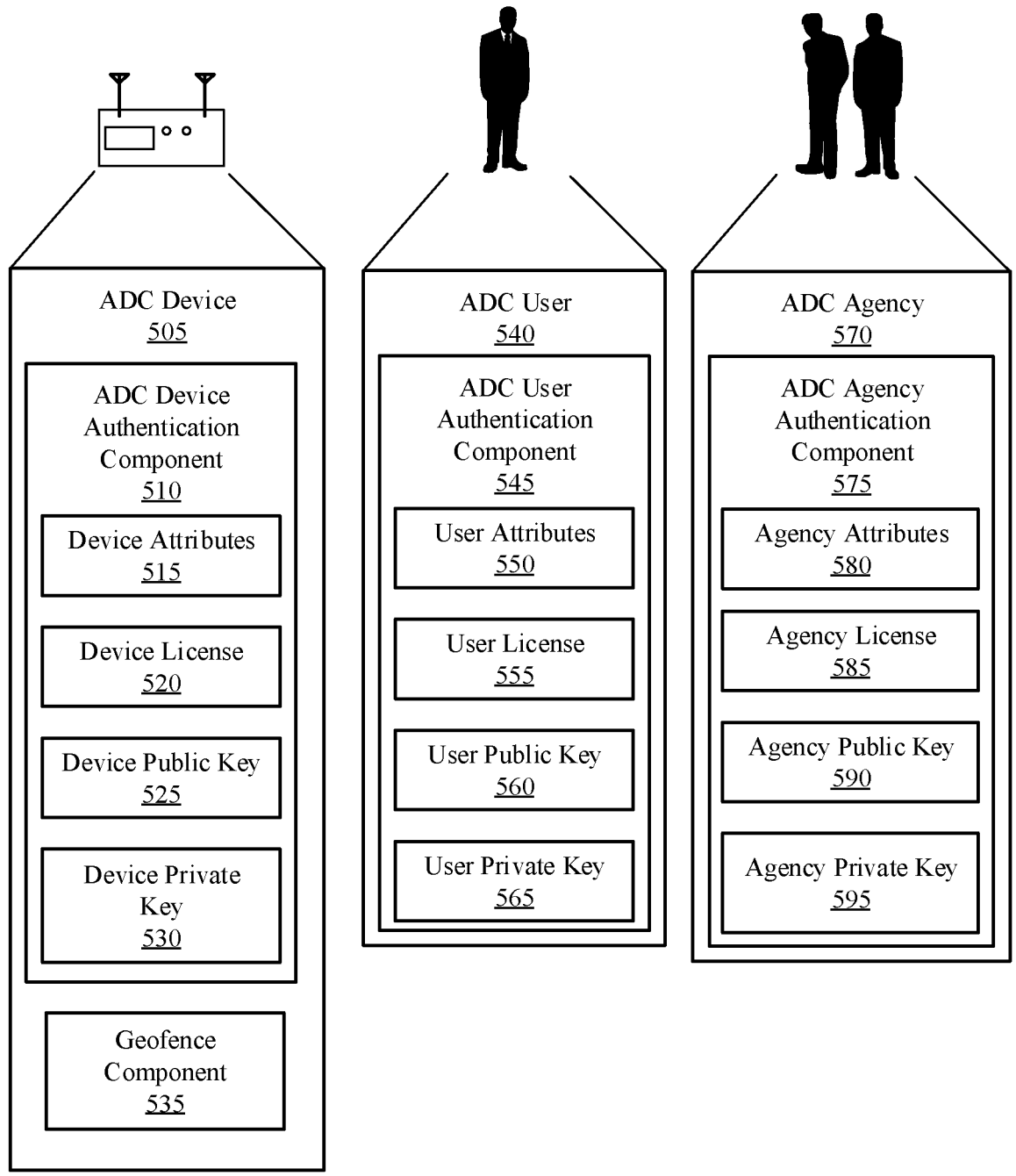
FIG. 5 shows a diagram of an authoritative drone command (ADC) system that supports authentication, authorization and secure communication in accordance with aspects of the present disclosure.

FIG. 5 shows a diagram 500 of an ADC system that supports authentication, authorization and secure communication in accordance with aspects of the present disclosure. Diagram 500 may include ADC device 502, ADC user 516, and ADC agency 528. In some cases, ADC user 516 and ADC agency 528 may utilize computer devices (e.g., personal computers, mobile devices, or servers) to implement the functions described herein.

ADC device 502 may be an example of an authoritative command device associated with an authoritative command user and an authoritative command agency, wherein the authoritative command device is configured to query and intercept licensed and unlicensed remote-controlled vehicles; send, from an authoritative command device to a drone/CPV, a challenge requesting a response from the drone/CPV; verify the drone response and the operator response; determine that the drone/CPV is included in a mandated intercept definition; and intercept the drone/CPV. ADC device 502 may incorporate aspects of ADC device 120 as described with reference to FIG. 1. In some examples, ADC device 502 may include ADC device 502 authentication component and geofence component 514.

In some cases, the authoritative command device is licensed by the licensing authority. An ADC device 502 may be issued to authorized users, such as public safety personnel (e.g. police and firefighters) and governmental agencies. The ADC device 502 allows for lawful query and intercept of CPVs. The ADC device 502 should register itself to the DMA to get a valid token allowing for proof of identity. The use of this token allows the ADC to prove its authority to CPVs when it issues an interrogatory or intercept request. Properly using this proof of identity in requests makes it cryptographically unfeasible to implement and deploy an imposter ADC device 502. This allows for CPV operators to be confident that if their device is taken over it is done so legitimately. Furthermore, when a request is made the user is alerted about the identity of the ADC agency 528 empowering them to follow up on perceived unlawful actions.

In some examples, ADC device 502 authentication component may include device attributes 506, device license 508, device public key 510, and device private key 512.

ADC user 516 may incorporate aspects of ADC user 125 as described with reference to FIG. 1. In some examples, ADC user 516 may include ADC user 516 authentication component. In some examples, ADC user 516 authentication component may include user attributes 520, user license 522, user public key 524, and user private key 526.

ADC agency 528 may incorporate aspects of ADC agency 130 as described with reference to FIG. 1. In some examples, ADC agency 528 may include ADC agency 528 authentication component. In some examples, ADC agency 528 authentication component may include agency attributes 532, agency license 534, agency public key 536, and agency private key 538.

Figure 6:
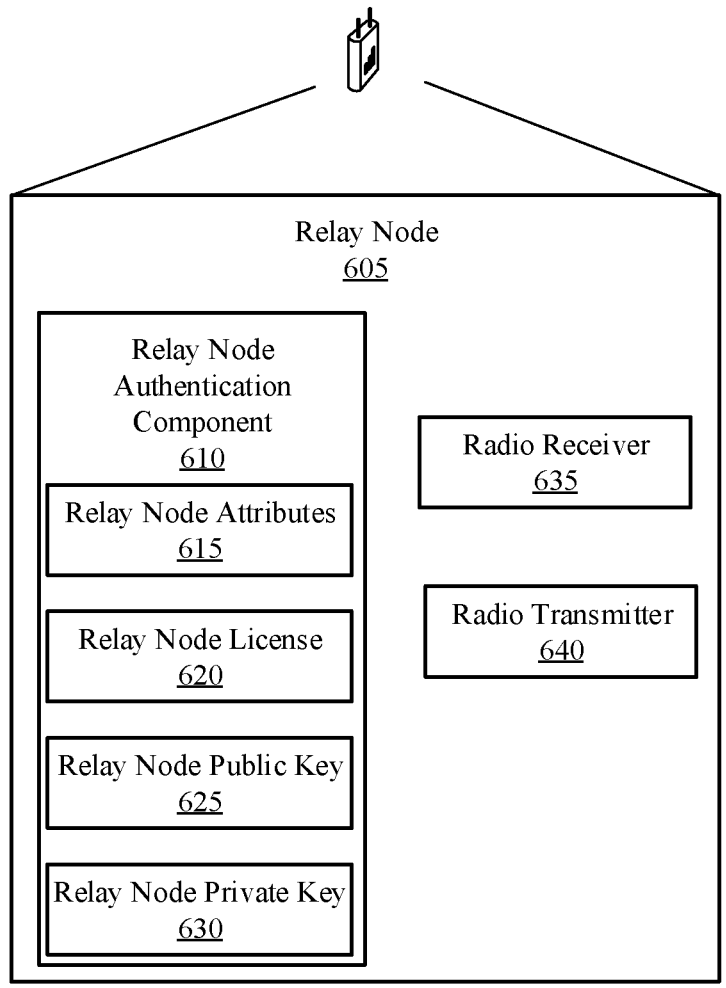
FIG. 6 shows a diagram of a relay node that supports authentication, authorization and secure communication in accordance with aspects of the present disclosure.

FIG. 6 shows a diagram 600 of a relay node 605 that supports authentication, authorization and secure communication in accordance with aspects of the present disclosure.

Relay node 605 may be an example of a component configured for communication with the plurality of vehicles and with the management authority. Relay node 605 may incorporate aspects of relay node 135 as described with reference to FIG. 1. In some examples, relay node 605 may include relay node authentication component 610, radio receiver 635, and radio transmitter 640.

A relay node 605 may be a local or gateway communication device for other CPVs. The relay node 605 can be, among other embodiments, fixed stationary (e.g. ground station) or mobile (e.g. UAV, handheld device, or temporary ground station). The relay node 605 establishes mutually authenticated communications with CPV requesting connection. The CPV is then able to request local sensing data 155 (e.g. traffic or weather data) as well as connect to the Internet, if the relay node 605 is configured for an internet connection.

In some examples, relay node authentication component 610 may include relay node attributes 615, relay node license 620, relay node public key 625, and relay node private key 630.

Radio receiver 635 may incorporate aspects of radio receiver 340, 2475, and 2525 as described with reference to FIGS. 3, 24, and 25. Radio transmitter 640 may incorporate aspects of radio transmitter 345, 2480, and 2530 as described with reference to FIGS. 3, 24, and 25.

Figure 7:
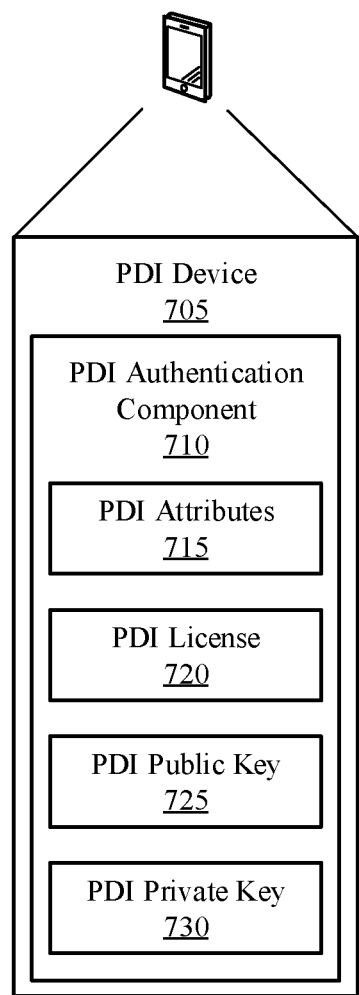
FIG. 7 shows a diagram of a polite drone identification (PDI) device that supports authentication, authorization and secure communication in accordance with aspects of the present disclosure.

FIG. 7 shows a diagram 700 of a polite drone identification (PDI) device 705 that supports authentication, authorization and secure communication in accordance with aspects of the present disclosure.

PDI device 705 may be a device capable of communicating with a CPV. In some cases, a PDI device may be a mobile communications device. In some examples, PDI device 705 may include PDI authentication component 710. In some examples, PDI authentication component 710 may include PDI attributes 715, PDI license 720, PDI public key 725, and PDI private key 730.

Figure 8:
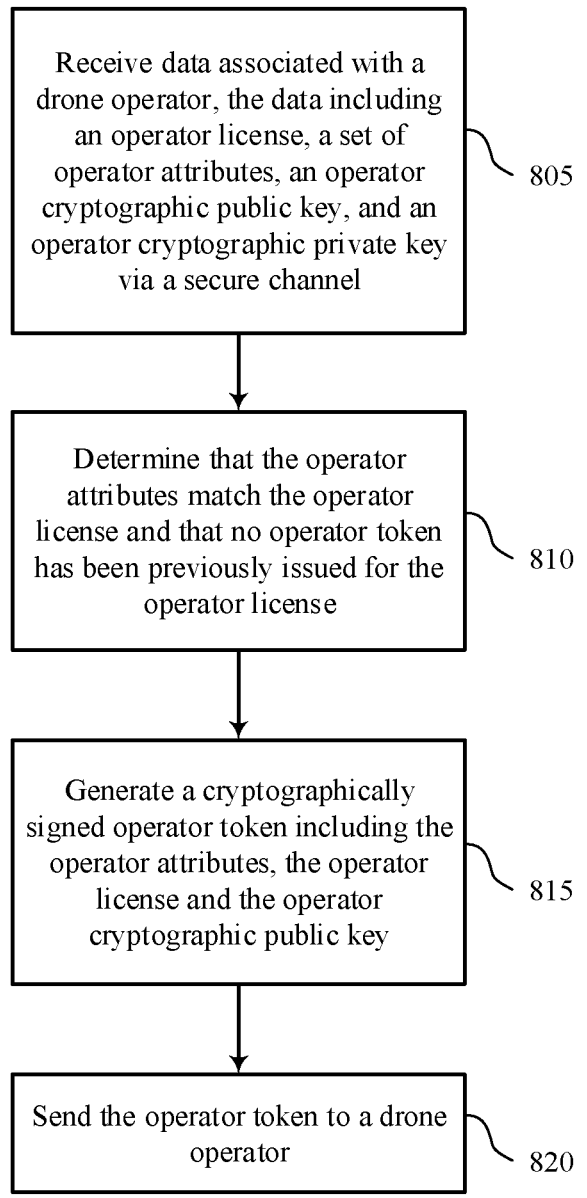
FIGS. 8 through 23 show flowcharts of a process for authentication, authorization and secure communication in accordance with aspects of the present disclosure.

FIG. 8 shows a flowchart 800 of a process for authentication, authorization and secure communication in accordance with aspects of the present disclosure.

A DMA may interact with a drone/CPV and a drone/CPV operator. For example, the DMA may provide cryptographic signatures for the management (e.g. creation, verification, and revocation) of unforgeable, authentic drone licenses and DOLs. Thus, a DMA may verify the identity of a drone/CPV and drone/CPV operator as well as issuing a cryptographic token that can later be used to authenticate their license. The DMA can be a public or private entity with a public key distribution system as well the maintainer of secure private key(s). A cyber-physical vehicle management system includes verification components similar to the distribution system for digital rights management or digital certificate authorities. A DMA can be implemented to support a public key cryptographic scheme that is extensible to a large number of end-users, a revocation scheme that allows for informing end-users of cryptographic tokens that are no longer trusted, and a generation and issuing of scheme for verifiable CSDTs.

The CSDT is a token that is cryptographically signed by the DMA and includes information about the DMA as well as the public key(s) used by the DMA. The information the CSDT may also include, but is not limited to, the cryptographic schemes used, necessary protocols, or parameters. In a cyber-physical vehicle management system, the CSDT and all protocols for the DMA public key scheme are pre-installed, pre-distributed, or securely pinned to the drone. The CSDT may be stored in software or with trusted hardware modules. Regardless, the CSDT, and corresponding algorithms, may be installed such that the processor that verifies other credentials, (including the drone, drone operator, ADC device, ADC user, ADC agency, and relay node credentials) can securely access it. Distribution of the CSDT should be secure, and can be accomplished in software or hardware using various schemes, not discussed here.

A DOL may be a license linked to digital drone operator attributes. The drone operator attributes can include, but are not limited to, the drone operator's name, the drone operator's home address, and the drone operator's date of birth. In addition to the attributes, the DOL may include, but is not limited to, a class of license, the expiration date of the license, the issue date of the license, unique identifier, restrictions, and special exemptions. The drone/CPV and DOL should be generated by a trusted third-party organization such as a government agency, for example the FAA, or an independent organization.

The verification process may be performed prior to the issuance of a new DOL. The DOL and drone/CPV operator attributes are stored in various locations which could include, but is not limited to, the drone operator controller, a drone/CPV operator's personal PC, or a third-party organization. A pair of cryptographic keys including a public key and private key are then securely generated for the drone/CPV operator. This can be done locally or via a third-party service. The details for generating cryptographic keys is dependent on the cryptographic algorithms later used. Ideally, for the drone/CPV operator, the key generation occurs on a local device (the drone operator controller, a PC owned by the drone operator, or a secure hardware device). However, this process can occur with the license authority or the DMA generating keys. At this point, the drone/CPV operator has generated all the necessary information to verify its identity to the DMA and receive a cryptographically signed drone operator token. A cryptographically signed drone operator token is a token that is cryptographically signed and allows for third-parties to verify the DMA signature if they have the CSDT. The cryptographically signed drone operator token also stores the public key for the drone/CPV operator enabling two functions. First, the drone operator public key can be used to encrypt data which only someone with the drone operator private key can decrypt. Second, the drone operator private key can be used to sign data which can be verified by the drone operator public key. Only the drone operator private key is able to produce signatures that will be correctly verified by the corresponding drone operator public key.

To receive a cryptographically signed drone operator token, the DOL, drone operator attributes, and associated public key are sent via a secure channel, such as an HTTPS Internet channel, to the DMA. The DMA verifies the DOL and drone operator attributes either locally, if capable, or through an issuing organization, for example the FAA. If any of the drone operator attributes do not match the DOL, then the license is not signed and is returned to the license requestor with an error message. Optionally, if a cryptographically signed drone operator token has already been issued for a DOL, the process aborts. The DMA then uses a cryptographically secure signature algorithm with the DMA private key to produce a cryptographically signed drone operator token. This token includes the drone operator attributes, DOL, and the drone operator public key. This data packet can be verified by any computer with the CSDT but cannot be forged by anyone that does not have the DMA private key(s), which is securely stored and managed by the DMA. Optionally, the DMA stores the cryptographically signed drone operator token into a database, that can later be used to verify messages signed by drones or verify the issued certificates.

The DMA returns the cryptographically signed drone operator token via a secure channel, like an HTTPS Internet connection to the requesting party. The drone operator, or other requesting party, uses a signature verification algorithm to prove the validity of the signature or to handle an error message. The cryptographically signed drone operator token and the corresponding drone operator private key is then stored in the drone operator credential.

At block 805 the DMA may receive data associated with a drone operator, the data including an operator license, a plurality of operator attributes, an operator cryptographic public key, and an operator cryptographic private key via a secure channel. In certain examples, aspects of the described operations may be performed by DMA authentication component 410 as described with reference to FIG. 4.

At block 810 the DMA may determine that the operator attributes match the operator license and that no operator token has been previously issued for the operator license. In certain examples, aspects of the described operations may be performed by DMA authentication component 410 as described with reference to FIG. 4.

At block 815 the DMA may generate a cryptographically signed operator token including the operator attributes, the operator license and the operator cryptographic public key. In certain examples, aspects of the described operations may be performed by DMA authentication component 410 as described with reference to FIG. 4.

At block 820 the DMA may send the operator token to a drone/CPV operator. In certain examples, aspects of the described operations may be performed by DMA authentication component 410 as described with reference to FIG. 4.

Figure 9:
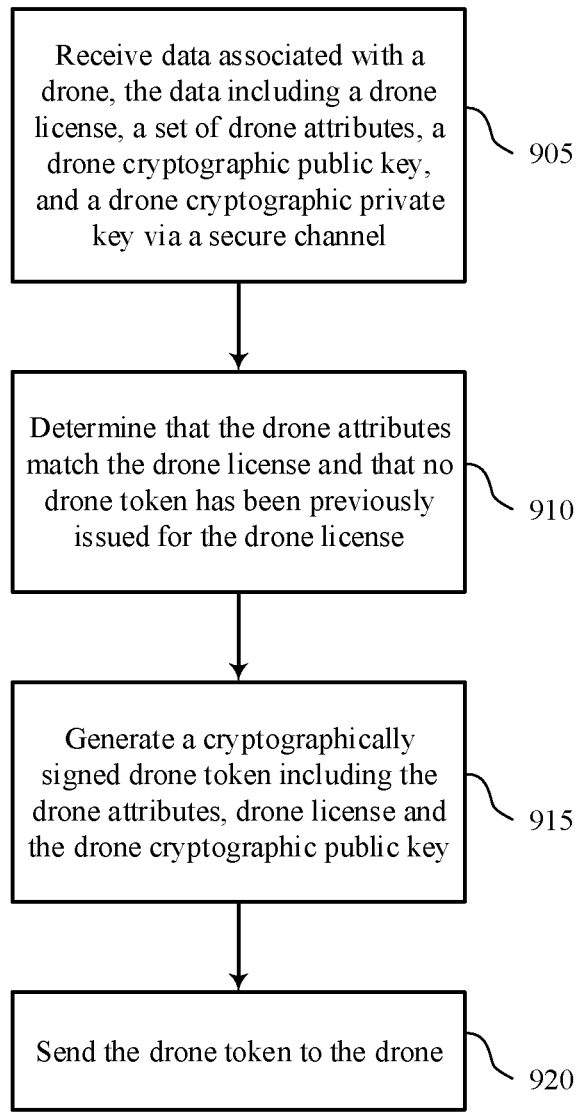

FIG. 9 shows a flowchart 900 of a process for authentication, authorization and secure communication in accordance with aspects of the present disclosure. Flowchart 900 may incorporate aspects described with reference to flowchart 800.

At block 905 the DMA may receive data associated with a drone/CPV, the data including a drone license, a plurality of drone attributes, a drone cryptographic public key, and a drone cryptographic private key via a secure channel. In certain examples, aspects of the described operations may be performed by DMA authentication component 410 as described with reference to FIG. 4.

At block 910 the DMA may determine that the drone attributes match the drone license and that no drone token has been previously issued for the drone license. In certain examples, aspects of the described operations may be performed by DMA authentication component 410 as described with reference to FIG. 4.

At block 915 the DMA may generate a cryptographically signed drone token including the drone attributes, drone license and the drone cryptographic public key. In certain examples, aspects of the described operations may be performed by DMA authentication component 410 as described with reference to FIG. 4.

At block 920 the DMA may send the drone token to the drone. In certain examples, aspects of the described operations may be performed by DMA authentication component 410 as described with reference to FIG. 4.

Figure 10:
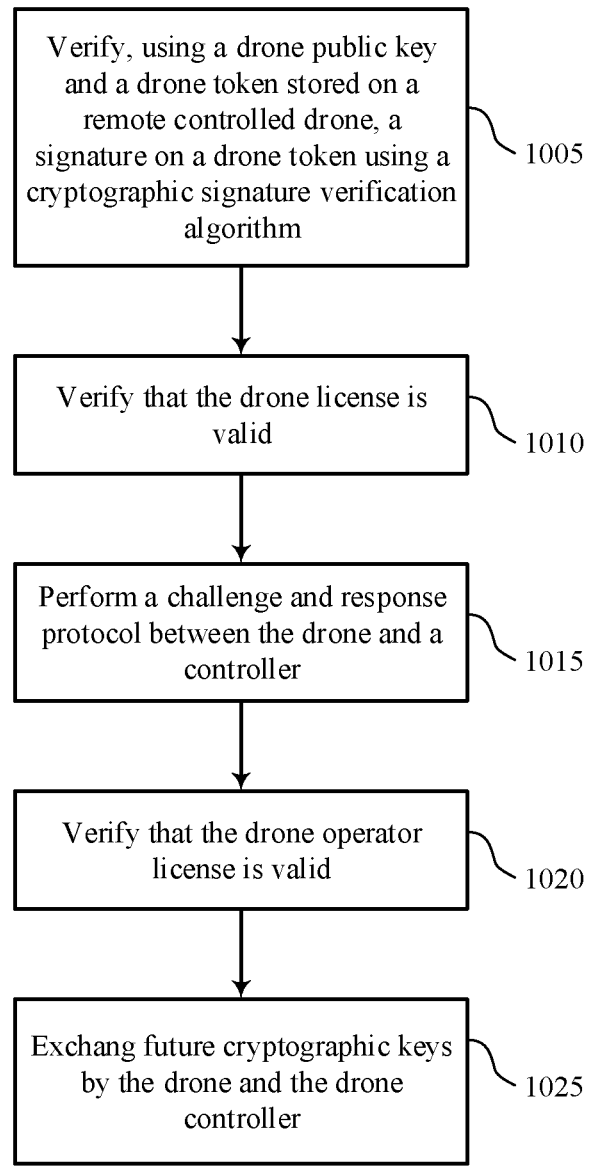

FIG. 10 shows a flowchart 1000 of a process for authentication, authorization and secure communication in accordance with aspects of the present disclosure. In some examples, a CPV may execute a set of codes to control functional elements of the CPV to perform the described functions. Additionally or alternatively, a CPV may use special-purpose hardware.

A cyber-physical vehicle management system may ensure that prior to drone/CPV power-on that the CSDT is available for any processor that may verify the licenses. The cryptographically signed drone operator token is installed in or on the controller, or external to the controller, depending on the specific implementation. The cryptographically signed drone token is installed on the drone, or external to the drone/CPV, depending on the specific implementation. For example, the cryptographically signed drone token may be stored in a trusted platform module on the drone/CPV or on a removable dongle that is plugged in at runtime.

When a drone/CPV and corresponding controller is powered on, a drone/CPV and a drone/CPV operator may perform a mutual verification process to ensure that the licenses are valid for flight. The system uses a cryptographic signature verification algorithm to verify the signature on the cryptographically signed drone token with the DMA public keys. Once the signature on the cryptographically signed drone token is verified the drone verifies the license is valid. This verification may include, but is not limited to, verifying the license expiration date is in the future, verifying the license start date is in the past, and verifying the license class has operating privilege in a local area.

Optionally, the drone/CPV may verify the revocation list, or list of tokens that can no longer be trusted. The verification algorithm can check various things including, but not limited to, a cryptographic signature using the DMA public keys, date of last update, and current revocation list. If the verification steps fail, then the drone enters a failsafe mode. The failsafe mode could include various actions including, but not limited to, alerting the user of the failure via the drone/CPV operator display or preventing the drone from flying.

The verification continues by using a challenge and response protocol between the drone/CPV and the drone/CPV operator credential. Depending on the specific implementation, the cryptographically signed drone operator token may be stored on the drone, the drone controller, or external to the drone controller. Regardless, we assume that the cryptographically signed drone operator token can exchange messages with the controller using local communications (e.g. software pipes, USB, serial, or Bluetooth). The drone controller communicates to the drone/CPV wirelessly. The drone/CPV issues a challenge which can be generated with any number of true or pseudo random algorithms (e.g. amplified thermal noise, yarrow, fortuna, or AES-counter) or using a time stamp. The challenge is then sent to the device with the drone operator credentials. The challenge is combined with the cryptographically signed drone operator token and a cryptographic response is prepared using the drone operator private key. This response is returned to the drone via the local link which cryptographically verifies the validity of the response and DOL. If this verification fails, then the drone/CPV enters a failsafe mode such as those described above.

After verification of the licenses, the drone/CPV and drone/CPV controller can use the cryptographic keys from the cryptographically signed drone token and the cryptographically signed drone operator token to exchange future cryptographic keys. This also allows for any cryptographic information to be exchanged for future communications. Similarly, the drone/CPV can use the drone public/private keys to exchange future cryptographic keys with the display. These keys and protocol exchanges allow for authenticated and, if desired, encrypted communications between the controller and drone, as well as the drone and drone operator display.

At block 1005 the CPV may verify, using a drone public key and a drone token stored on a remote-controlled drone, a signature on a drone token using a cryptographic signature verification algorithm. In certain examples, aspects of the described operations may be performed by drone authentication component 310 as described with reference to FIG. 3.

At block 1010 the CPV may verify that the drone license is valid. In certain examples, aspects of the described operations may be performed by drone authentication component 310 as described with reference to FIG. 3.

At block 1015 the CPV may perform a challenge and response protocol between the drone/CPV and a controller. In certain examples, aspects of the described operations may be performed by drone authentication component 310 as described with reference to FIG. 3.

At block 1020 the CPV may verify that the drone operator license is valid. In certain examples, aspects of the described operations may be performed by drone authentication component 310 as described with reference to FIG. 3.

At block 1025 the CPV may exchange future cryptographic keys by the drone/CPV and the drone controller. In certain examples, aspects of the described operations may be performed by drone authentication component 310 as described with reference to FIG. 3.

Figure 11:
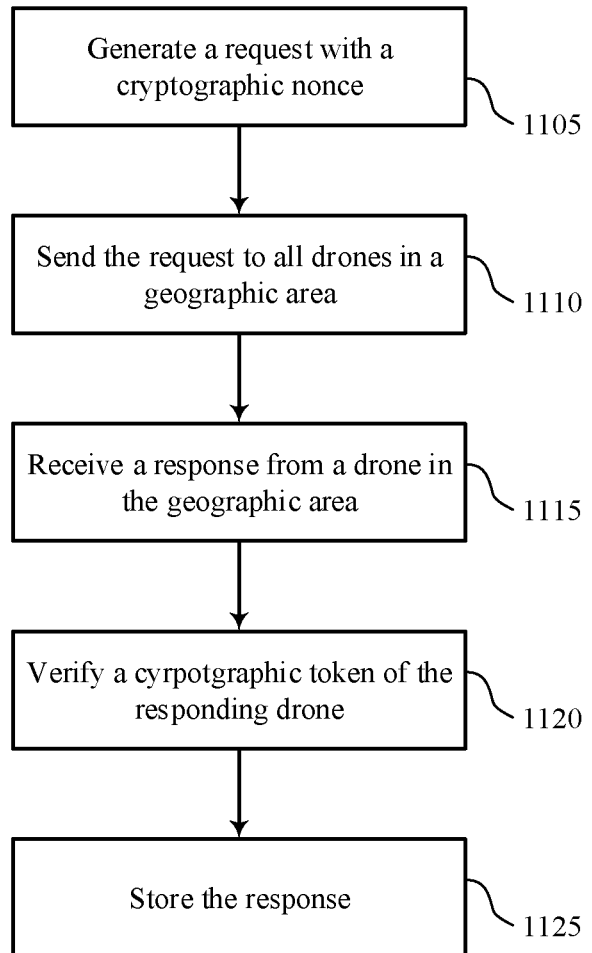

FIG. 11 shows a flowchart 1100 of a process for authentication, authorization and secure communication in accordance with aspects of the present disclosure. In some examples, a CPV may execute a set of codes to control functional elements of the CPV to perform the described functions. Additionally or alternatively, a CPV may use special-purpose hardware.

A drone/CPV may request the position or other information from other drones/CPVs in a local area. The local area maybe most simply defined as the radio range or may extend into line-of-sight, aural range, or preset coordinate boundaries. A cyber-physical vehicle management system may provide for authenticated non-reputable communications from the responding drones to the requesting drone. This protocol depends on the previous distribution of the CSDT to the requesting drone and the responding drone(s) to have valid cryptographically signed drone tokens.

The protocol starts when the requesting drone/CPV generates a request with a cryptographically random nonce, or challenge. This request is sent via the requesting drones radio to all responding drones/CPVs in radio range. When a drone/CPV receives a request packet the cryptographic challenge is combined with the current navigation data and the responding drone/CPV's cryptographically signed drone token. The navigation may include, but is not limited, the GPS synched time, the location, the heading, and the altitude. The output of the combination is then used to prepare a cryptographic response using the responding drone/CPV's private key. This response is then sent via the responding drone/CPV's radio to the requesting drone. The requesting drone/CPV verifies multiple aspects of the response packet. First, the requesting drone verifies that the responding drone's cryptographically signed token is legitimately signed using the DMA public key(s) in the pre-distributed CSDT.

After verifying the legitimacy of the responder's cryptographically signed drone token, the requesting drone then verifies the response packets signature using the responding drone/CPV's public key. Once these validation steps have been proven, the requesting drone stores the response in a database for future use. One use of these response packets is for navigation algorithms to cooperatively plan paths with other drones. In some cases, i.e., to limit the amount of traffic for drone location response, drones/CPVs may record the random nonce and use it to record other drone responses. This avoids the need for 2n exchanges for n drones to verify locations.

To manage airspace that both drones/CPVs and manned aircraft (e.g. personal and commercial helicopters and airplanes) fly in especially airspace that is presently regulated but not controlled (e.g. Class G airspace), we propose a system similar to the above discussed drone-to-drone communication. A key differentiator is that manned aircraft will have priority over drones. In order to put this into effect, the manned aircraft's identity and status as a manned aircraft would have to be authenticated. We can apply another solution for those who want to fly over their own property (herein known as "property owner(s)"), say a farmer crop-dusting her field. In this situation, the property owner could reserve the airspace above their property for a fixed interval of time within an altitude range where drone operators will not be permitted to submit flight plans that enter the temporarily restricted area. Any flight plans that have already submitted by drone/CPV operators that would have them enter the temporarily restricted would have to be managed with priority determined via regulation (e.g. first-come-first-serve, property-owner precedence, or fees). Alternatively, the property owner could proactively enforce this drone flight restriction by setting up a relay node to ensure that all drones in the area have been notified of their approved airspace restriction.

At block 1105 the CPV may generate a request with a cryptographic nonce. In certain examples, aspects of the described operations may be performed by drone authentication component 310 as described with reference to FIG. 3.

At block 1110 the CPV may send the request to all drones in a geographic area. In certain examples, aspects of the described operations may be performed by radio receiver 340, 635, 2475, and 2525 as described with reference to FIGS. 3, 6, 24, and 25.

At block 1115 the CPV may receive a response from a drone in the geographic area. In certain examples, aspects of the described operations may be performed by radio transmitter 345, 640, 2480, and 2530 as described with reference to FIGS. 3, 6, 24, and 25.

At block 1120 the CPV may verify a cryptographic token of the responding drone. In certain examples, aspects of the described operations may be performed by drone authentication component 310 as described with reference to FIG. 3.

At block 1125 the CPV may store the response. In certain examples, aspects of the described operations may be performed by drone database 350 as described with reference to FIG. 3.

Figure 12:
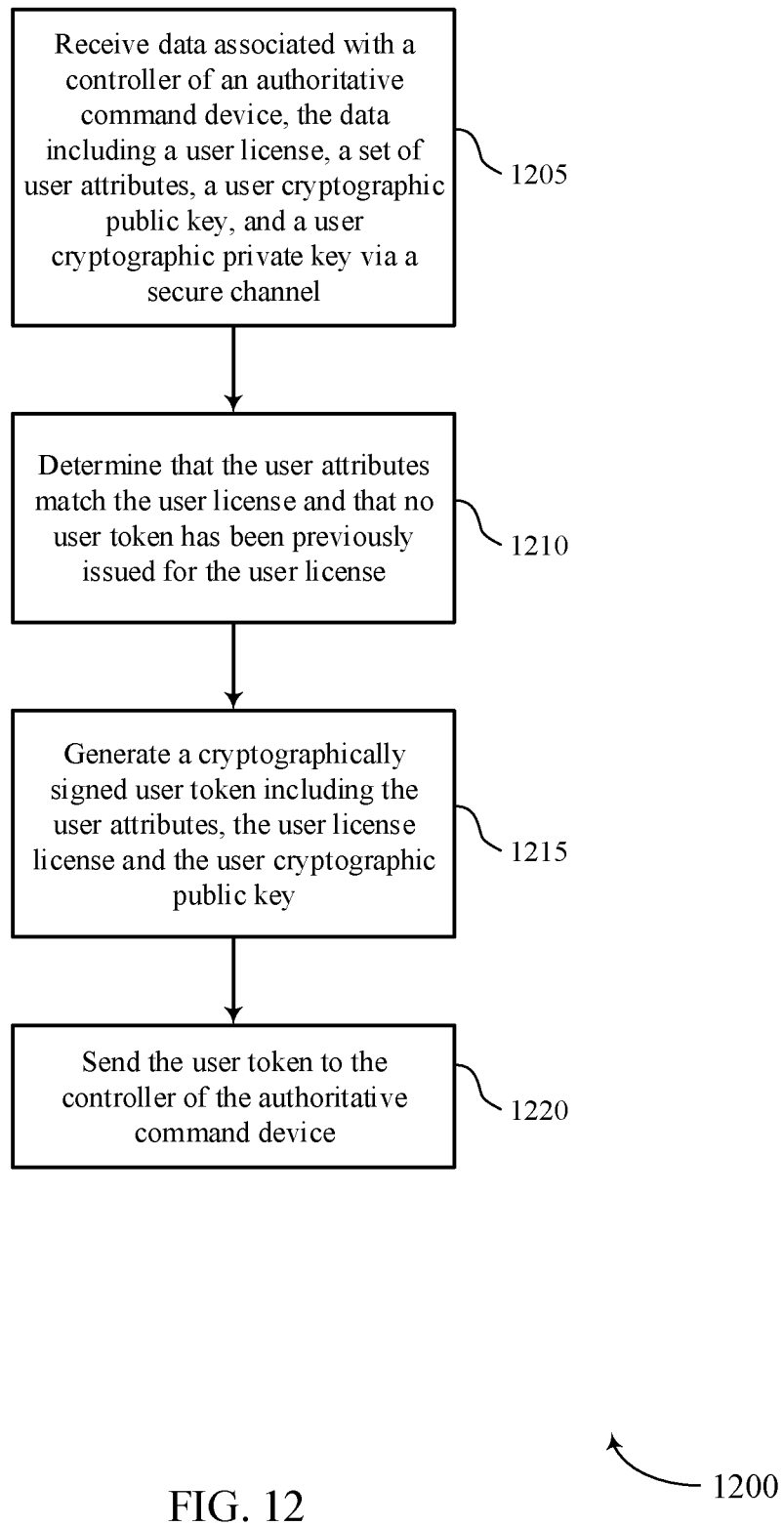

FIG. 12 shows a flowchart 1200 of a process for authentication, authorization and secure communication in accordance with aspects of the present disclosure.

A DMA may verify the identity of an ADC device, ADC user, and ADC agency as well as issuing each a cryptographic token that can later be used to authenticate their license. The DMA can be a public or private entity with a public key distribution system as well as secure private key(s). A cyber-physical vehicle management system may have similar aspects to the distribution system for digital rights management. Digital certificate authorities can be implemented to support the following: a public-private key scheme that is extensible to a large number of end-users; a revocation scheme that allows for informing end-users of cryptographic tokens that are no longer trusted; and a CSDT which allows end-users to verify cryptographic tokens issued by the DMA.

The CSDT is a token that is cryptographically signed by the DMA and includes information about the DMA as well as public key(s) from the DMA. The information the CSDT may include, but is not limited to, the cryptographic schemes used and necessary protocols or parameters. In a cyber-physical vehicle management system, the CSDT and all protocols for the DMA public key scheme are pre-installed, pre-distributed, or pinned to the ADC in a secure manner. The CSDT may be stored in software or with trusted hardware modules. Regardless, the CSDT, and corresponding algorithms, may be installed such that the processor that verifies other credentials (including the ADC device, ADC agency, and ADC user) can securely access it. Distribution of the CSDT should, ideally, be secure, which can be accomplished in software or hardware using various schemes which are not discussed here.

An ADC user license may be a license linked to digital ADC user attributes. The ADC user attributes can include, but are not limited to, the ADC user's name, the ADC device user's agency, and the ADC user's start date. The ADC user license may include, but is not limited to, a class of license, the expiration date of the license, the issue date of the license, and a unique identifier. ADC user license should be generated by a trusted third-party organization such as a government agency, for example the Federal Aviation Administration, or an independent organization.

When a new ADC user license is issued, a verification process may be performed (e.g., by a DMA) before secure operation is possible. The ADC user license and ADC user attributes are stored in various locations which could include, but are not limited to, the ADC device, an ADC device owner's personal PC, or the FAA. A pair of cryptographic keys including a public key and private key are securely generated for the ADC device. This can be done locally or via a third-party service. The details for generating cryptographic keys is dependent on the cryptographic algorithms later used. Ideally, the key generation occurs on a local device (the ADC device, a PC owned by the ADC agency Operator, or a secure hardware device).

However, this process can occur with the license authority or the DMA generating keys. At this point, the ADC device has generated the necessary information to verify its identity to the DMA and receive a cryptographically signed ADC device token. A cryptographically signed ADC device token is a token that is cryptographically signed and allows for third-parties to verify the DMA signature if they have the CSDT. The cryptographically signed ADC device token also stores the public key for the ADC device enabling two functions. First, the ADC user public key can be used to encrypt data which only someone with the ADC user private key can decrypt. Second, the ADC user private key can be used to sign data which can be verified by the ADC User public key. Only the ADC user private key is able to produce signatures that will be correctly verified by the corresponding ADC user public key.

To receive a cryptographically signed ADC user token the ADC user license, ADC user attributes, and associated public key are sent via a secure channel, such as an HTTPS Internet channel, to the DMA. The DMA verifies the ADC user license and ADC user attributes either locally, if capable, or through the issuing organization, for example the FAA. If any of the ADC agency Attributes does not match the ADC agency License, then the license is not signed and is returned to the license requestor with an error message. Optionally, if a cryptographically signed ADC agency token has already been issued for an ADC agency License the process aborts. The DMA then uses a cryptographically secure signature algorithm with the DMA private key to produce a cryptographically signed ADC device token. This token includes the ADC user attributes, ADC user license, and the ADC user public key. This token can be verified by any computer with the CSDT but cannot be forged by anyone that does not have the DMA private key(s), which is securely stored and managed by the DMA. Optionally, the DMA stores the cryptographically signed ADC user token into a database, which can later be used to verify messages signed by ADC devices or verify the issued certificates.

The DMA returns the cryptographically signed ADC user token via a secure channel, like an HTTPS Internet connection to the requesting party. The ADC device, or other requesting party, uses a signature verification algorithm to prove the validity of the signature or to handle an error message. The cryptographically signed ADC user token and the corresponding ADC agency private key is then stored in the ADC device.

At block 1205 the DMA may receive data associated with a controller or user of an authoritative command device, the data including a user license, a plurality of user attributes, a user cryptographic public key, and a user cryptographic private key via a secure channel. In certain examples, aspects of the described operations may be performed by DMA authentication component 410 as described with reference to FIG. 4.

At block 1210 the DMA may determine that the user attributes match the user license and that no user token has been previously issued for the user license. In certain examples, aspects of the described operations may be performed by DMA authentication component 410 as described with reference to FIG. 4.

At block 1215 the DMA may generate a cryptographically signed user token including the user attributes, the user license and the user cryptographic public key. In certain examples, aspects of the described operations may be performed by DMA authentication component 410 as described with reference to FIG. 4.

At block 1220 the DMA may send the user token to the controller of the authoritative command device. In certain examples, aspects of the described operations may be performed by DMA authentication component 410 as described with reference to FIG. 4.

Figure 13:
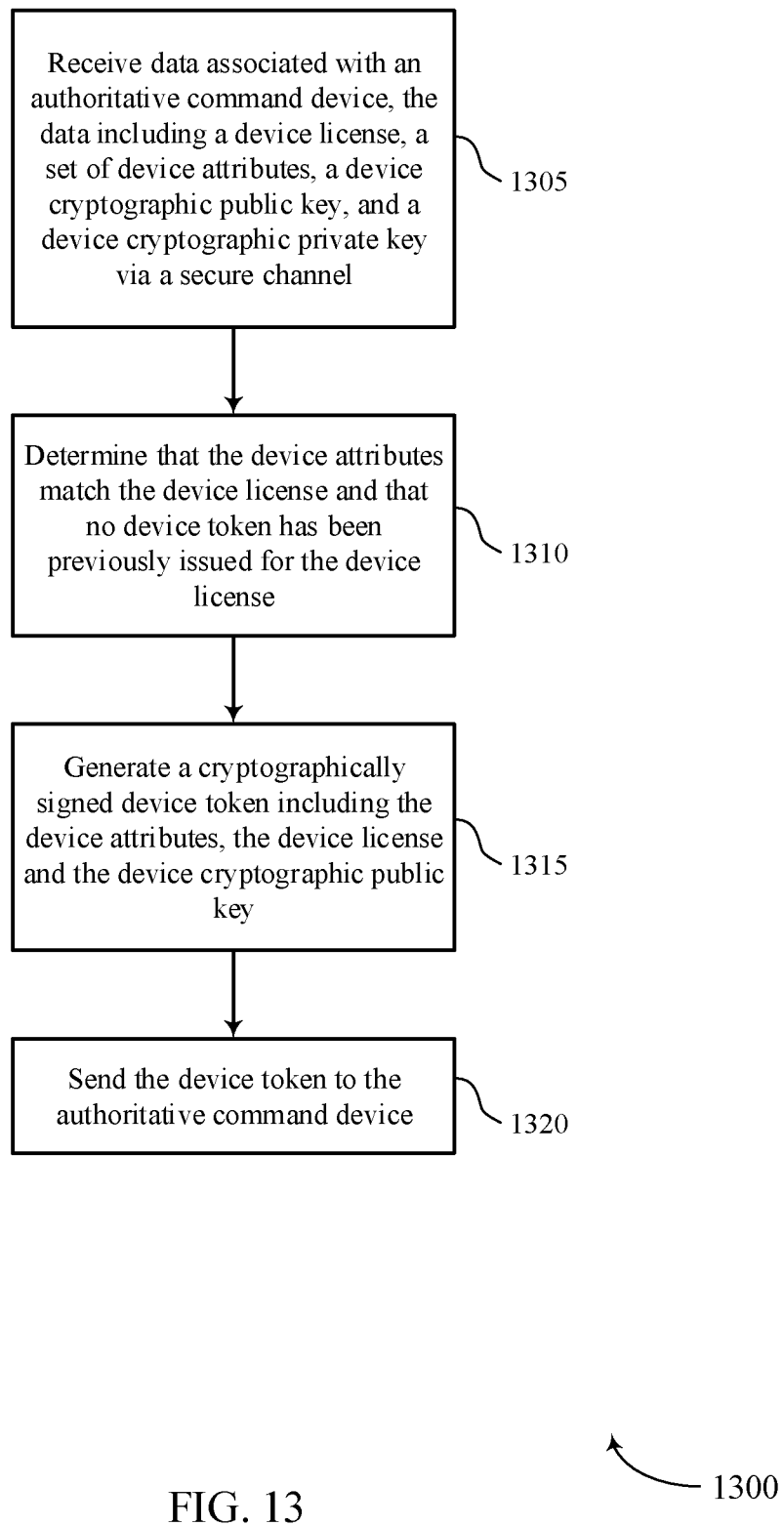

FIG. 13 shows a flowchart 1300 of a process for authentication, authorization and secure communication in accordance with aspects of the present disclosure.

An ADC device license may be a license linked to digital ADC device attributes. The ADC device attributes can include, but are not limited to, the ADC device's agency, the ADC device's home location, and the ADC device's date of manufacture. The ADC device license may include, but is not limited to, a class of license, the expiration date of the license, the issue date of the license, and a unique identifier. The ADC device license should be generated by a trusted third-party organization such as a government agency, the FAA, or an independent organization.

When a new ADC device license is issued, a verification process may be performed (e.g., by a DMA) before secure operation is possible. The ADC device license and ADC device attributes are stored in various locations which could include, but are not limited to, the drone controller, an ADC devices personal PC, or the FAA. A pair of cryptographic keys including a public key and private key are then securely generated for the ADC device. This can be done locally or via a third-party service. The details for generating cryptographic keys is dependent on the cryptographic algorithms later used. Ideally, for the ADC device, the key generation occurs on a local device (the drone controller, a PC owned by the ADC device, or a secure hardware device). However, this process can occur with the license authority or the DMA generating keys. At this point, the ADC device has all generated the necessary information to verify its identity to the DMA and receive a cryptographically signed ADC device token. A cryptographically signed ADC device token is a token that is cryptographically signed and allows for third-parties to verify the DMA signature if they have the CSDT. The cryptographically signed ADC device token also stores the public key for the ADC device enabling two functions. First, the ADC device public key can be used to encrypt data which only someone with the ADC device private key can decrypt. Second, the ADC device private key can be used to sign data which can be verified by the ADC device public key. Only the ADC device private key is able to produce signatures that will be correctly verified by the corresponding ADC device public key.

To receive a cryptographically signed ADC device token the ADC device license, ADC device attributes, and associated public key are sent via a secure channel, such as an HTTPS Internet channel, to the DMA. The DMA verifies the ADC device license and ADC device attributes either locally, if capable, or through the issuing organization, for example the FAA. If any of the ADC device attributes do not match the ADC device license, then the license is not signed and is returned to the license requestor with an error message. Optionally, if a cryptographically signed ADC device token has already been issued for an ADC device license the process aborts. The DMA then uses a cryptographically secure signature algorithm with the DMA private key to produce a cryptographically signed ADC device token. This token includes the ADC device attributes, ADC device license, and the ADC device public key. This token can be verified by any computer with the CSDT but cannot be forged by anyone that does not have the DMA private key(s), which is securely stored and managed by the DMA. Optionally, the DMA stores the cryptographically signed ADC device token into a database that can later be used to verify messages signed by drones or verify the issued certificates.

The DMA returns the cryptographically signed ADC device token via a secure channel, like an HTTPS Internet connection to the requesting party. The ADC device, or other requesting party, uses a signature verification algorithm to prove the validity of the signature or to handle an error message. The cryptographically signed ADC device token and the corresponding ADC device private key is then stored in the ADC device credential.

At block 1305 the DMA may receive data associated with an authoritative command device, the data including a device license, a plurality of device attributes, a device cryptographic public key, and a device cryptographic private key via a secure channel. In certain examples, aspects of the described operations may be performed by DMA authentication component 410 as described with reference to FIG. 4.

At block 1310 the DMA may determine that the device attributes match the device license and that no device token has been previously issued for the device license. In certain examples, aspects of the described operations may be performed by DMA authentication component 410 as described with reference to FIG. 4.

At block 1315 the DMA may generate a cryptographically signed device token including the device attributes, the device license and the device cryptographic public key. In certain examples, aspects of the described operations may be performed by DMA authentication component 410 as described with reference to FIG. 4.

At block 1320 the DMA may send the device token to the authoritative command device. In certain examples, aspects of the described operations may be performed by DMA authentication component 410 as described with reference to FIG. 4.

Figure 14:
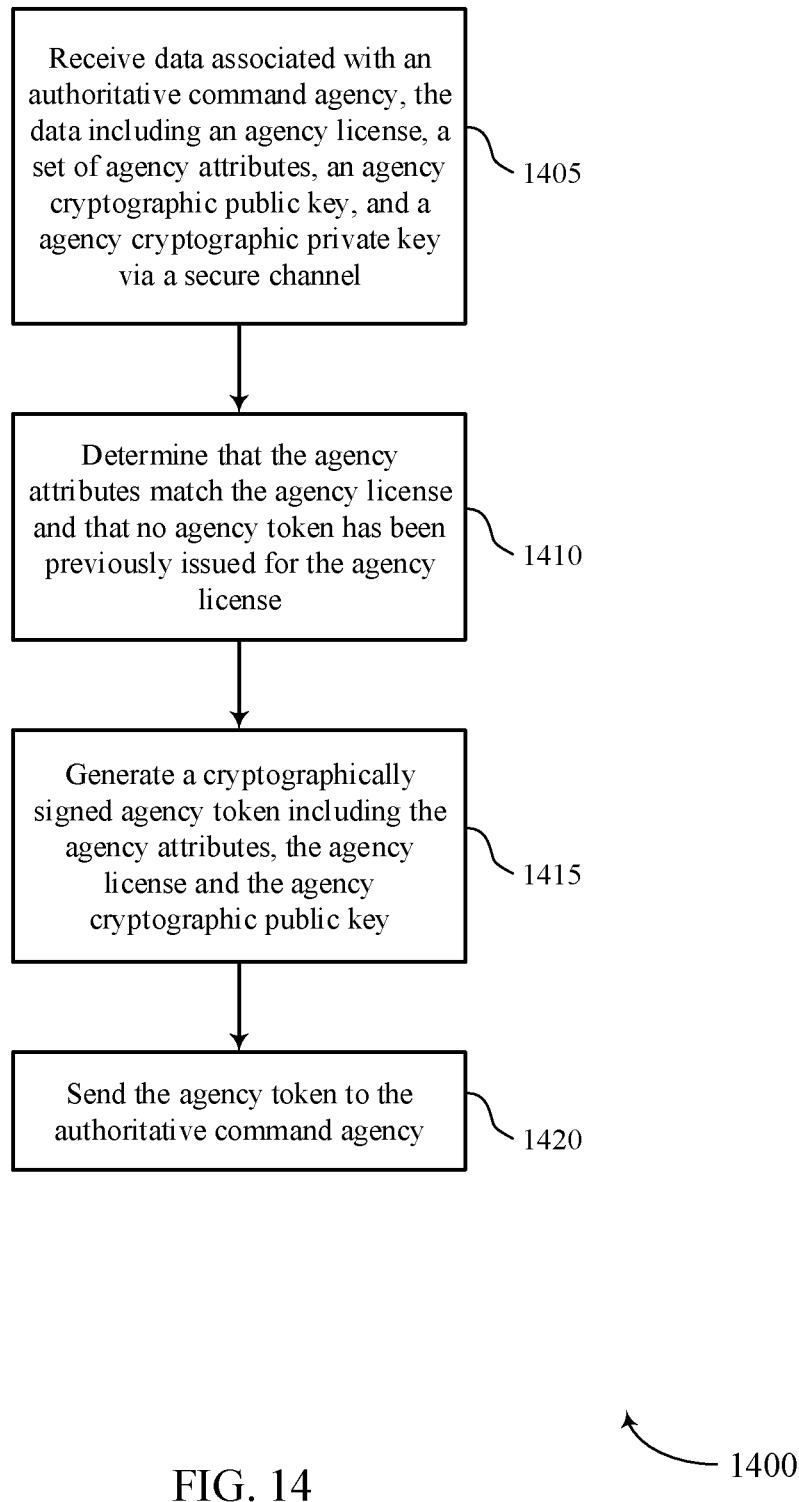

FIG. 14 shows a flowchart 1400 of a process for authentication, authorization and secure communication in accordance with aspects of the present disclosure.

We define the ADC agency license as a license linked to digital ADC agency attributes. The ADC agency attributes can include, but are not limited to, the ADC agency's name and the ADC agency's address. The ADC agency license may include, but is not limited to, a class of license, the expiration date of the license, the issue date of the license, and a unique identifier. ADC agency license should be generated by a trusted third-party organization such as a government agency, for example the Federal Aviation Administration, or an independent organization.

When a new ADC agency license is issued, a verification process may be performed (e.g., by a DMA) before secure operation is possible. The ADC agency license and ADC agency attributes are stored in various locations which could include, but is not limited to, the ADC device, an ADC device owner's personal PC, or the FAA. A pair of cryptographic keys including a public key and private key are securely generated for the ADC agency. This can be done locally or via a third-party service. The details for generating cryptographic keys is dependent on the cryptographic algorithms later used. Ideally, the key generation occurs on a local device (the ADC device, a PC owned by the ADC agency Operator, or a secure hardware device). However, this process can occur with the license authority or the DMA generating keys. At this point, the ADC agency has generated the necessary information to verify its identity to the DMA and receive a cryptographically signed ADC agency token.

A cryptographically signed ADC agency token is a token that is cryptographically signed and allows for third-parties to verify the DMA signature if they have the CSDT. The cryptographically signed ADC agency token also stores the public key for the ADC agency enabling two functions. First, the ADC user public key can be used to encrypt data which only someone with the ADC user private key can decrypt. Second, the ADC agency private key can be used to sign data which can be verified by the ADC agency public key. Only the ADC agency private key is able to produce signatures that will be correctly verified by the corresponding ADC agency public key.

To receive a cryptographically signed ADC agency token the ADC agency license, ADC agency attributes, and associated public key are sent via a secure channel, such as an HTTPS Internet channel, to the DMA. The DMA verifies the ADC agency license and ADC agency attributes either locally, if capable, or through the issuing organization, for example the FAA. If any of the ADC agency attributes does not match the ADC agency license, then the license is not signed and is returned to the license requestor with an error message. These error messages can be displayed to the user via, amongst other ways, the user's smartphone, drone video display, or sent to the user via SMS depending on the application. Optionally, if a cryptographically signed ADC agency token has already been issued for an ADC agency license the process aborts. The DMA then uses a cryptographically secure signature algorithm with the DMA private key to produce a cryptographically signed ADC agency token. This token includes the ADC agency attributes, ADC agency license, and the ADC agency public key. This token can be verified by any computer with the CSDT but cannot be forged by anyone that does not have the DMA private key(s), which is securely stored and managed by the DMA. Optionally, the DMA stores the cryptographically signed ADC agency token into a database, that can later be used to verify messages signed by ADC agency or verify the issued certificates.

The DMA returns the cryptographically signed ADC agency token via a secure channel, like an HTTPS Internet connection to the requesting party. The ADC agency, or other requesting party, uses a signature verification algorithm to prove the validity of the signature or to handle an error message. The cryptographically signed ADC agency token and the corresponding ADC agency private key is then stored in the ADC agency.

At block 1405 the DMA may receive data associated with an authoritative command agency, the data including an agency license, a plurality of agency attributes, an agency cryptographic public key, and an agency cryptographic private key via a secure channel. In certain examples, aspects of the described operations may be performed by DMA authentication component 410 as described with reference to FIG. 4.

At block 1410 the DMA may determine that the agency attributes match the agency license and that no agency token has been previously issued for the agency license. In certain examples, aspects of the described operations may be performed by DMA authentication component 410 as described with reference to FIG. 4.

At block 1415 the DMA may generate a cryptographically signed agency token including the agency attributes, the agency license and the agency cryptographic public key. In certain examples, aspects of the described operations may be performed by DMA authentication component 410 as described with reference to FIG. 4.

At block 1420 the DMA may send the agency token to the authoritative command agency. In certain examples, aspects of the described operations may be performed by DMA authentication component 410 as described with reference to FIG. 4.

Figure 15:
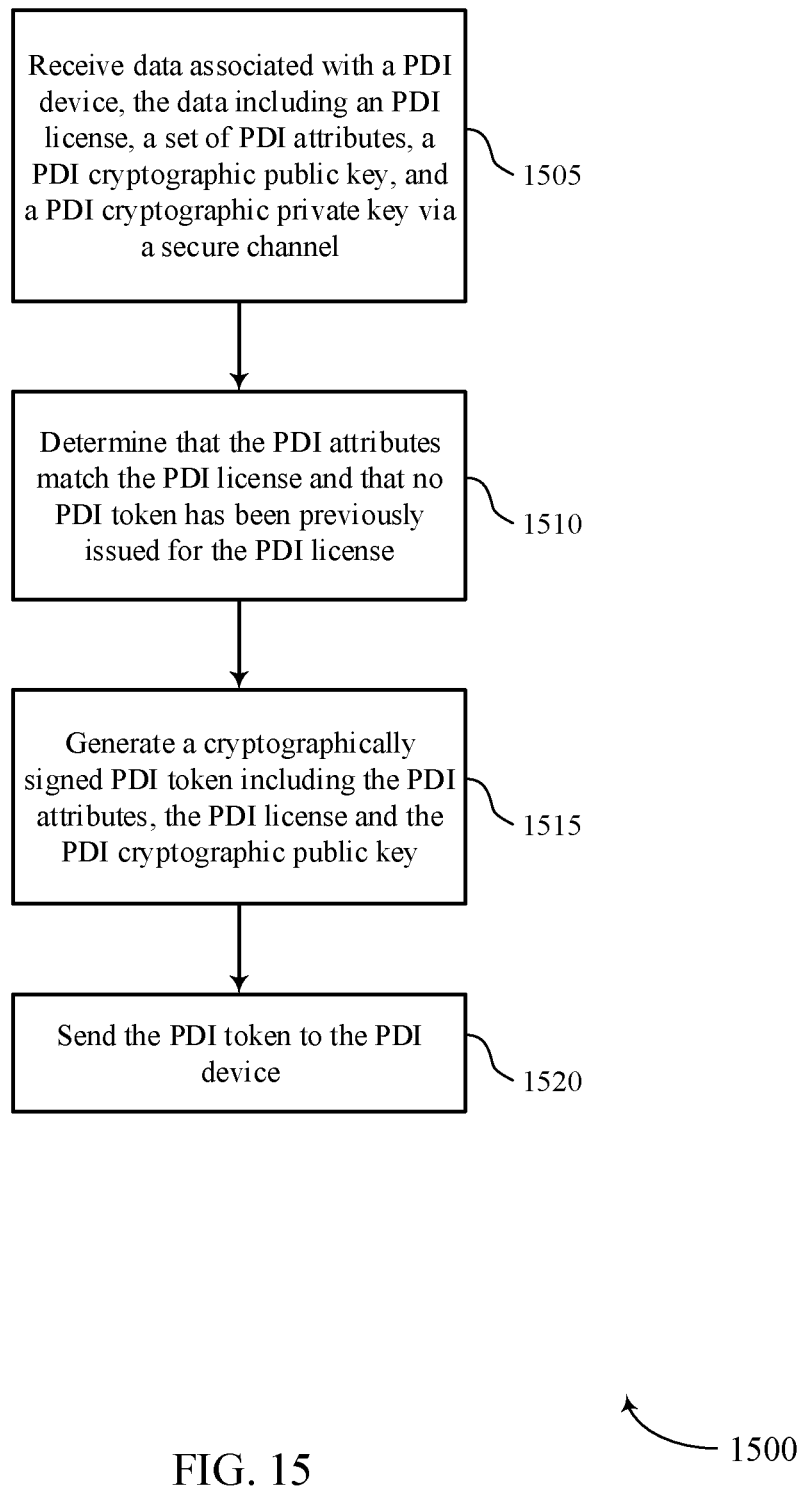

FIG. 15 shows a flowchart 1500 of a process for authentication, authorization and secure communication in accordance with aspects of the present disclosure.

At block 1505 the DMA may receive data associated with a PDI device, the data including an PDI license, a plurality of PDI attributes, a PDI cryptographic public key, and a PDI cryptographic private key via a secure channel. In certain examples, aspects of the described operations may be performed by DMA authentication component 410 as described with reference to FIG. 4.

At block 1510 the DMA may determine that the PDI attributes match the PDI license and that no PDI token has been previously issued for the PDI license. In certain examples, aspects of the described operations may be performed by DMA authentication component 410 as described with reference to FIG. 4.

At block 1515 the DMA may generate a cryptographically signed PDI token including the PDI attributes, the PDI license and the PDI cryptographic public key. In certain examples, aspects of the described operations may be performed by DMA authentication component 410 as described with reference to FIG. 4.

At block 1520 the DMA may send the PDI token to the PDI device. In certain examples, aspects of the described operations may be performed by DMA authentication component 410 as described with reference to FIG. 4.

Figure 16:
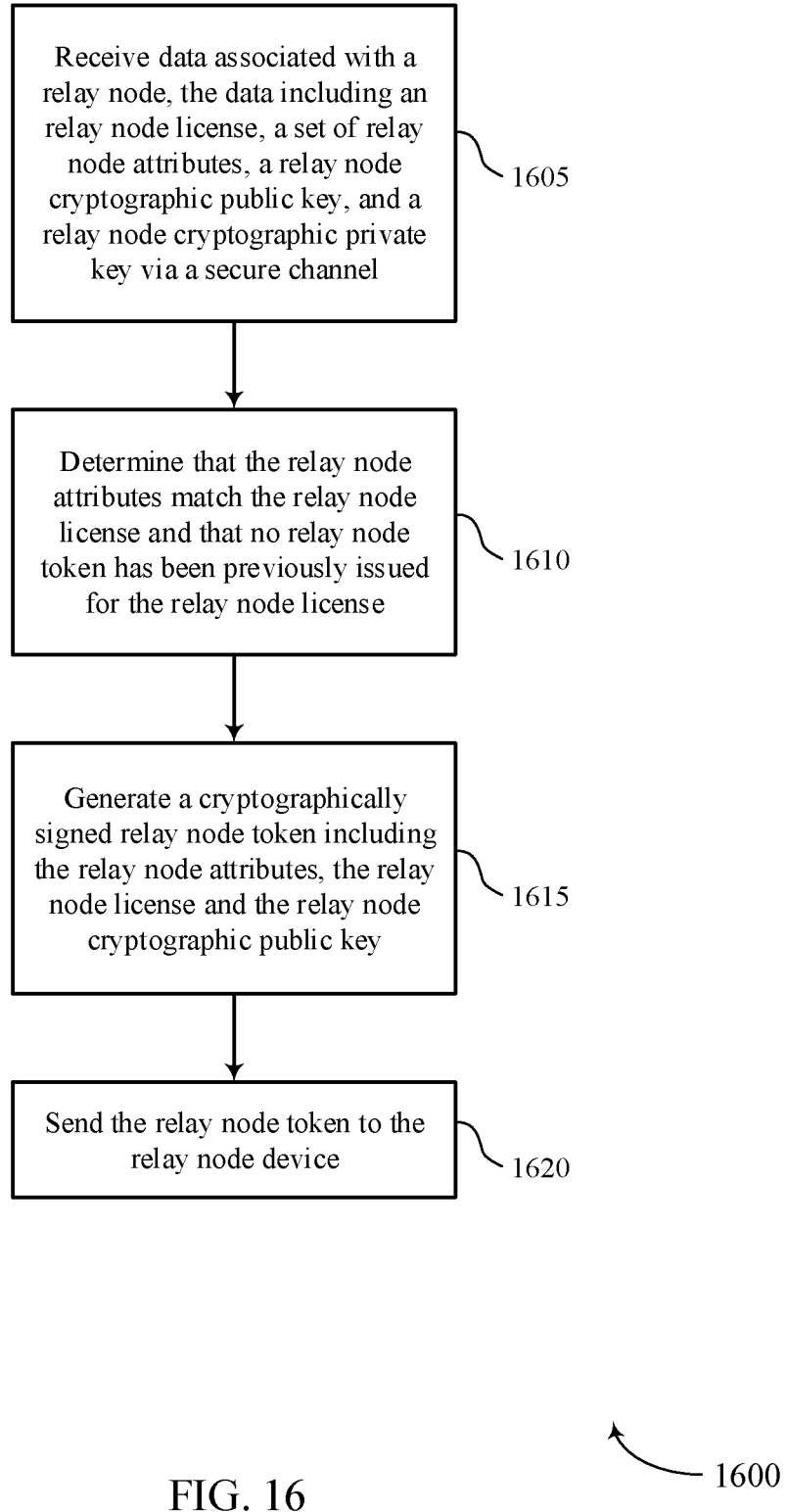

FIG. 16 shows a flowchart 1600 of a process for authentication, authorization and secure communication in accordance with aspects of the present disclosure.

At block 1605 the DMA may receive data associated with a relay node, the data including a relay node license, a plurality of relay node attributes, a relay node cryptographic public key, and a relay node cryptographic private key via a secure channel. In certain examples, aspects of the described operations may be performed by DMA authentication component 410 as described with reference to FIG. 4.

At block 1610 the DMA may determine that the relay node attributes match the relay node license and that no relay node token has been previously issued for the relay node license. In certain examples, aspects of the described operations may be performed by DMA authentication component 410 as described with reference to FIG. 4.

At block 1615 the DMA may generate a cryptographically signed relay node token including the relay node attributes, the relay node license and the relay node cryptographic public key. In certain examples, aspects of the described operations may be performed by DMA authentication component 410 as described with reference to FIG. 4.

At block 1620 the DMA may send the relay node token to the relay node device. In certain examples, aspects of the described operations may be performed by DMA authentication component 410 as described with reference to FIG. 4.

Figure 17:
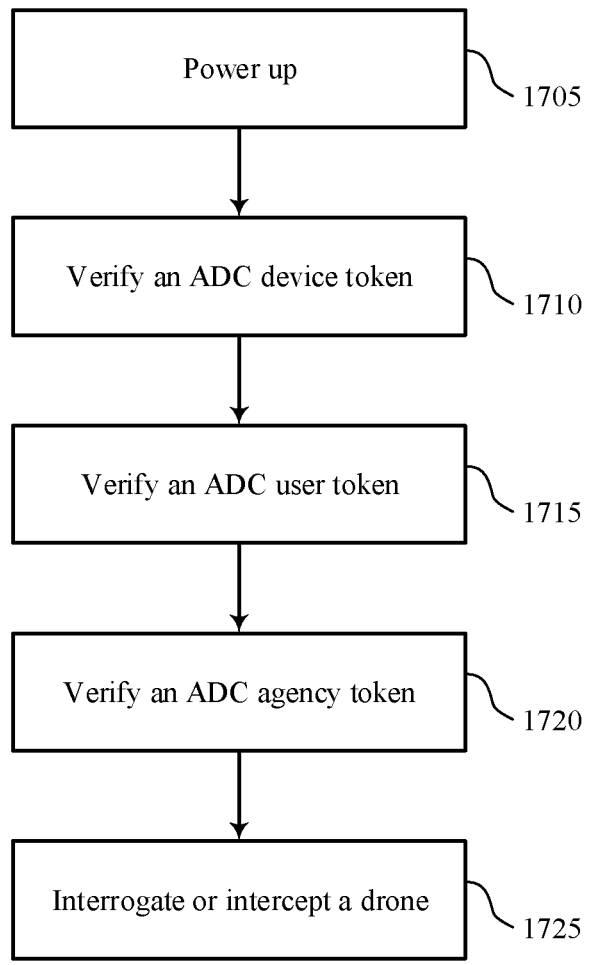

FIG. 17 shows a flowchart 1700 of a process for authentication, authorization and secure communication in accordance with aspects of the present disclosure. In some examples, an ADC device may execute a set of codes to control functional elements of the ADC device to perform the described functions. Additionally or alternatively, an ADC device may use special-purpose hardware.

An ADC device may validate device, agency, and user credentials. For a valid verification on start-up, cryptographically signed tokens may be contained for the ADC device, ADC agency, and ADC user. The ADC agency credentials including the cryptographically signed ADC agency token and the ADC agency private key may be stored in software or hardware with local communications to the ADC device. Similarly, the ADC user credentials—including the cryptographically signed ADC user token and the ADC user private key—may be stored in software or hardware with local communications to the ADC device. For example, the software solution could be a trusted piece of code while the hardware solution could be a secure USB dongle; the exact implementation of the storage of agency and user credentials is left to the specific implementation. We also assume that the ADC device has the cryptographically signed DMA token.

On power-up, the ADC device may verify the device token, agency token, and user token before it begins normal operation. To verify the ADC device token, the device prepares a cryptographic response based on verification data and the ADC device private key. The verification data can be a random nonce, a copy of the cryptographically signed ADC device token, a timestamp, a combination thereof, or any digital data. An example cryptographic response, would be signing the verification data with the private key. This is then passed to a cryptographic verification algorithm which uses the ADC device's public key to verify the responses validity. If the cryptographically signed ADC device token is not included in the response, the ADC public key may be passed separately to the verification algorithm.

The cryptographically signed ADC device token is also passed to the device licenses verification process either as the output of the signature verification process or separately. The device license verification process uses DMA public key in the CSDT to verify the signature on the cryptographically signed ADC device token is a valid DMA signature. It then verifies selected attributes from the ADC device license and ADC device token. These could include, but are not limited to, a valid license date and the license not appearing on the revoked license list. If any of the verifications fail, the device enters a failsafe mode which may include, but is not limited to, displaying an error message and ceasing operations.

If the device level verifications pass, the device then verifies the validity of the ADC user credentials. The ADC device prepares verification data which can be a random nonce or any other type of digital data and sends it via the local link to the ADC user credential. It may then be combined with the cryptographically signed ADC user token or may directly be passed to the cryptographic user response algorithm. This algorithm prepares a cryptographic response using the ADC user private key and then returns it to the ADC device. If the cryptographically signed ADC user token is not included in the cryptographic user response, then it may also be passed to the ADC device. The ADC device then verifies the user response using the ADC user public key. The cryptographically signed ADC user token is then verified. This includes verifying the DMA signature, user license attributes, and user information attributes. If any of the verifications fail, the device enters a failsafe mode which may include, but is not limited to, displaying an error message and ceasing operations. If the device is a user-free device, the user signature and license verification is not used.

If the user level verifications pass, the device then verifies the validity of the ADC agency credentials. The ADC device prepares verification data, which can be a random nonce or any other type of digital data and sends it via the local link to the ADC agency credential. It may then be combined with the cryptographically signed ADC agency token or may directly be passed to the agency response algorithm. This algorithm prepares a cryptographic response using the ADC agency private key and then returns it to the ADC device.

If the cryptographically signed ADC agency token is not included in the signed data then it may also be passed to the ADC device. The ADC device then verifies the agency response using the ADC agency public key. The cryptographically signed ADC agency token is then passed to verify the agency license. This includes verifying the DMA signature, user license attributes, and user information attributes. If any of the verifications fail, the device enters a failsafe mode which may include, but is not limited to, displaying an error message and ceasing operations. If the device is an agency-free device, the user signature and license verification is not used. If the necessary signature and license verifications finish, the ADC device enters a nominal operation mode. This then allows the ADC to interrogate or intercept drones.

At block 1705 the ADC device may power up. In certain examples, aspects of the described operations may be performed by ADC device 120 and 505 as described with reference to FIGS. 1 and 5.

At block 1710 the ADC device may verify an ADC device token. In certain examples, aspects of the described operations may be performed by ADC device authentication component 510 as described with reference to FIG. 5.

At block 1715 the ADC device may verify an ADC user token. In certain examples, aspects of the described operations may be performed by ADC device authentication component 510 as described with reference to FIG. 5.

At block 1720 the ADC device may verify an ADC agency token. In certain examples, aspects of the described operations may be performed by ADC device authentication component 510 as described with reference to FIG. 5.

At block 1725 the ADC device may interrogate or intercept a drone. In certain examples, aspects of the described operations may be performed by ADC device 120 and 505 as described with reference to FIGS. 1 and 5.

Figure 18:
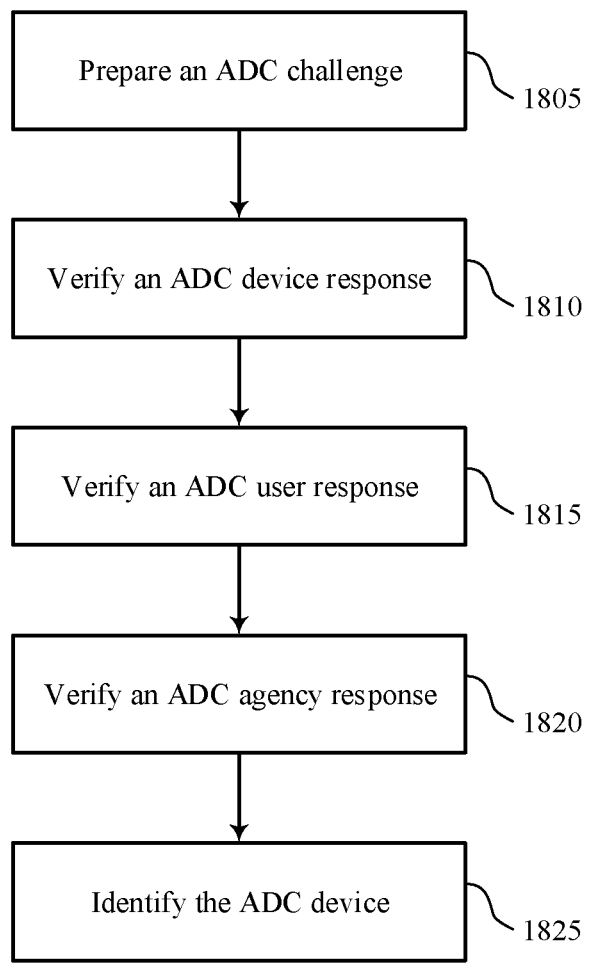

FIG. 18 shows a flowchart 1800 of a process for authentication, authorization and secure communication in accordance with aspects of the present disclosure. In some examples, a CPV may execute a set of codes to control functional elements of the CPV to perform the described functions. Additionally or alternatively, a CPV may use special-purpose hardware.

A drone/CPV may verify the validity of an ADC device. This includes verifying the device credential, user credential, and agency credential associated with the ADC. The ADC user credentials including the cryptographically signed ADC agency token may be stored in software or hardware with local communications to the ADC device. Similarly, the ADC agency credentials including the cryptographically signed ADC user token may be stored in software or hardware with local communications to the ADC device. For example, the software solution could be a trusted piece of code while the hardware solution could be a secure USB dongle; the exact implementation of the agency and user credentials is left to the specific implementation. We also assume that the drone has access to the cryptographically signed DMA token.

When a drone/CPV desires to prove the identity of an ADC device the drone/CPV first prepares a piece of digital data, hereafter referred to as a challenge. The challenge may be constructed using various parameters like the GPS coordinates of the drone/CPV, the current time, or a random number. The challenge is sent from the drone/CPV to the ADC device. Upon receiving the challenge from the drone, the ADC device sends it to both the ADC agency credential and ADC user credential. Within the ADC user credential, the challenge and the cryptographically signed ADC user token are combined. The ADC user credential then uses the combined data to prepare a cryptographic response using the ADC user private key. This response is then returned to the ADC device.

Similarly, within the ADC agency credential, the challenge and the cryptographically signed ADC agency token are combined. The ADC agency credential uses the combined data to prepares a cryptographic response using the ADC user private key. This response is then returned to the ADC device.

At the same time, the ADC device combines the challenge and the cryptographically signed ADC device token. This combined data is then used to prepare an authenticated cryptographic response with the ADC device private key. The authenticated device response, the authenticated agency response, and the authenticated user response are combined and returned to the drone. Upon receiving the response from the ADC device, the drone/CPV verifies the ADC device's response with the CSDT. Similarly, the user response and agency response are verified. If all of the verifications are validated, the ADC device has proven its identity. For each response the verification has various checks which may include, but is not limited to, the following: verifying the tokens signature is valid using the DMA public key(s); verifying the signature on the response using the corresponding tokens public key; verifying the token has not been revoked; and verifying the license is not expired.

At block 1805 the CPV may prepare an ADC challenge. In certain examples, aspects of the described operations may be performed by drone authentication component 310 as described with reference to FIG. 3.

At block 1810 the CPV may verify an ADC device response. In certain examples, aspects of the described operations may be performed by drone authentication component 310 as described with reference to FIG. 3.

At block 1815 the CPV may verify an ADC user response. In certain examples, aspects of the described operations may be performed by drone authentication component 310 as described with reference to FIG. 3.

At block 1820 the CPV may verify an ADC agency response. In certain examples, aspects of the described operations may be performed by drone authentication component 310 as described with reference to FIG. 3.

At block 1825 the CPV may identify the ADC device. In certain examples, aspects of the described operations may be performed by drone authentication component 310 as described with reference to FIG. 3.

Figure 19:
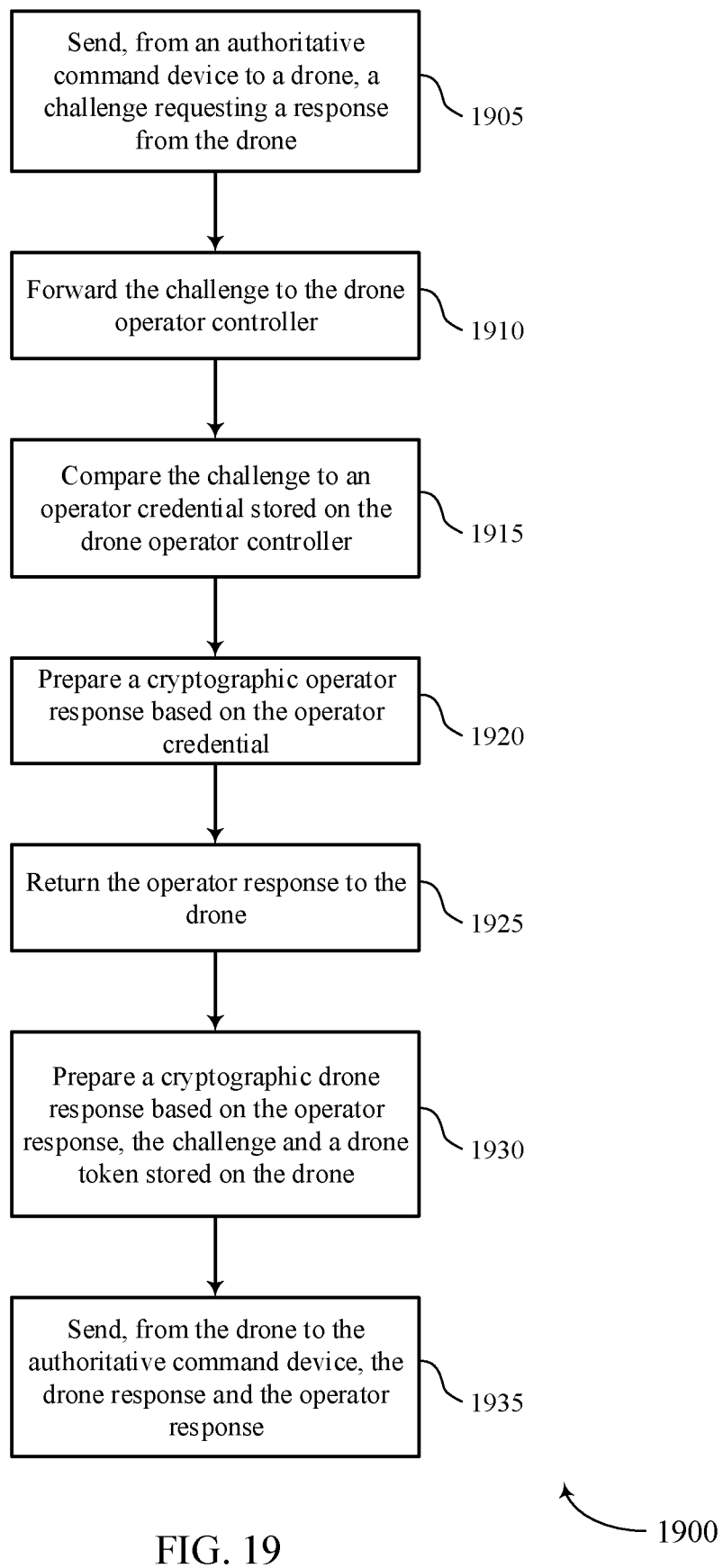

FIG. 19 shows a flowchart 1900 of a process for authentication, authorization and secure communication in accordance with aspects of the present disclosure.

An ADC device may interrogate one or more operating drones for their license information. The ADC device makes a clear text interrogatory (challenge) for identification which includes a piece of digital data, hereafter referred to as a challenge, and a definition of drones that are mandated to respond. The challenge could be a random number, a timestamp, or any other piece of digital data. The mandated response definition may use, but is not limited to, drone IDs, a drone operator IDs, license class, or all drones/CPVs. All drones/CPVs that receive the interrogatory check to see if they are in the set of drones/CPVs that are mandated to respond. If a drone/CPV is in the set of mandated responders it will send a message to the drone operator's display, if applicable, indicating a request has occurred. If a drone/CPV is in the set of mandated responders it also verifies the credentials of the ADC device using the process shown in FIG. 7. If any of the credentials do not verify, the drone sends this information to the user display and the user can choose whether to continue cooperation. If all of the credentials are valid, the drone/CPV then prepares a response to the interrogatory without user approval, although user notification can occur.

The challenge is forwarded to the drone/CPV operator credential and combined with the cryptographically signed drone operator token. A cryptographic response based on this token is then prepared using the drone operator private key and returned to the drone. On the drone/CPV, a cryptographic response based on the challenge is also prepared using the cryptographically signed drone token. The two responses are then sent to the ADC device which cryptographically verifies its validity. This information may then be displayed to the ADC user and may be stored in a database for future use.

At block 1905 the authoritative command device may send to a drone/CPV, a challenge requesting a response from the drone. In certain examples, aspects of the described operations may be performed by ADC device 120 and 505 as described with reference to FIGS. 1 and 5.

At block 1910 the CPV may forward the challenge to the drone/CPV operator controller. In certain examples, aspects of the described operations may be performed by CPV 105, 305, and 2410 as described with reference to FIGS. 1, 3, and 24.

At block 1915 the CPV operator controller may compare the challenge to an operator credential stored on the drone operator controller. In certain examples, aspects of the described operations may be performed by CPV operator 110 as described with reference to FIG. 1.

At block 1920 the CPV operator controller may prepare a cryptographic operator response based on the operator credential. In certain examples, aspects of the described operations may be performed by CPV operator 110 as described with reference to FIG. 1.

At block 1925 the CPV operator controller may return the operator response to the drone. In certain examples, aspects of the described operations may be performed by CPV operator 110 as described with reference to FIG. 1.

At block 1930 the CPV may prepare a cryptographic drone response based on the operator response, the challenge and a drone token stored on the drone/CPV. In certain examples, aspects of the described operations may be performed by CPV 105, 305, and 2410 as described with reference to FIGS. 1, 3, and 24.

At block 1935 the drone/CPV may send, to the authoritative command device, the drone/CPV response and the operator response. In certain examples, aspects of the described operations may be performed by CPV 105, 305, and 2410 as described with reference to FIGS. 1, 3, and 24.

Figure 20:
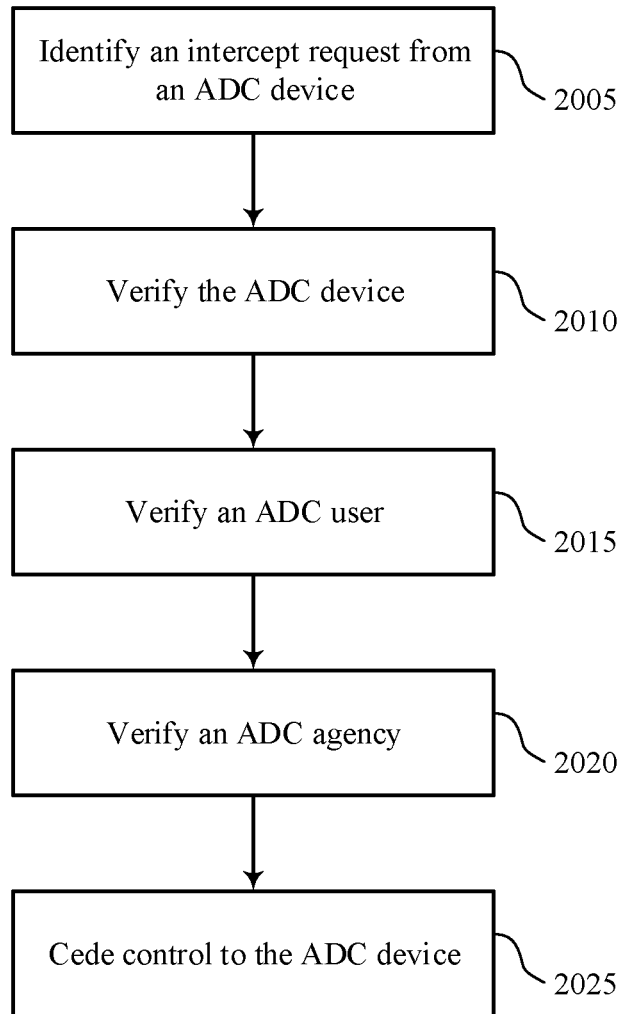

FIG. 20 shows a flowchart 2000 of a process for authentication, authorization and secure communication in accordance with aspects of the present disclosure. In some examples, a CPV may execute a set of codes to control functional elements of the CPV to perform the described functions. Additionally or alternatively, a CPV may use special-purpose hardware.

An ADC device may intercept a drone/CPV that is previously flying autonomously or being remotely controlled. The ADC device prepares an intercept request which includes a mandated intercept definition. The intercept request is then sent wirelessly to the drone which checks the mandated intercept definition. If the drone/CPV is contained in the mandated intercept definition, then it proceeds with the intercept process. The CPV may verify the ADC device, ADC user, and ADC agency. Upon successful verification of the ADC device, ADC user, and ADC agency, the drone/CPV prepares a message indicating it is ceding control to the ADC device. This message is sent to the drone user's display along with the agency information, allowing for a drone/CPV operator to immediately file a complaint if they believe the control takeover was illegitimate.

The message is also forwarded to the ADC device indicating that control has been ceded. At this point, the ADC device prepares control input that it can send to operate the drone/CPV. Any messages received from the drone operator controller will be ignored by the intercepted drone/CPV. The drone/CPV cedes control of flight operations and retain control of other functions. This allows for a continued feedback to users of the location and sensor feeds from the drone to avoid inappropriate actions of capturing agencies. Furthermore, all authenticated control input received from the ADC device are forwarded to the user's display allowing for tracking the ADC agencies control of the drone/CPV. At any point that the ADC device desires to return control to the nominal drone operator controller they can release control and nominal drone operator will be notified via the user's display or other method.

At block 2005 the CPV may identify an intercept request from an ADC device. In certain examples, aspects of the described operations may be performed by CPV 105, 305, and 2410 as described with reference to FIGS. 1, 3, and 24.

At block 2010 the CPV may verify the ADC device. In certain examples, aspects of the described operations may be performed by drone authentication component 310 as described with reference to FIG. 3.

At block 2015 the CPV may verify an ADC user. In certain examples, aspects of the described operations may be performed by drone authentication component 310 as described with reference to FIG. 3.

At block 2020 the CPV may verify an ADC agency. In certain examples, aspects of the described operations may be performed by drone authentication component 310 as described with reference to FIG. 3.

At block 2025 the CPV may cede control to the ADC device. In certain examples, aspects of the described operations may be performed by CPV 105, 305, and 2410 as described with reference to FIGS. 1, 3, and 24.

Figure 21:
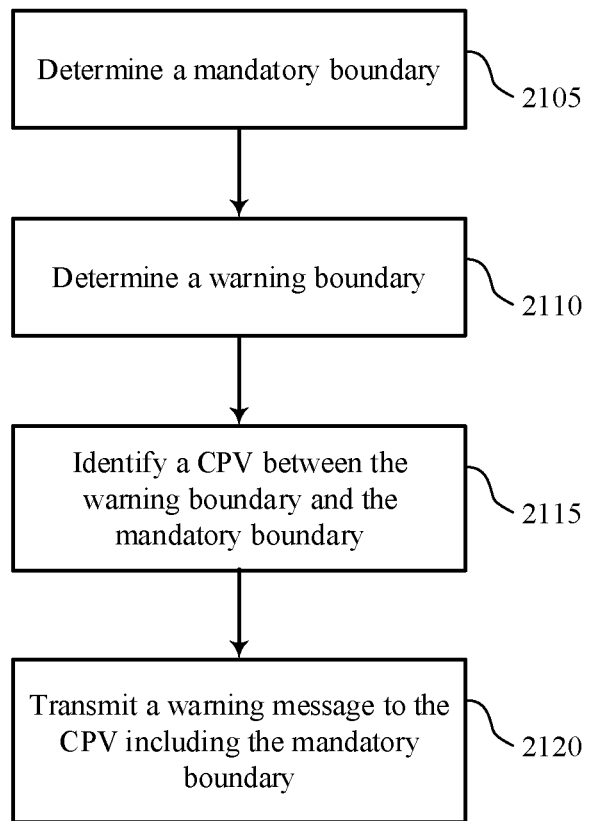

FIG. 21 shows a flowchart 2100 of a process for authentication, authorization and secure communication in accordance with aspects of the present disclosure. In some examples, an ADC device may execute a set of codes to control functional elements of the ADC device to perform the described functions. Additionally or alternatively, an ADC device may use special-purpose hardware.

An ADC device may provide a geographic boundary for drones/CPVs. The ADC device is programmed with a boundary, hereafter known as the mandatory boundary, that can be defined with fixed coordinates or with a radius around a GPS-equipped ADC device. The boundary can also be defined using various algorithms left to specific implementations. The drone/CPV is also programmed with a "safety factor" (e.g. a defined buffer zone) which defines a second, larger boundary, hereafter known as the warning boundary.

If the ADC device detects a drone/CPV between the warning boundary and mandatory boundary it prepares a warning for the drone/CPV. The warning message includes, but is not limited to, a definition of the mandatory boundary. If desired, the drone/CPV can verify the ADC device's validity. The drone/CPV can use the warning message to navigate safely around the boundary. The drone/CPV can also send a "detour" request to the ADC device. The detour request includes, but is not limited to, the drone's current position and desired waypoint. The ADC device will reply to detour requests with a new route, using various mapping techniques, for the drone/CPV that safely navigates around the mandatory boundary. When a drone/CPV passes the warning boundary, a message will also be sent to the drone operator's display making sure the operator is aware of the potential violation.

If the ADC device detects a drone/CPV within the mandatory boundary, it may send an intercept request to the drone. The drone/CPV, after verifying the ADC device's validity, then cedes control to the ADC device. The ADC device can take various automated approaches to mitigate the drone intrusion including, but not limited to, RTL, Reroute, or Send to Capture Point. RTL would send the drone back to the operator where the drone/CPV was launched. Reroute would direct the drone/CPV outside of the mandatory boundary. Send to Capture Point would land the drone at a predefined safe location. Upon ceding control, a message is sent to the drone/CPV operator's display for a user to track the captured drone/CPV.

At block 2105 the ADC device may determine a mandatory boundary. In certain examples, aspects of the described operations may be performed by geofence component 535 as described with reference to FIG. 5.

At block 2110 the ADC device may determine a warning boundary. In certain examples, aspects of the described operations may be performed by geofence component 535 as described with reference to FIG. 5.

At block 2115 the ADC device may identify a CPV between the warning boundary and the mandatory boundary. In certain examples, aspects of the described operations may be performed by geofence component 535 as described with reference to FIG. 5.

At block 2120 the ADC device may transmit a warning message to the CPV including the mandatory boundary. In certain examples, aspects of the described operations may be performed by geofence component 535 as described with reference to FIG. 5.

Figure 22:
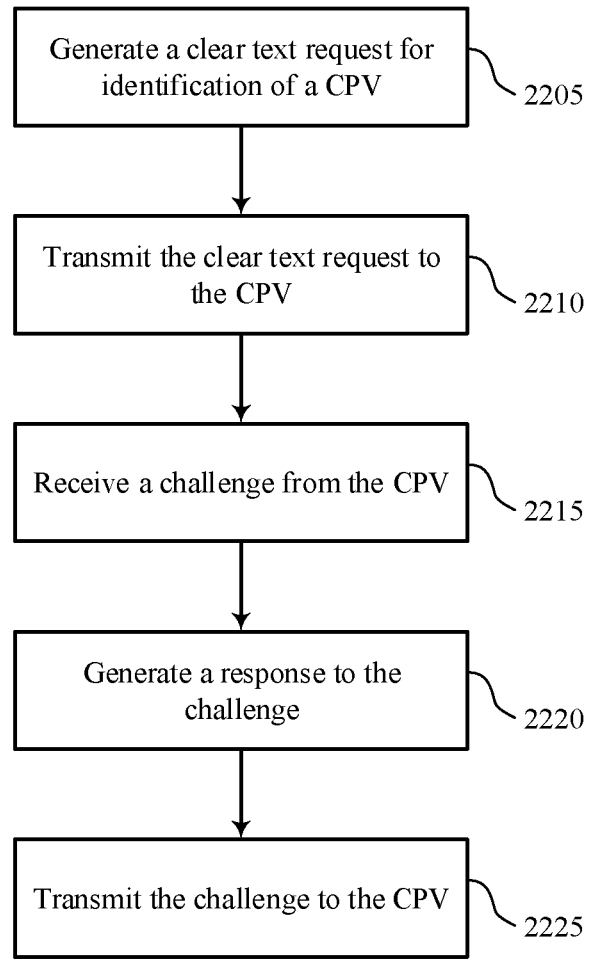

FIG. 22 shows a flowchart 2200 of a process for authentication, authorization and secure communication in accordance with aspects of the present disclosure. In some examples, a PDI device may execute a set of codes to control functional elements of the PDI device to perform the described functions. Additionally or alternatively, a PDI device may use special-purpose hardware.

A DMA may verify the identity of a PDI device as well as issuing a cryptographic token that can later be used to authenticate its license. The DMA can be a public or private entity with a public key distribution system as well as secure private key(s). A cyber-physical vehicle management system includes verification components similar to the distribution system for digital rights management or digital certificate authorities. A DMA can be implemented to support a public key cryptographic scheme that is extensible to a large number of end-users, a revocation scheme that allows for informing end-users of cryptographic tokens that are no longer trusted, and a generation and issuing of scheme for verifiable CSDTs.

The CSDT is a token that is cryptographically signed by the DMA and includes information about the DMA as well as public key(s) from the DMA. The information the CSDT may include, but is not limited to, the cryptographic schemes used and necessary protocols or parameters. In a cyber-physical vehicle management system, the CSDT and all protocols for the DMA public key scheme are pre-installed, pre-distributed, or pinned to the PDI in a secure manner. The CSDT may be stored in software or with trusted hardware modules. Regardless, the CSDT, and corresponding algorithms, may be installed such that the processor that verifies credentials, can securely access it. Distribution of the CSDT should, ideally, be secure, which can be accomplished in software or hardware using various schemes, not discussed here.

A PDI device license may be a license linked to digital PDI device attributes. The PDI device attributes can include, but are not limited to, the PDI device's name, the PDI device's home location, and the PDI device's date of birth. The PDI device license may include, but is not limited to, a class of license, the expiration date of the license, the issue date of the license, and a unique identifier. The PDI device license should be generated by a trusted third-party organization such as a government agency, for example the Federal Aviation Administration, or an independent organization.

When a new PDI device license is issued a verification process may be performed (e.g., by a DMA) before secure operation is possible. The PDI device license and PDI device attributes are stored in various locations which could include, but is not limited to, on or external to the PDI device. A pair of cryptographic keys including a public key and private key are then securely generated for the PDI device. This can be done locally or via a third-party service. The details for generating cryptographic keys is dependent on the cryptographic algorithms later used. Ideally, for the PDI device, the key generation occurs on a local device (a PC owned by the PDI device owner, or a secure hardware device). However, this process can occur with the license authority or the DMA generating keys. At this point, the PDI device has all generated the necessary information to verify its identity to the DMA and receive a cryptographically signed PDI device token.

A cryptographically signed PDI device token is a token that is cryptographically signed and allows for third-parties to verify the DMA signature if they have the CSDT. The cryptographically signed PDI device token also stores the public key for the PDI device enabling two functions. First, the PDI device public key can be used to encrypt data that someone with the PDI device private key can decrypt. Second, the PDI device private key can be used to sign data which can be verified by the PDI device public key. The PDI device private key is able to produce signatures that will be correctly verified by the corresponding PDI device public key.

To receive a cryptographically signed PDI device token the PDI device license, PDI device attributes, and associated public key are sent via a secure channel, such as an HTTPS Internet channel, to the DMA. The DMA verifies the PDI device license and PDI device attributes either locally, if capable, or through the issuing organization, for example the FAA. If any of the PDI device attributes does not match the PDI device license then the license is not signed and is returned to the license requestor with an error message. Optionally, if a cryptographically signed PDI device token has already been issued for a PDI device license the process aborts. The DMA then uses a cryptographically secure signature algorithm with the DMA private key to produce a cryptographically signed PDI device token. This token includes the PDI device attributes, PDI device license, and the PDI device public key. This token can be verified by any computer with the CSDT but cannot be forged by anyone that does not have the DMA private key(s), which is securely stored and managed by the DMA. Optionally, the DMA stores the cryptographically signed PDI device token into a database, that can later be used to verify messages signed by the PDI device or verify the issued certificates. The DMA returns the cryptographically signed PDI device token via a secure channel, like an HTTPS Internet connection to the requesting party. The PDI device, or other requesting party, uses a signature verification algorithm to prove the validity of the signature or to handle an error message. The cryptographically signed PDI device token and the corresponding PDI device private key is then stored in the PDI device credential.

A PDI device may request the license information from an operating drone. The cryptographically signed drone, drone operator, and PDI tokens may have been distributed, and communications between the controller and drone are authenticated and, optionally, encrypted. On power-up, the PDI device verifies the cryptographically signed PDI token. If this verification fails, the PDI device will enter a failure mode. The failure mode could include, but is not limited to, displaying an error to the operator on the drone/CPV operator's controller.

The PDI device makes a clear text request to the drone for an identification which includes a challenge. The challenge could consist of a random number or various other pieces of digital data. The drone may first verify the PDI device's license before complying with the request. To accomplish this, the drone sends a challenge request (random number or other digital data) to the PDI device. The PDI prepares a cryptographic response based on the combination of the challenge and the cryptographically signed PDI token and returns it to the drone. The drone verifies the PDI token validity and that the credential has not been revoked. The drone sends a visual to the user display indicating a PDI identification request has been made. This may include, but is not limited to, the user name, contact information, the PDI user ID, and PDI property boundaries. The random number from is forwarded to the drone operator credential.

Since PDI requests are not mandatory interrogations, a drone operator may decide whether to comply. Compliance can be manually approved by the user after receiving the request on the user's display. A user may desire to comply with requests to garner goodwill between the drone hobbyist community and the wider community. In some cases, a drone/CPV may be required to comply with a PDI request. For example, a drone license may be defined as a commercial or delivery class, which may be mandated responders for PDI requests (as determined by the FAA). This would be of particular interest to PDI users who are concerned with maintaining their privacy from commercial news agencies. The random number is combined with the drone operator credential and a cryptographically response is prepared and returned to the drone/CPV. The random number is combined with the cryptographically signed drone token and a cryptographic response is prepared and returned with the drone operator credential response to the PDI device.

At block 2205 the PDI device may generate a clear text request for identification of a CPV. In certain examples, aspects of the described operations may be performed by PDI device 705 as described with reference to FIG. 7.

At block 2210 the PDI device may transmit the clear text request to the CPV. In certain examples, aspects of the described operations may be performed by PDI device 705 as described with reference to FIG. 7.

At block 2215 the PDI device may receive a challenge from the CPV. In certain examples, aspects of the described operations may be performed by PDI device 705 as described with reference to FIG. 7.

At block 2220 the PDI device may generate a response to the challenge. In certain examples, aspects of the described operations may be performed by PDI authentication component 710 as described with reference to FIG. 7.

At block 2225 the PDI device may transmit the challenge to the CPV. In certain examples, aspects of the described operations may be performed by PDI device 705 as described with reference to FIG. 7.

Figure 23:
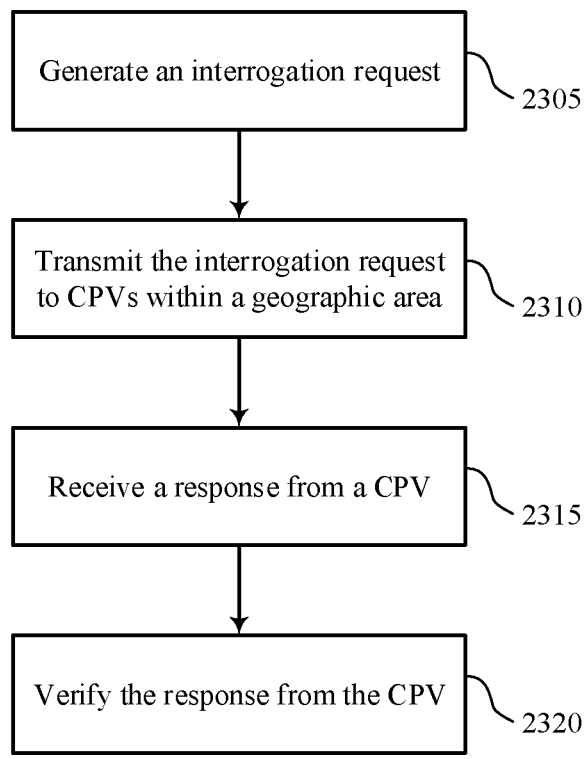

FIG. 23 shows a flowchart 2300 of a process for authentication, authorization and secure communication in accordance with aspects of the present disclosure. In some examples, a relay node may execute a set of codes to control functional elements of the relay node to perform the described functions. Additionally or alternatively, a relay node may use special-purpose hardware.

A DMA may verify the identity of a relay node and issue a cryptographic token that can later be used to authenticate the relay node's license. The DMA can be a public or private entity with a public key distribution system as well as secure private key(s). A cyber-physical vehicle management system includes verification components similar to the distribution system for digital rights management or digital certificate authorities. A DMA can be implemented to support a public key cryptographic scheme that is extensible to a large number of end-users, a revocation scheme that allows for informing end-users of cryptographic tokens that are no longer trusted, and a generation and issuing of scheme for verifiable CSDTs.

The CSDT is a token that is cryptographically signed by the DMA and includes information about the DMA as well as public key(s) from the DMA. The information the CSDT may include, but is not limited to, the cryptographic schemes used and necessary protocols or parameters. In a cyber-physical vehicle management system, the CSDT and all protocols for the DMA public key scheme are pre-installed, pre-distributed, or pinned to the relay node in a secure manner. The CSDT may be stored in software or with trusted hardware modules. Regardless, the CSDT, and corresponding algorithms, may be installed such that the processor that verifies credentials, can securely access it. Distribution of the CSDT should, ideally, be secure, which can be accomplished in software or hardware using various schemes, not discussed here.

A relay node license may have a license linked to digital relay node attributes. The relay node attributes can include, but are not limited to, the relay node's current location, mobility, radial range, usage rights (e.g. subscription), ownership (e.g. public or private) and date of installation. The relay node license may include, but is not limited to, a class of license, the expiration date of the license, the issue date of the license, and a unique identifier. The relay node license should be generated by a trusted third-party organization such as a government agency, for example the Federal Aviation Administration, or an independent organization.

When a new relay node license is issued a verification process may be performed (e.g., by a DMA) before secure operation is possible. The relay node license and relay node attributes are stored in various locations which could include internally or external to the relay node. A pair of cryptographic keys including a public key and private key are then securely generated for the relay node. This can be done locally or via a third-party service. The details for generating cryptographic keys is dependent on the cryptographic algorithms later used. Ideally, for the relay node, the key generation occurs on a local device (the relay node or a secure hardware device). However, this process can occur with the license authority or the DMA generating keys. At this point, the relay node has generated all the necessary information to verify its identity to the DMA and receive a cryptographically signed relay node token. A cryptographically signed relay node token is a token that is cryptographically signed and allows for third-parties to verify the DMA signature if they have the CSDT. The cryptographically signed relay node token also stores the public key for the relay node enabling two functions. First, the relay node public key can be used to encrypt data which someone with the relay node operator private key can decrypt. Second, the relay node private key can be used to sign data which can be verified by the relay node public key. The relay node private key is able to produce signatures that will be correctly verified by the corresponding relay node public key.

To receive a cryptographically signed relay node token the relay node license, relay node attributes, and associated public key are sent via a secure channel, such as an HTTPS Internet channel, to the DMA. The DMA verifies the relay node license and relay node attributes either locally, if capable, or through the issuing organization, such as the FAA. If any of the relay node attributes do not match the relay node license then the license is not signed and is returned to the license requestor with an error message. Optionally, if a cryptographically signed relay node token has already been issued for a relay node license the process aborts. The DMA then uses a cryptographically secure signature algorithm with the DMA private key to produce a cryptographically signed relay node token. This token includes the relay node attributes, relay node license, and the relay node public key. This token can be verified by any computer with the CSDT but cannot be forged by anyone that does not have the DMA private key(s), which is securely stored and managed by the DMA. Optionally, the DMA stores the cryptographically signed relay node token into a database, that can later be used to verify messages signed by the relay node or verify the issued certificates.

The DMA returns the cryptographically signed relay node token via a secure channel, like an HTTPS Internet connection to the requesting party. The relay node, or other requesting party, uses a signature verification algorithm (such as DSA, ECDSA, and RSA-PSS) to prove the validity of the signature or to handle an error message. The cryptographically signed relay node token and the corresponding relay node private key is then stored in the relay node credential.

A fixed or mobile relay node may request the status of drones in the local area, determined by the radio range or other means. A cyber-physical vehicle management system may provide for non-reputable communications from the responding drones to the relay node. This protocol depends on the previous distribution of the CSDT to the relay node and the responding drone(s) to have valid Cryptographically signed drone tokens.

The protocol starts when the relay node generates an interrogation request with a cryptographically random nonce, or challenge. This request is sent via the relay node's radio to all responding drones in radio range. When a drone receives a request packet the cryptographic challenge is combined with the current navigation data and part of the responding drone's cryptographically signed drone token. The exact contents of the response message will be determined by administering authorities but may include, and is not limited to, the following: GPS time, location, heading, airspeed, altitude, and drone ID. The output of the combination is then cryptographically signed using the responding drone/CPV's private key and sent via the responding drone's radio to the relay node. The relay node verifies multiple aspects of the response packet. The responses are stored in a local database and can be used for regional navigation.

The relay node can also verify the data from drones/CPVs using a database of cryptographically signed drone tokens. First, the relay node requests the cryptographically signed drone token from the DMA corresponding to the drone's ID. Second, the relay node verifies the response packet is legitimately signed signature using the responding drone's public key.

Relay nodes can be installed or operated by governmental agencies as a part of the nation's critical infrastructure, known as public relay nodes. These will be installed in major metropolitan cities and other high traffic or high potential casualty areas. Private relay nodes can be owned by individuals or private organizations and may exist as open or closed relay nodes. A closed relay node is a node that has restrictive access requirements based on specific drone license attributes. An individual can set up her own closed relay node to enhance her own flight. The relay node in this case would provide data to a drone/CPV with the correct ID, namely her ID. An organization can install and operate a closed private relay node to enable a subscription-based network of relay nodes. Drone operators would pay a fixed or ongoing service fee to allow their drones to access the sensor or network data on the closed private relay node(s). Open private relay nodes can be owned by individuals or private organizations and function similarly to public relay nodes in that they provide open access to any drone operator with the exception of blacklisted drones that have been identified as undesirable either because they have abused the system, exist for nefarious use, or put a strain on the system due to their bandwidth needs.

A relay node may broadcast beacon messages allowing nearby drones to establish authenticated, and optionally encrypted, communications. Relay nodes are a broad class of devices that include, but are not limited to, Internet gateways, weather stations, local air traffic control nodes, and ad hoc network nodes. In the case of a relay node operating as an Internet gateway, its primary purpose is to provide Internet connectivity to drones allowing, for example, real time traffic management, weather data, and updated flight plans. Internet connected, authenticated relay nodes could also provide updated revocation lists mitigating the impact of rogue ADC devices. Relay nodes can also operate as stand-alone (not connected to the Internet) information brokers. This could include a relay node with weather sensors reporting changing conditions or a relay node brokering local airspace and optimizing flight paths of drones/CPVs. For either of these operations, a trust in the relay node may be desired.

A cyber-physical vehicle management system could be extended to allow for an ad hoc network of relay nodes to provide wide-spread Internet access across relay nodes. Since drones can operate as relay nodes, this means that drones could form an ad hoc network for improved Internet connectivity over-ground-station-only options. Whether Internet connected, nodal networked, or isolated, a relay node can provide local current and forecasted weather data (e.g. wind direction and speed, humidity, and temperature), emergency warnings, no-fly zones, drone activity, congestion, and obstacles.

Another optional feature of a relay node is to provide positioning data to drones. Drones can conceivably operate in two manners. First, the drone could have high-precision position data (i.e. GPS or Iridium). Second, the drone could have relative position data, where the drone relies on external nodes to correct its position and inertial data for real time correction. For the second class of drones, which we refer to as inertial navigation drones, an essential service of the relay node is to provide high quality positioning data. There are various techniques that can provide this type of data including various RF distance bounding, triangulation, and trilateration. Since it is likely that relay nodes will contain GPS data combining this with other localization techniques can provide reasonable position data. Inertial navigation drones will make use of collision avoidance sensors and drone-to-drone and drone-to-plane communication, such as in-flight routing negotiation. Inertial navigation drones can fly safely in areas reserved ahead of time or in areas with limited air traffic.

Relay nodes can also be configured into a passive mode for monitoring. A monitoring mode allows for a relay node to operate similar to current skyscanner technologies. In the passive mode, the relay node listens for any beacons from other devices including, but not limited to, drones, PDI devices, ADC devices, or other relay nodes. This mode allows for monitors to be deployed to monitor and track drone deployment. This allows for civilian and government organizations to monitor drone traffic and provide a necessary level of transparency.

To establish authenticated, and optionally secure communications, the relay node sends out beacon messages at intervals. The intervals can be periodic or adaptive, the specific implementation is left to the realization. The beacon messages are broadcasted via wireless links and received by each receiving device. The potential receiving devices can include, but are not limited to, drones, other relay nodes, and ADC devices. Since the relay node is providing a service, responding to beacons is completely optional with responses requested when an authenticated communications link is desired. The beacon message may contain, but is not limited to, a timestamp, the relay node's unique ID, a list of available services (e.g. weather, air traffic control, ad hoc mode, Internet connectivity), and a list of supported connection types (e.g. ADC, relay node, commercial drone, government drone, hobbyist drone, subscriber).

A drone/CPV that desires to establish a connection listens for beacons. Upon receiving a beacon, the drone assesses whether the necessary services and connection types are available. If the relay node is sufficient for the drone's need requirements, then it will prepare a challenge to verify the relay node's identity. The challenge includes a random nonce, which can be generated based on a timestamp, a software based random number generator, a hardware based random generator, or any other cryptographically random source. The challenge can also include, but is not limited to, the drone information, the drone public key, the drone license information, and desired connection type. The challenge is sent wirelessly to the relay node.

Upon receiving the challenge, the relay node first verifies that it can provide the requested connection type or that it can request the information from another node. If it cannot, it sends a failure message to the drone. If it can provide the requested connection, the relay node extracts the random nonce in the drone's challenge to prepare an authenticated response. A realization of this protocol should use anti-denial-of-service techniques to mitigate flooding, but this is orthogonal. The response consists of, but is not limited to, a second random nonce, the cryptographically signed relay node token, and may include the random nonce from the drone's challenge. The relay node signs the response with its private key and returns it to the drone via the wireless link between the relay node and drone/CPV.

Upon receiving the relay node's response, the drone uses the DMA public key(s) to verify the validity of the cryptographically signed relay node token. The relay nodes public key can then be used to verify the signature on the response packet. If all signatures are correctly verified the drone may authenticate to the relay node. The drone uses the nonce provided by the relay node and prepares an authenticated response. The response includes the cryptographically signed drone token and the nonce. A cryptographic response is prepared using the drone's private key and returned to the relay node via the wireless link. The cryptographic response is verified and by the relay node. Authorization can then occur in one of two ways. The first, allows the relay node to locally decide which connections to authorize. The second, connects to an authentication and authorization server for decision making.

For local authorization, the relay node has a set of rules to determine which drones are allowed to connect. These rules could restrict connection to a particular type of license, a particular amount of use, or a particular class of owners. The specifications are left to an implementation decision. For external authorization, the cryptographically signed drone token is sent to an authorization server over a secure connection. The authorization server maintains a list of authorized users or a set of rules to validate users. The authorization server uses these rules to provide a yes/no authorized decision which is returned to the relay node. The relay node provides services based on this yes/no decision, although may be legally required to provide a limited range of services or data nominally or in an emergency situation.

Once the drone/CPV has been authenticated and authorized properly the relay node and drone have shared public/private keys. These public/private key pairs allow for the bi-directional exchange of encrypted and authenticated messages between drone and relay node. One possible approach would be for the relay node and drone to exchange encrypted private keys allowing for future symmetric cryptography. Now that cryptographic keys have been securely distributed, bi-directional, authenticated, and optionally encrypted communications can occur.

At block 2305 the relay node may generate an interrogation request. In certain examples, aspects of the described operations may be performed by relay node authentication component 610 as described with reference to FIG. 6.

At block 2310 the relay node may transmit the interrogation request to CPVs within a geographic area. In certain examples, aspects of the described operations may be performed by relay node 135 and 605 as described with reference to FIGS. 1 and 6.

At block 2315 the relay node may receive a response from a CPV. In certain examples, aspects of the described operations may be performed by relay node 135 and 605 as described with reference to FIGS. 1 and 6.

At block 2320 the relay node may verify the response from the CPV. In certain examples, aspects of the described operations may be performed by relay node authentication component 610 as described with reference to FIG. 6.

Figure 24:
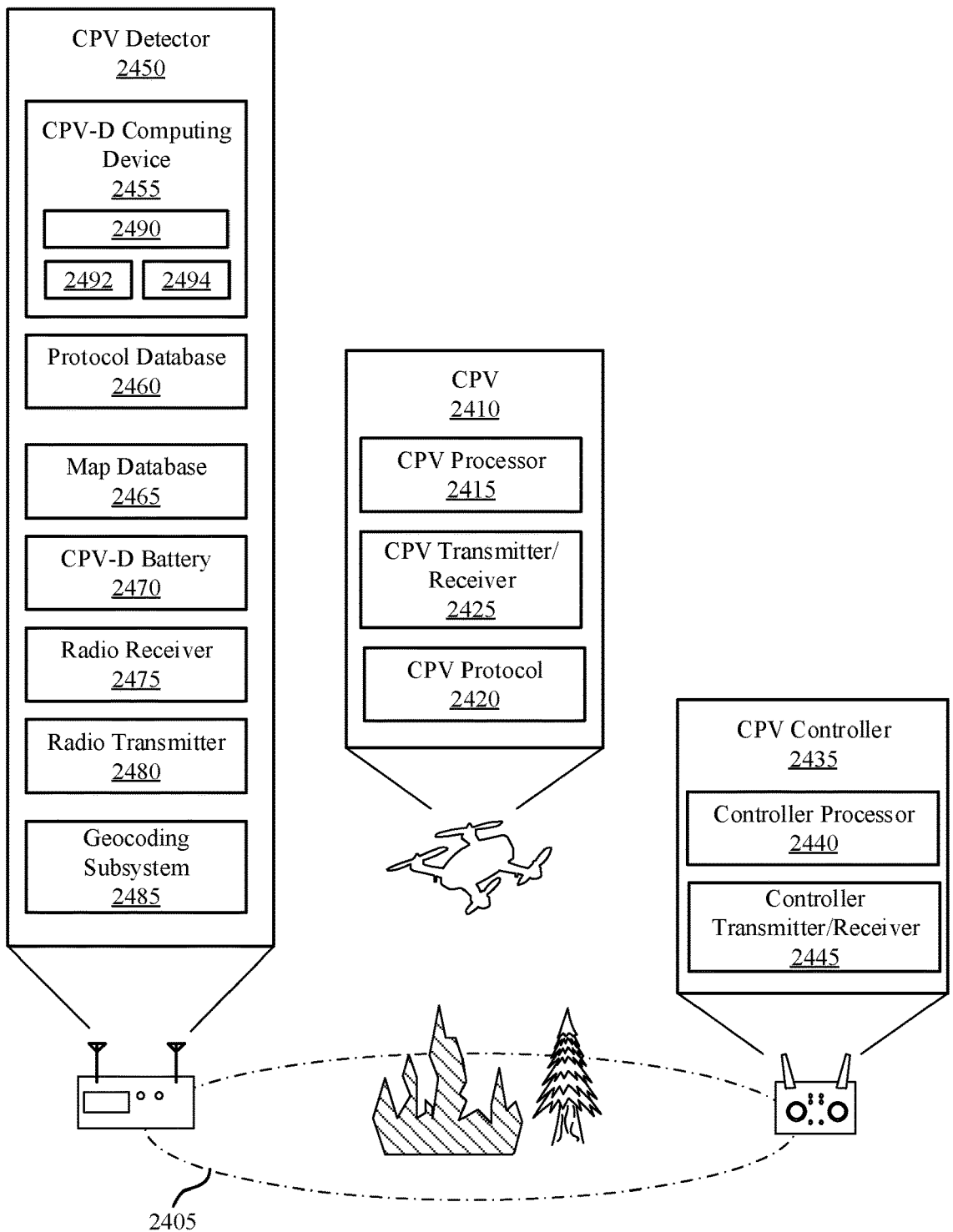
FIG. 24 shows a diagram of a CPV detection and intervention system that supports identification, detection, capture, seizure, and immobilization of CPV systems in accordance with aspects of the present disclosure.

FIG. 24 shows a diagram 2400 of a CPV detection and intervention system that supports identification, detection, capture, seizure, and immobilization of CPV systems in accordance with aspects of the present disclosure. Diagram 2400 may include controlled area 2405, CPV 2410, CPV controller 2435, and CPV detector 2450.

In some cases, a CPV 2410 may encroach on geographically controlled area 2405, which may interfere with the operations of law enforcement, emergency response, or other authorized operations. The controlled area 2405 may be the site of a natural disaster, a crime scene, a sensitive location such as a nuclear power plant, or any other geographic location where restricting CPV activity is desired.

CPV 2410 may be an example of a plurality of vehicles, each vehicle including a computing device having a unique identity and an operator associated with the vehicle; each vehicle configured to forward the challenge to the vehicle operator controller; prepare a cryptographic vehicle response based on the operator response, the challenge and a vehicle token stored on the vehicle; and send, from the vehicle to the authoritative command device, the vehicle response and the operator response. CPV 2410 may incorporate aspects of CPV 105 and 305 as described with reference to FIGS. 1 and 3. In some examples, CPV 2410 may include CPV computing device 2455, CPV protocol 2420, CPV transmitter/receiver 2425, and CPV battery 2435.

A CPV 2410 may be a device such as a UAV or an autonomous car. The CPV 2410 may contains computing, sensing, GPS, movement, and communications subsystems. A CPV 2410 may also interact with other CPVs 2410. A cyber-physical vehicle management system may enable an identity management scheme for authenticated communications between CPVs 2410 and other devices.

The CPV 2410 can be any electro-mechanical device intended to move through space under partially or fully automated control. In some cases, the CPV 2410 may be a component of a CPVS. A CPVS may include a CPV 2410 and a CPVN (secondary cyber-physical systems and subsystems that support the functionality and application of the CPV). For example, CPVN might be a weather station one-way communicating to the CPV 2410, it may be a remote controller operated by a human that is providing one-way communication for control, or it may be a two-way communication such as the case of an aerial CPV 2410 (e.g. drone) coordinating its flight plan with an automated ground station.

The CPV 2410 may communicate with radio signals to other systems such as other CPVs 2410 (e.g., in the case of drone swarms). This communication could be to coordinate with each other or simply as one-way communication broadcasting the CPV's existence (and possibly location and other relevant data). CPVs 2410 may utilize either one-way receive radio signal communication (e.g. control), one-way send radio signal communication (e.g. data), or two-way send and receive radio signal communication. CPVs 2410 may be unmanned in that they lack a human operator within the vehicle (such as drones, remote controlled cars, and bomb disposal robots), but they may have a human controlling them or receiving data from them from afar using radio signals from a CPV 2410 node (e.g. a control station, controller, computer).

CPVs 2410 may have humans internally acting as either an operator (e.g. an autonomous car like) or as a non-operator (e.g. a sky taxi where the human is an occupant). Radio signals either going to or from the CPV 2410 may be detected using the CPV Detector 2450. The CPV 2450 detector may be utilized to control and manage threats such as wirelessly remote-controlled devices, autonomous devices that have a telemetry and control wireless link, drones and robots. The CPV's components, such as the battery in this case, may transmit their own telemetry via a transmitter.

The CPV computing device 2455 may be configured for executing commands and sending telemetry via its TRX and antenna. The CPV computing device 2455 may encode and decode all communications using the same protocol as its CPV controller 2435.

CPV controller 2435 is the remote controller for the wireless remote-controlled CPV 2410. The CPV controller 2435 contains a controller processor 2440 that produces device control commands and reads CPV telemetry using the CPV manufacturer protocol for encoding and decoding. The CPV manufacturer specific protocols are available from an internal or external source. This protocol 2420 is the language with which the CPV controller 2435 and the remote controlled CPV 2410 communicate and by which the CPV controller 2435 commands its CPV 2410. The CPV controller 2435 mandates the particular RF band channel for telemetry and control of the CPV 2410 itself via its TRX transceiver 2420 and antenna. The CPV 2410 receives commands only through the command channel set by its controller 2435. Many CPVs 2410 have the ability to receive a plan for its behaviors that it will subsequently execute. Some CPVs 2410 still must receive commands one-at-a-time for sequential execution. In some examples, CPV controller 2435 may include controller processor 2440 and controller transmitter/receiver 2445.

CPV detector 2450 may incorporate aspects of CPV detector 2505 as described with reference to FIG. 25. In some examples, CPV detector 2450 may include CPV-D computing device 2455, protocol database 2460, map database 2465, CPV-D battery 2470, radio receiver 2475, radio transmitter 2480, and geocoding subsystem 2485.

The CPV-D computing device 2455 in some embodiments includes a processor 2490, non-transitory memory 2492 coupled to the processor, and a plurality of applications 2494 configured to run on the processor.

In some cases, the database subsystems include the vehicle protocol database 2460 and the map database 2465. In some cases, the CPV 2410 is an unmanned drone. The CPV Detector 2450 may include the radio receiver 2475 comprising hardware specially designed for receiving the specific type of communication or hardware that is designed to be software programmable that allows it to select a specific radio signal (e.g. frequency, channel, sub channel) to tune into.

Geocoding subsystem 2485 may determine a distance from a geocoding subsystem 2485 to the CPV 2410; determine a current location of the geocoding subsystem 2485; determine a bearing from the geocoding subsystem 2485 to the CPV 2410; and determine a location of the CPV 2410 based on the distance, the current location, and the bearing.

Geocoding subsystem 2485 may incorporate aspects of geocoding subsystem 2535 as described with reference to FIG. 25.

In some cases, the geocoding subsystem 2485 is coupled to CPV-D computing device 2455 and may include a 3-axis MEMS gyroscope, at least one target spotting device, and a sub-meter GPS receiver. In some cases, the geocoding subsystem 2485 may be a target spotting device and may include at least one of an optical spotting scope and a visual-spectrum laser pointer. In some cases, the geocoding subsystem 2485 is detachable from the CPV detector 2450 system.

A geocoding subsystem 2485 may include a laser distancing component, a gyroscope (such as a MEMS gyroscope), a relative location device (such as a GPS receiver), an orientation device (such as a compass), and a distance measuring device (such as a laser rangefinder). Additional components might include a wireless external communication method (such as Bluetooth® or WiFi) and human interface device (such as a touchscreen display or keyboard). The geocoding subsystem 2485 has two primary functions: to determine the coordinates of an object that is within line of sight and to determine a measurement of an object. The following formulas (1-3) may be used to determine the coordinates of an object once the geocoding subsystem location is known (lat1, lon4) and the geocoding subsystem orientation is known (tc in radians):

$$lat = a\ \sin(\sin(lat1)*\cos(d) + \cos(lat1)*\sin(d)*\cos(tc)) \quad 1)$$

$$lon = a\ \tan 2(\sin(tc)*\sin(d)*\cos(lat1), \cos(d) - \sin(lat1)*\sin(lat)) \quad 2)$$

$$lon = \mod(lon1 - dlon + \pi, 2\pi) - \pi \quad 3)$$

Figure 25:
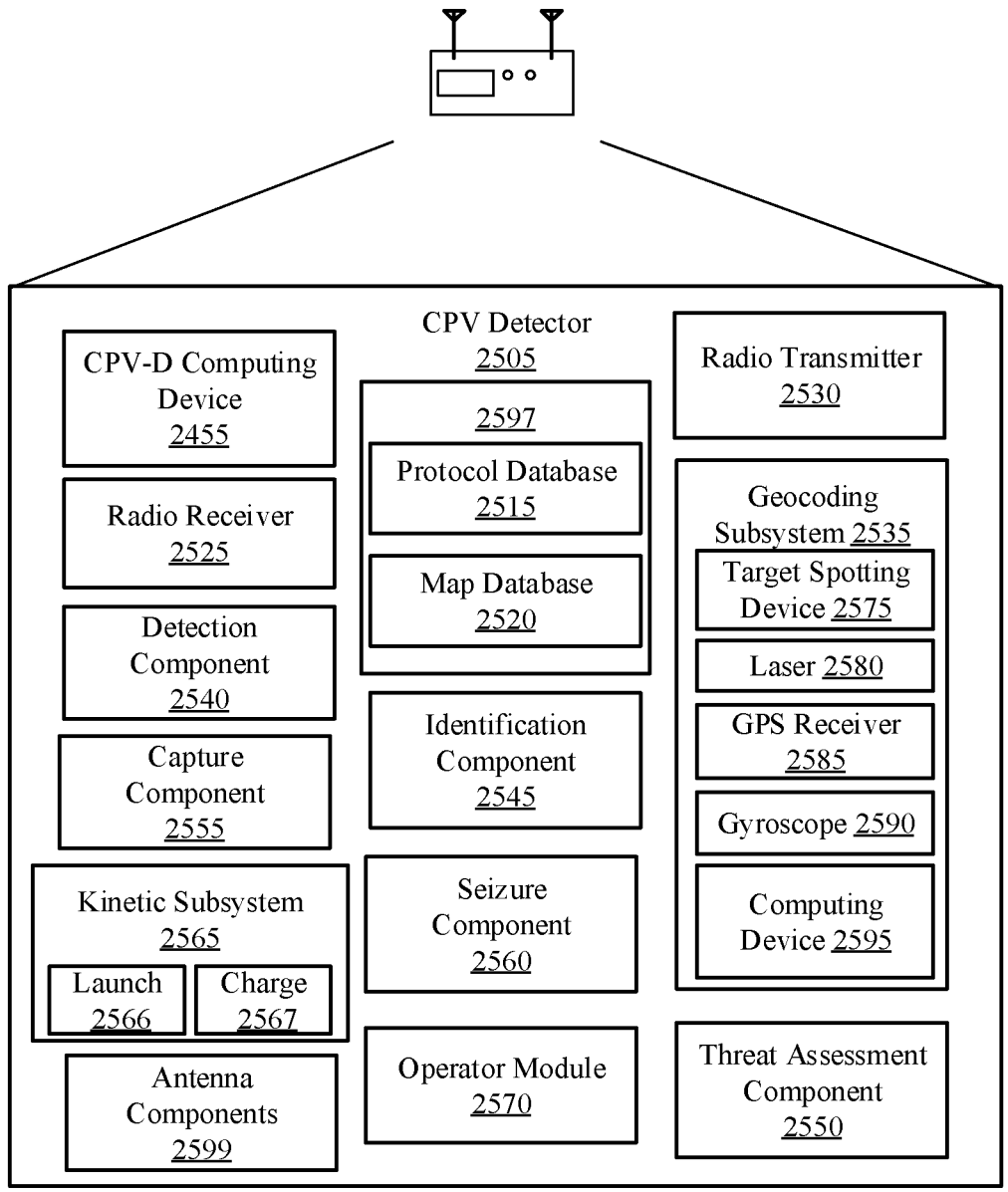
FIG. 25 shows a diagram of a CPV detector that supports identification, detection, capture, seizure, and immobilization of CPV systems in accordance with aspects of the present disclosure.

FIG. 25 shows a diagram 2500 of a CPV detector 2505 that supports identification, detection, capture, seizure, and immobilization of CPV systems in accordance with aspects of the present disclosure.

CPV detector 2505 may incorporate aspects of CPV detector 2450 as described with reference to FIG. 24, but may include additional elements that provide for functions of the CPV detector 2505 for identification, detection, capture, seizure, and immobilization of CPV systems. In some examples, CPV detector 2505 may include CPV-D computing device 2455, protocol database 2515, map database 2520, radio receiver 2525, radio transmitter 2530, geocoding subsystem 2535, detection component 2540, identification component 2545, threat assessment component 2550, capture component 2555, Seizure component 2560, kinetic subsystem 2565, and operator module 2570. In some cases, CPV detector 2505 may convert received data into plain text data or map data for display to an operator.

In some embodiments, one or more of the detection component 2540, the identification component 2545, the threat assessment component 2550, the capture component 2555, the seizure component 2560, the kinetic subsystem 2565 and the operator module are included in one of the plurality of the applications 2494 configured to run on the CPV-D computing device 2455.

In some cases, the database subsystems include the vehicle protocol database 2515 and the map database 2520. In some cases, the vehicle is an unmanned drone. The CPV Detector 2505 may include the radio receiver 2525 comprising hardware specially designed for receiving the specific type of communication or hardware that is designed to be software programmable that allows it to select a specific radio signal (e.g. frequency, channel, sub channel) to tune into. If a CPV 2410 is not actively transmitting a radio signal, then there may be nothing for the radio receiver 2525 to detect. In this case, a radio transmitter 2530 may be utilized. Some CPVs 2410 may respond upon being "pinged" (i.e. where information is directly or indirectly requested).

A direct request is when the radio transmitter 2530 requests specific data such as the current location of the CPV 2410. An indirect request is when the CPV 2410 only communicates if other CPVs 2410 are around. The CPV 2410 may determine whether other CPVs are around based on radio transmissions. A radio transmitter 2530 may request data or transmit a radio signal that appear 2410 s to be another CPV 2410 in order to cause the CPV 2410 to transmit so that the radio receiver 2525 may receive the resulting signals.

In some cases, the CPV 2410 will be continuously transmitting and therefore only a radio receiver 2525 is used. In other cases, the CPV 2410 itself may or may not be transmitting while a CPV node is transmitting to the CPV 2410. In this case the CPV detector 2505 may use its radio receiver 2525 to receive the radio signals from the CPV node, and to make a determination of what kind of CPV 2410 is nearby.

This may inform a CPV mitigator (i.e., such as the kinetic subsystem 2565) how to target a CPV 2410. Use of a radio receiver 2525 alone to receive the radio signals from a CPV 2410 or CPV node means that the CPV 2410 or CPV node may have no way of knowing whether the radio signals it is transmitting (or that are meant for it) are being received by something else. Once the CPV detector 2505 detects radio signals from a subsystem of the CPVS, then it may demodulate the radio signals to get an ordered bit sequence. The bit sequence may be encrypted. In some examples, hardware that is specialized to decrypt that particular encryption may be used to decrypt the bit sequence. In other cases, hardware that supports software algorithms to dynamically decrypt the digital signal feed of the bit sequence may be used.

After this process of organizing and decrypting (if needed) is complete, then the data is visible in plain text. This plain text view of the packets may then provide real-time view of the data being sent from the subsystem of the CPVS. This data may include the CPV's manufacturer, model, software version number, unique identifier, current location (longitude, latitude, and altitude), live video feed, battery level, CPV's operator location, and flight plan.

This may then be presented to the operator of the CPV Detector 2505 in a GUI that can show the live data stream including the video feed and the location of the CPV represented on a two-dimensional or three-dimensional map. Depending on the CPV 2410, this data can be accessed with only a radio receiver 2525 or some may require requesting the data using a radio transmitter 2530. The CPV detector 2505 may use a radio transmitter 2530 to access the internal cyber components of subsystems of the CPVS such as the CPV 2410. This can be done by evoking higher level privileges that may or may not be knowingly available to the operator of the CPV 2410. Once the internal cyber components are accessed, then the radio transmitter 2530 can request data that is stored on the subsystem of the CPVS such as the CPV 2410 for this example. This data might be photographs, video recordings, logs, or software.

Once the CPV detector 2505 detects which frequency the radio signal is operating on, then the CPV detector 2505, using the capture component 2555, can transmit radio signals on that same frequency and channel with the correct timing to prevent the CPVS from internal communications, such as disrupting communication between a CPV node (e.g., a ground control station) and a CPV (e.g., a drone). These transmissions may be done in a way to minimize possible interference with other radio signals used for communication by ensuring that only the exact subchannel of that frequency during an exact time has radio signals being transmitted. Once the CPV detector 2505 has disconnected the CPV 2410 from a CPV node (or the CPV controller 2435), then CPV Detector 2505 (again using the capture component 2555) can transmit a radio signal that the CPV 2410 would expect to be coming from a CPV node or controller 2435 and thus cause the CPV 2410 to take data from the CPV Detector 2555 as if it were an authorized CPV node.

This data may be in the form of control commands that direct the CPV 2410 to do a particular action, which may mean transmitting a single command which initializes a pre-programmed action in the CPV 2410 or it may mean transmitting a stream of data that could be commands for the CPV 2410 to follow. This process may be used ensure that a CPV remains in a specified location, by making it stay in its current location, directing it to a location chosen by the operator of the CPV detector 2505 (e.g. selecting from a list or a point on a map), directing it to return to where it came from, or disabling it from continued operation. Once the CPV 2410 is at the specified location, it can be disabled.

The CPV detector 2505 can be programmed to have areas on a map (i.e. geofences) designated such that when a CPV 2410 is turned on or enters the designated area, then a preprogrammed action is taken by the CPV detector 2505 (also referred to as the CPV mitigatory). Such actions may be termed CPVS Disconnection or CPV Takeover. The areas designated on the map can be programmed by inputting at least three longitude and latitude coordinates to form a two-dimensional polygonal in space which can be displayed on a visual map. Additionally, at least one altitude can be inputted to create a three-dimensional polygonal. Inputs can be in a variety of forms such as an operator typing in the numbers or selecting points on a map. The CPV detector 2505 performs a threat analysis based on data it collects on each CPVS it detects.

The input data for the threat assessment includes, but is not limited to, monitoring of the live drone video feed, coordinates, altitude, distance/azimuth from pilot, vertical and horizontal speed, payload capacity, battery life, proximity to designated areas, signal strength to original pilot, coordinates where CPV was turned on, tracked movement pattern, past sightings of CPVS based on unique identifier. After analyzing the data using the threat assessment component 2550, the CPV detector 2505 recommends a response to the operator of the CPV detector 2505 or can automatically perform a preprogrammed action.

Threat analysis data is then logged by the threat assessment component 2550 and linked to the unique identifier.

The various components of the CPV detector 2505 may be included in a single housing, as shown in FIGS. 24 and 25, or may optionally may be split up into different housing, for example splitting off the capture/seizure/kinetic components of the CPV detector 2505. The CPV detector 2505 itself contains several important components, physical and logical subsystems.

There is, of course, the computing device 2455 that handles overall control of the CPV detection and intervention system itself, performing calculations, lookups, pattern matching, decoding of RF data streams by use of the right protocol, and even encoding of messages and commands by use of that protocol. There is the database system 2597, including databases such as the protocol database 2515 and the map database 2520, to handle important data and information to record or utilize in calculations and pattern matching, such as RF signature identification of a given protocol from a raw data stream. There can be multiple transmit and antenna components 2599 to track or command multiple intruders at the same time.

Further, the CPV detector 2505 contains the self-contained geocoding subsystem 2535 with an optical target spotting scope 2575 or visual-spectrum laser pointer (or both) aligned with the distance-finding laser module. The subsystem 2535 also includes the distance measuring laser 2580, the sub-meter GPS receiver 2585, the 3 axis MEMS gyroscope 2590, and the geocoding computing device 2595. The "target" is spotted visually through the scope 2575. The operator triggers the laser 2580. The laser 2580 provides a distance to the target measurement. At that same instant, the 3-axis MEMS gyroscope 2590 provides a bearing from the CPV detector 2505 to that target. Finally, the sub-meter GPS receiver 2585 provides the position of the CPV detector 2505 itself.

With these three quantities, the geocoding subsystem processor 2595 can return the precise position of the target through a software algorithm designed for that purpose, stored on and configured to run on the computing device 2595. The Geocoding Laser subsystem 2535 may also operate as a detachable, standalone device to visually choose a target and determine its position instantaneously. This subsystem 2535 can be embodied in many additional ways and utilized for many different purposes, only a few are considered in these examples and descriptions. In some cases, the CPV detector 2505 (also referred to as the CPV detection and intervention system) may operate in hazardous conditions that include risk to life or property. In this case, first responders may arrive at the scene and begin attempting to reduce, mitigate or eliminate the risks due to the hazardous situation within some geographic area.

Within this geographic area, they may instate an "exclusion zone" as a geofence, where only authorized personnel and authorized airborne devices are permitted to operate. Unauthorized wireless remote-controlled devices that intrude into the exclusion zone may present a threat to the Mission. The CPV detector 2505 may be deployed in the field to control or eliminate the threat of intruding devices. After successful intervention by the CPV detector 2505, the original CPV controller 2435 has no communications and cannot command its CPV 2410.

That is, the CPV detector 2505 has exclusive communications with and full control of the CPV 2410. The threat CPV 2410 will be located at coordinates determined by the mission objectives, CPV detection and intervention system 2505 returns to detect mode to locate other threat CPVs 2410, and CPV detection and intervention system 2505 continues performing parallel processes.

Radio receiver 2525 may incorporate aspects of radio receiver 340, 635, and 2475 as described with reference to FIGS. 3, 6, and 24. In some cases, the system comprises a radio transmitter 2530. Radio transmitter 2530 may incorporate aspects of radio transmitter 345, 640, and 2480 as described with reference to FIGS. 3, 6, and 24. In some cases, the encoded transmissions to a vehicle (i.e., the CPV 2410) include a command to change a control and command channel for the vehicle to a specified channel. Geocoding subsystem 2535 may incorporate aspects of geocoding subsystem 2485 as described with reference to FIG. 24.

Detection component 2540 may detect a vehicle (i.e. CPV 2410) by receiving radio transmissions involving the vehicle and detect the vehicle comprises: using the radio transmitter 2530 to send radio transmissions to the vehicle, whereby the vehicle sends radio transmissions.

Identification component 2545 may create a unique identifier for the vehicle using at least a portion of the received data and compare the unique identifier to a plurality of unique identifiers included in a whitelist stored on the database system 2597.

Threat assessment component 2550 may perform a threat assessment for the vehicle using at least a portion of the data.

Capture component 2555 (which may be a portion of a separate CPV mitigator) may use the data to decode and identify a protocol used to control the vehicle (CPV) 2410; query the vehicle 2410 for at least one of information about the vehicle 2410 and about vehicle activity, wherein the query is based on the vehicle protocol; encode transmissions to the vehicle 2410 using the identified protocol; send the encoded transmissions; take control of the vehicle 2410 based on sending the encoded transmissions; perform at least one of modifying, removing, and corrupting data stored on the vehicle 2410; shut down the vehicle 2410; and send transmissions to the vehicle 2410 such that communication between the vehicle 2410 and at least one controller 2435 of the vehicle is disrupted.

Seizure component 2560 (which may be a portion of a separate CPV mitigator) may determine a low-risk area; move the vehicle 2410 to the low-risk area; determine an obstacle-free path for the vehicle 2410, wherein moving the vehicle 2410 to the low risk area is based on the obstacle-free path; move the vehicle 2410 to an original launch location of the vehicle 2410; and determine a target destination 2410 for the vehicle.

Kinetic subsystem 2565 (which may be a portion of a separate CPV mitigator) may target the CPV 2410 (in some embodiments in conjunction with the geocoding subsystem 2535) and launch at least one disabling charge 2567 at the vehicle 2410. In some cases, the at least one disabling charge 2567 produces one of a low temperature fireball, a graphite cloud, a magnetic powder, and an adhesive coating. A CPV detector 2505 (or separate mitigatory) may include a kinetic subsystem 2565 with a common expendable launch vehicle 2566 and a variety of interchangeable charges 2567 to target critical elements common to all CPV 2410 especially those that fly, i.e., CPV visual systems, flight hardware, and propulsion systems. The kinetic subsystem 2565 targets and disables these critical flight systems using three interchangeable cartridges/charges 2567 that disperse specialty powders.

Unlike other kinetic systems that require extreme precision in delivery, are, bulky, have a long set-up time, or are limited in application, the kinetic subsystem 2565 delivers a customizable cloud of powder to defeat CPV threats within an effective range (e.g., within 2 or 3 km).

The kinetic subsystem 2565 may include a launch mechanism 2566 and payload disbursement system 2567. The kinetic subsystem 2565 has the capability of providing a situation-dynamic solution to disable simple and advanced CPV threats, such as autonomous and cluster/swarms. Thus, the kinetic subsystem 2565 may utilize or include a CPV tracking system. This can be either a third-party system or a system paired with a CPV detector 2505.

As a defeat mechanism, the kinetic subsystem 2565 may be a lightweight and inexpensive launch system, and interchangeable powder cartridge system to provide a viable solution to detect and defeat these classes of CPV threats by disabling video, flight control, or flight hardware systems. The kinetic subsystem 2565 has the potential capability of providing a situation-dynamic solution to disable autonomous and swarm CPV threats.

The cartridges (i.e., ammunition) 2567 of the kinetic subsystem 2565 may correspond to one of three components of a CPV: electronics, flight systems, and mission hardware. Thus, the kinetic subsystem 2565 have three or more interchangeable cartridges/charges 2567 to disrupt CPV missions, each of which target one specific critical component of the CPV 2410. The charges 2567 exploit these inherent vulnerabilities by distributing a cloud of proprietary powder agents.

A first cartridge type may correspond to CPV electrical systems include motors for control surfaces, batteries, controllers, navigation systems, and cameras. Although many of these systems are frequently covered in conformal coatings that prevent direct attack, the kinetic subsystem 2565 can distribute powders that alter electrical and mechanical characteristics surrounding these systems to inhibit proper function.

A second cartridge type may correspond to flight systems: propellers, wings, casings, control horns, motors, engines, and other fine mechanical systems all need to be in near perfect condition to allow continued flight. These flight systems allow ample surface area for the kinetic subsystem 2565 to disable components. By heating or disrupting electrical signals to flight critical hardware, the kinetic subsystem 2565 can prevent continued controlled flight.

A third cartridge type may correspond to mission-specific payloads such as sensors (e.g. cameras), explosives, or electronic warfare weapons provide additional critical elements that can be inhibited by custom powders agents.

Thus, the various charge 2567 types may include generations of a low temperature fireball to deform flight surfaces and prevent flight, use of graphite or other fine particulate cloud to cover video systems and short circuit devices in flight applications, use of magnetic powder to stick inside motors and prevent movement, use of varying particulate size to precisely disable motors with specific rotor/stater gaps, use of particle size mixing to achieve macro-alloy effect, increasing effect of powders on motor movement, use of adhesive coating to further prevent motor movement, use of mixed powders to target multiple drone capabilities at once, use of shaped charges to accurately distribute powder while targeting specific drone systems, use of varying shape of charges to change swarm vs individual drone effect, use of varying shape of charges to affect fixed or rotor wing aircraft, or use of programmable delayed detonation rocket propelled charge for powder cloud delivery.

A targeting component of the kinetic subsystem 2565 may include use of RSSI for high speed tracking of CPVs, use of RF triangulation for active vehicle targeting, use of RSSI and RF combination for improved accuracy, and use of off-unit video processing for computer-driven guidance and tracking. Vehicle related aspects of the kinetic subsystem 2565 may include combining ducted fans and rocket engine to produce maneuverable yet fast delivery system, use of electrically driven RAM jet with solid rocket air heating mechanism, use of a spinning launch vehicle for lateral targeting using shaped charges, use of a laser range finder on spinning launch vehicle for mapping CPV locations, and use of field-swappable cartridge in missile-like launch vehicle.

Operator module 2570 may receive commands from a user; display information to a user; display an alert when the vehicle is detected; and display a map including a location of the vehicle.

Figure 26:
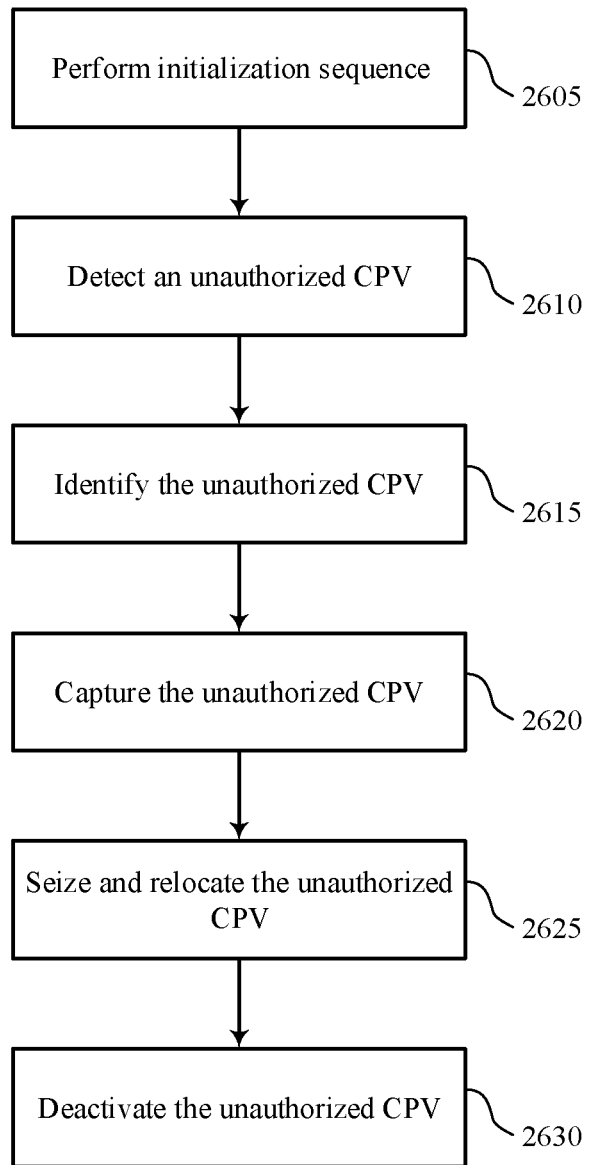
FIG. 26 shows a flowchart of a process for identification, detection, capture, seizure, and immobilization of CPV systems in accordance with aspects of the present disclosure.

FIG. 26 shows a flowchart 2600 of a process for identification, detection, capture, seizure, and immobilization of CPV systems in accordance with aspects of the present disclosure. It will be understood that any of the CPV embodiments may be used in the CPV detector processes disclosed herein. In the present examples, the CPV detector of FIG. 24 is generally used, but it will be understood that any suitable CPV detector embodiment may be used.

In some examples, the CPV detector 2450 may execute a set of codes to control functional elements of the CPV detector 2450 to perform the described functions. Additionally or alternatively, a CPV detector 2450 may use special-purpose hardware.

CPV detector operations may include several phases or modes. The first mode, initialize, is where the CPV detector 2450 becomes operational by turning it on. The second phase, detect, is the CPV detection and intervention system operating to scan the remote control RF spectrum for any signal activity that would indicate a remote control device 2410 within range. When activity is detected, the CPV detector 2450 receives an alert to the potential presence of an intruder. The third phase, identify, operates to gather relevant information about the signal or CPV 2410 in order to enable the CPV detector 2450 to make decisions about the following phases to capture and seize the device when it is deemed necessary. In this phase, the CPV 2410 is identified either as "whitelisted" and requiring no further action, or as a threat that does require further action. The fourth phase, capture, enables the CPV detector 2450 to cut off the threat device's original CPV controller 2435 and take full control of the threat device exclusively for further commands consistent with mission requirements. The fifth phase is the seize or relocation phase, where the CPV detector 2450 may exercise it full command and control of the threat device in order to lower the risks it presents to the mission. It enables the physical manipulation of the CPV 2410 to perform this task. The sixth phase, deactivate, is where the threat device 2410 has been commanded to a low risk location for shutdown and possible physical examination to determine ownership and seizure by authorities for any further actions deemed necessary.

At block 2605 the CPV detector 2450 may perform initialization sequence. In certain examples, aspects of the described operations may be performed by CPV detector 2450 and 2505 as described with reference to FIGS. 24 and 25.

At block 2610 the CPV detector may detect an unauthorized CPV 2410. In certain examples, aspects of the described operations may be performed by detection component 2540 as described with reference to FIG. 25.

At block 2615 the CPV detector 2450 may identify the unauthorized CPV 2410. In certain examples, aspects of the described operations may be performed by identification component 2545 as described with reference to FIG. 25.

At block 2620 the CPV detector 2450 may capture the unauthorized CPV 2410. In certain examples, aspects of the described operations may be performed by capture component 2555 as described with reference to FIG. 25.

At block 2625 the CPV detector 2450 may seize and relocate the unauthorized CPV 2410. In certain examples, aspects of the described operations may be performed by Seizure component 2560 as described with reference to FIG. 25.

At block 2630 the CPV detector 2450 may deactivate the unauthorized CPV. In certain examples, aspects of the described operations may be performed by capture component 2555 as described with reference to FIG. 25.

Figure 27:
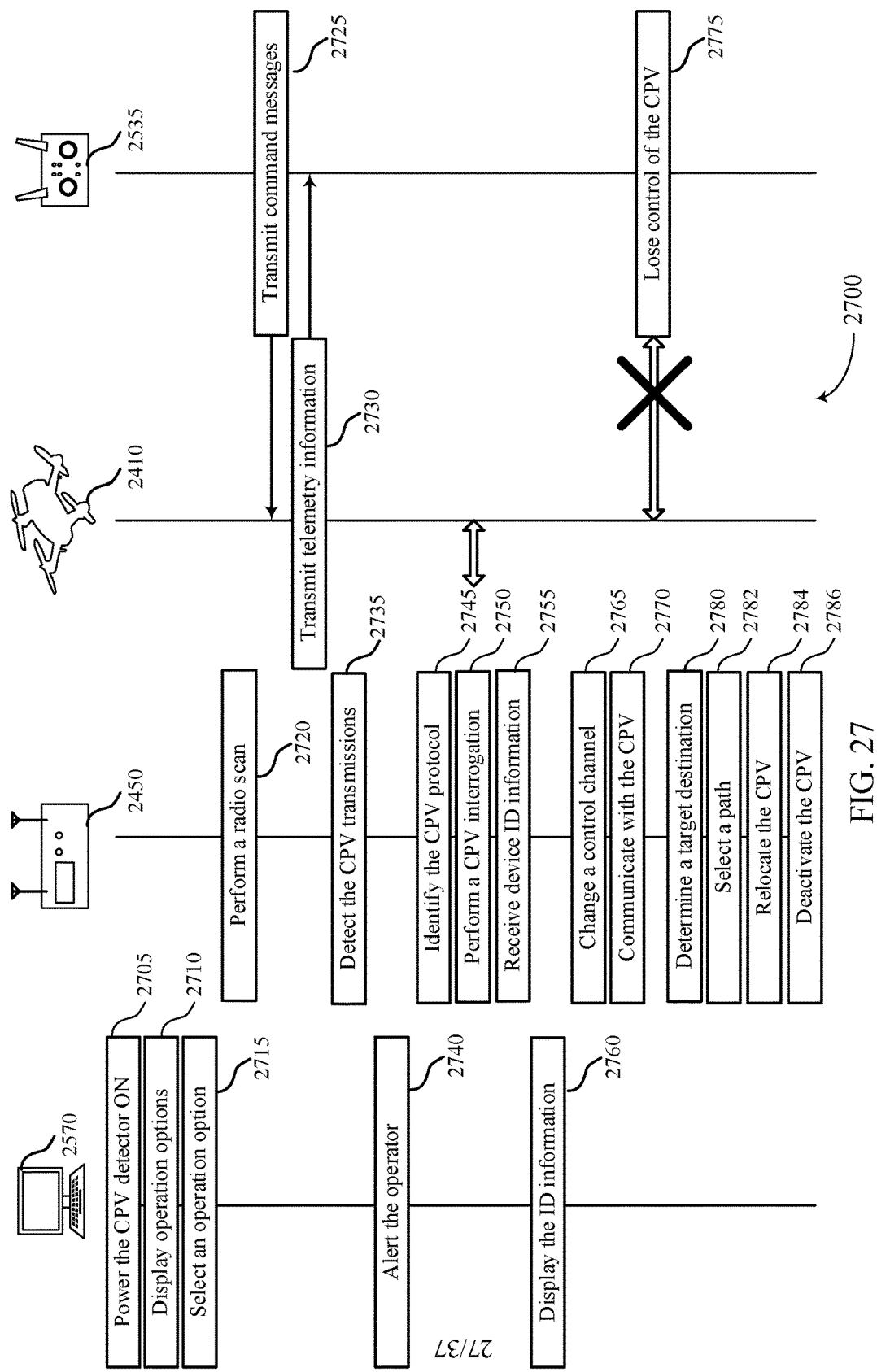
FIG. 27 shows a ladder diagram for the process of FIG. 26 in accordance with aspects of the present disclosure.

FIG. 27 shows a ladder diagram 2700 of a process for identification, detection, capture, seizure, and immobilization of CPV systems 2410 in accordance with aspects of the present disclosure. In some examples, a CPV detector 2450 may execute a set of codes to control functional elements of the CPV detector to perform the described functions. Additionally or alternatively, a CPV detector 2450 may use special-purpose hardware.

The system embodiment of FIG. 26 include four main components: the CPV detector 2450, an operator module 2570, the CPV 2410, and the CPV controller 2435. Although the operator module 2570 is illustrated in FIG. 27 as a separate element for process purposes, it will be understood that the operator module 2570 will typically be included in the CPV 2505 as shown in FIG. 25.

The main components will receive or send various messages to each other, directed or broadcast. The CPV detector 2450 may, among other things, receive an alert message when a potential intruder is detected. The CPV detector 2450 must also remain informed of critical intruder data via a display coupled to the operator module 2570. The process begins by receiving broadcast telemetry from either the CPV 2410, the CPV controller 2435, or possibly an active subsystem of the CPV 2410 that is detected on the remote control RF channel. The CPV detector 2450 proceeds to identify enough about the CPV 2410 itself (and possibly the CPV controller 2435) to label it a threat (or not) and to determine the appropriate manufacturer protocol to encode and decode telemetry messages to and from the threat device.

Eventually, during capture, the CPV detector 2450 captures control of the threat device from the CPV controller 2435 so that the controller 2435 cannot reconnect and the CPV detector 2450 control is exclusive. During the seize phase the threat is commanded by the CPV detector 2450 to physically relocate, in a low risk path, to a low risk location to deactivate in the next deactivate phase. The CPV (intruder, threat) 2410 broadcasts telemetry on one of the remote control channels for the CPV detector 2450 to hear and analyze. The CPV 2410 eventually changes its channel in response to a command by the CPV detector 2450 during the capture phase, cutting off its own controller 2435 from all contact. Then, during seize, the threat is commanded to move by a low risk path to a low risk destination for eventually shutdown, deactivate. The original CPV controller 2435 has an open communication channel to the threat up to the point where the CPV detector 2450 commands the threat to change its command and control channel, when its controller 2435 becomes impotent.

The deactivation phase is the final phase. At this phase, the threat device (CPV) 2410 has been detected, identified, captured, and seized. The threat device 2410 has been brought to the target location, and may be still running and operational. The threat device 2410 may now be commanded to shut down entirely so that it is no longer available for commands or movement through radio signals.

In some cases, prior to deactivation, the threat device 2410 may be located at a target destination. After successful deactivation of the threat device 2410, it may be available for legal seizure by law enforcement.

At block 2705 the operator module 2570 may power the CPV detector 2450 ON. In certain examples, aspects of the described operations by the operator module 2570 may be carried out by other components of the CPV detector 2450.

At block 2710 the operator module 2570 may display operation options, including an automatic operation option.

At block 2715 the operator module 2570 may select an operation option.

At block 2720 the CPV detector 2450 may perform a radio scan.

At block 2725 the CPV controller 2435 may transmit command messages.

At block 2730 the CPV 2410 in response to the CPV controller 2435 may transmit telemetry information. In certain examples, aspects of the described operations may be performed by CPV 105, 305, and 2410 as described with reference to FIGS. 1, 3, and 24.

At block 2735 the CPV detector 2450 may detect the CPV 2410 transmissions.

At block 2740 the CPV detector 2450 may alert the operator regarding the operator module 2570.

At block 2745 the CPV detector 2450 may identify the CPV protocol. In certain examples, aspects of the described operations may be performed by identification component 2545 as described with reference to FIG. 25.

At block 2750 the CPV detector 2450 may perform a CPV interrogation. In certain examples, aspects of the described operations may be performed by identification component 2545 as described with reference to FIG. 25.

At block 2755 the detector 2450 may receive device identification information. In certain examples, aspects of the described operations may be performed by identification component 2545 as described with reference to FIG. 25.

At block 2760 the operator module 2570 may display the identification information.

At block 2765 the CPV detector 2450 may change a control channel of the CPV. In certain examples, aspects of the described operations may be performed by capture component 2555 as described with reference to FIG. 25.

At block 2770 the CPV detector 2450 may communicate with the CPV 2410 using the changed control channel. In certain examples, aspects of the described operations may be performed by capture component 2555 as described with reference to FIG. 25.

At block 2775 the CPV controller 2435 may lose control of the CPV. In certain examples, aspects of the described operations may be performed by CPV controller 2435 as described with reference to FIG. 24.

At block 2780 the detector 2450 may determine a target destination. In certain examples, aspects of the described operations may be performed by Seizure component 2560 as described with reference to FIG. 25.

At block 2782 the detector 2450 may select a path. In certain examples, aspects of the described operations may be performed by Seizure component 2560 as described with reference to FIG. 25.

At block 2784 the C detector 2450 may relocate the CPV by transmitting control commands using the changed control channel. In certain examples, aspects of the described operations may be performed by seizure component 2560 as described with reference to FIG. 25.

At block 2786 the detector 2450 may deactivate the CPV. In certain examples, aspects of the described operations may be performed by capture component 2555 as described with reference to FIG. 25.

Figure 28:
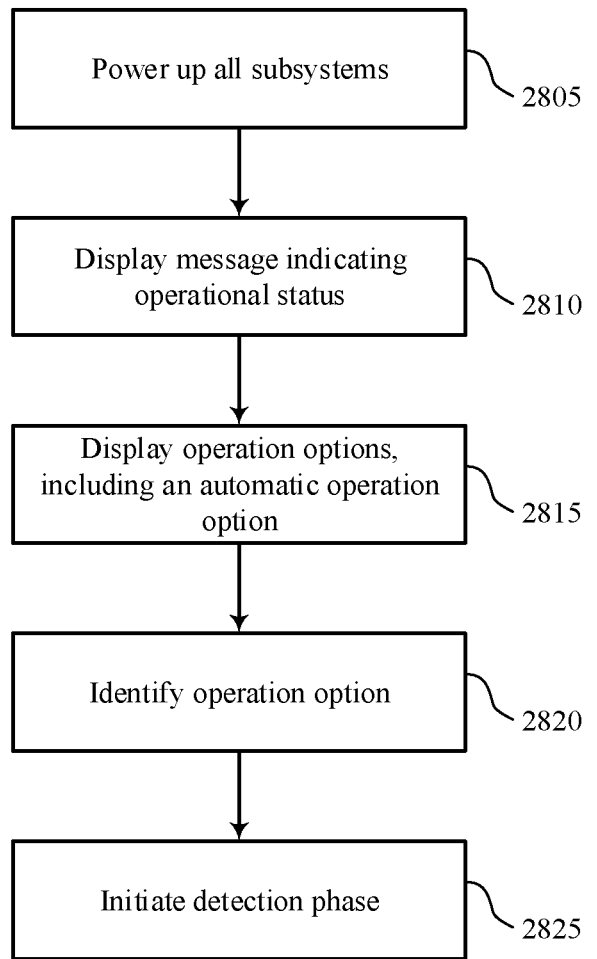
FIG. 28 shows a flowchart of a process for identification, detection, capture, seizure, and immobilization of CPV systems in accordance with aspects of the present disclosure.

FIG. 28 shows a flowchart 2800 of a process for identification, detection, capture, seizure, and immobilization of CPV systems in accordance with aspects of the present disclosure. In some examples, a CPV detector may execute a set of codes to control functional elements of the CPV detector to perform the described functions. Additionally or alternatively, a CPV detector may use special-purpose hardware.

Upon activation, the CPV detection and intervention system may enter an initialization phase. The system may power up and undergo an initialization sequence prior to entering the detect mode. The operator may press an ON switch, determine that all systems are operational: that a battery voltage is in range, that a CPU is operational, that a touch display is operational, that a transceiver is operational, and that other systems are operational. The CPV detection and intervention system may be operated (and sometimes physically held) by an operator who may be legally authorized to use one or more of the available features.

Initialization is the first phase or mode of operation of the CPV detector: it is switched to ON and goes through its own checks to indicate it is fully operational. Upon initialization, the operator is given choices of several modes: for example, Detection and Auto (auto detection through deactivation). Any wireless remote control devices within range can be detected and an alert issued to the CPV detection and intervention system.

At block 2805 the CPV detector may power up all subsystems. In certain examples, aspects of the described operations may be performed by CPV detector 2450 and 2505 as described with reference to FIGS. 24 and 25.

At block 2810 the CPV detector may display message indicating operational status. In certain examples, aspects of the described operations may be performed by operator module 2570 as described with reference to FIG. 25.

At block 2815 the CPV detector may display operation options, including an automatic operation option. In certain examples, aspects of the described operations may be performed by operator module 2570 as described with reference to FIG. 25.

At block 2820 the CPV detector may identify operation option. In certain examples, aspects of the described operations may be performed by operator module 2570 as described with reference to FIG. 25.

At block 2825 the CPV detector may initiate detection phase. In certain examples, aspects of the described operations may be performed by CPV detector 2450 and 2505 as described with reference to FIGS. 24 and 25.

Figure 29:
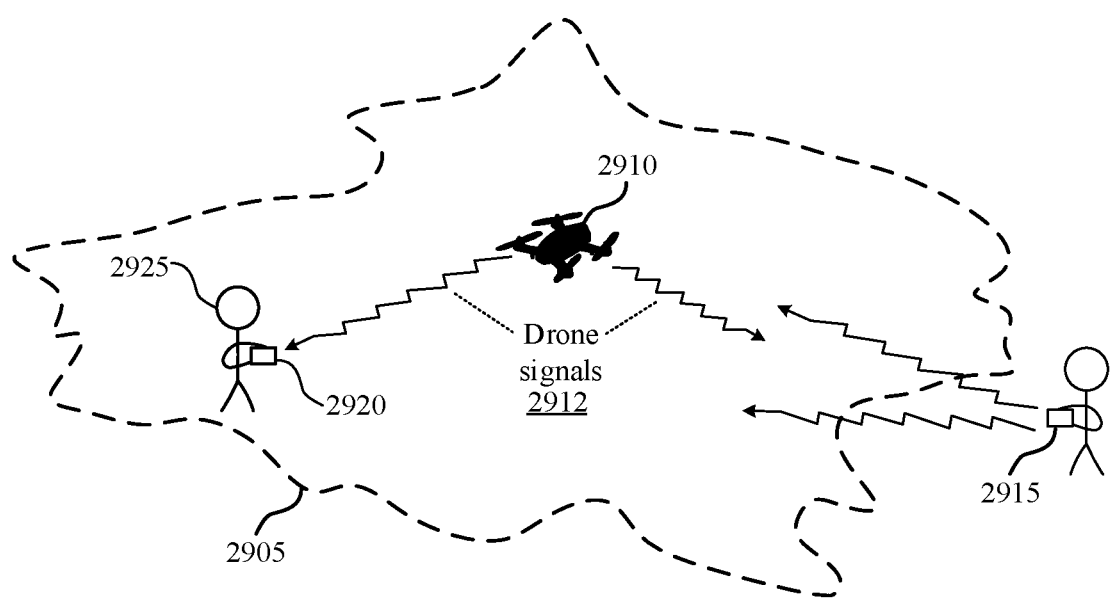
FIG. 29 shows a diagram of a CPV detector engaging in detection of CPV systems in accordance with aspects of the present disclosure.

FIG. 29 shows a diagram 2900 of a CPV detection phase in accordance with aspects of the present disclosure. Diagram 2900 may include controlled area 2905, CPV 2910, CPV controller 2915, and CPV detector 2920.

In some cases, CPV 2910 may encroach on geographically controlled area 2905, which may interfere with the operations of law enforcement, emergency response, or other authorized operations. The controlled area 2905 may be the site of a natural disaster, a crime scene, a sensitive location such as a nuclear power plant, or any other geographic location where restricting CPV activity is desired.

CPV 2910 may emit radio signals 2912 (e.g., to transmit telemetry data to CPV controller 2915). CPV detector 2920 may receive these signals and determine that CPV 2910 is located within the controlled area 2905.

CPV 2910 may incorporate aspects of CPV 105, 305, and 2410 as described with reference to FIGS. 1, 3, and 24. CPV controller 2915 may incorporate aspects of CPV controller 2435 as described with reference to FIG. 24. CPV detector 2450 may be operated by law enforcement personnel, a first responder, or another authorized user and may incorporate aspects of CPV detectors 2450 and 2505 as described with reference to FIGS. 24 and 25.

The CPV detector (authorized operator) includes the self-contained device or has it nearby, initialized and operating in detect mode. The CPV detector receiver scans all remote control device bands and channels for activity that could possibly be a remote-controlled device. The computing device of the CPV detector 2920 performs RF analysis to determine whether the detected activity is related in any way to remote controlled devices. If so, it issues an alert to a CPV detector operator 2925. The detection is indicated on the display screen of the CPV detector with a list of any others that may also have been detected or are currently being tracked.

Figure 30:
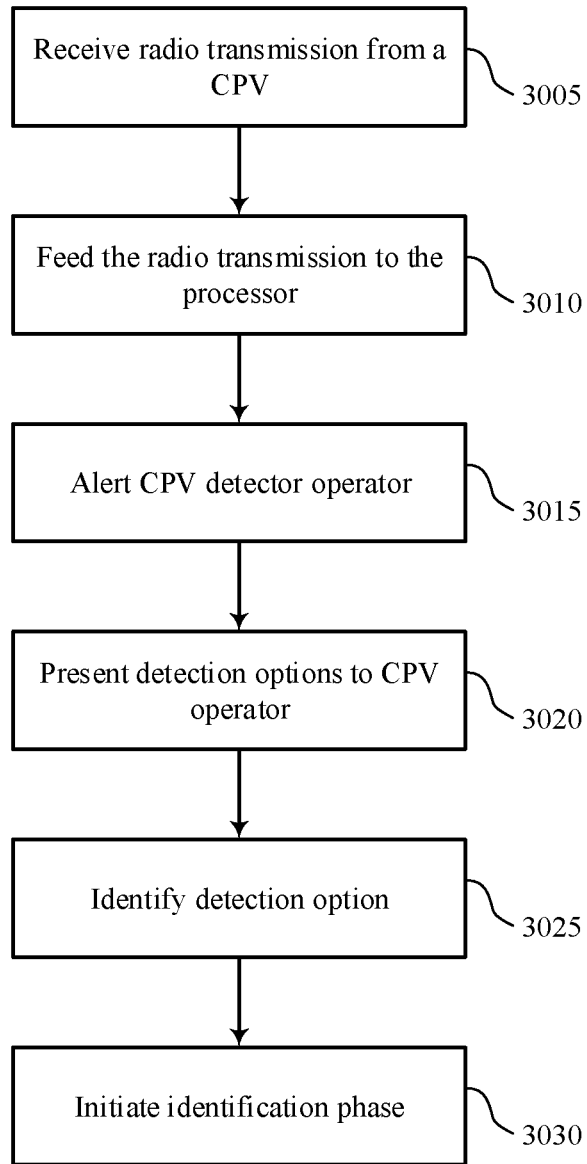
FIGS. 30 through 33 show flowcharts of a process for identification, detection, capture, seizure, and immobilization of CPV systems in accordance with aspects of the present disclosure.

FIG. 30 shows a flowchart 3000 of a process for identification, detection, capture, seizure, and immobilization of CPV systems in accordance with aspects of the present disclosure. In some examples, a CPV detector may execute a set of codes to control functional elements of the CPV detector to perform the described functions. Additionally or alternatively, a CPV detector may use special-purpose hardware.

After the initialization phase, the CPV detector may enter the detect phase or mode in order to detect any incoming threats (i.e., unauthorized CPVs 2910). That is, the system may detect remote controlled CPV activity and Alert operator to all active wireless remote control devices in range. In the detect mode, a receiver may scan all remote control device channels in each remote control device band. Such channels and bands may be normally assigned for certain uses and given protocols for use. A receiver radio may be capable of scanning outside these normal channels and bands as necessary. The receiver radio may scan all channels for device accessory communications such as battery, video stream and other subsystems of the CPV 2910 that emit RF independently of their own. A CPV detector computing device may then perform RF analysis to determine the existence of device activity on channel n, band x that can be attributed to device operation or operation of device peripherals/accessories. If device activity is found, the CPV detector immediately indicates to operator an alert to the existence of an active device in range. The alert may include text, lights, sounds and/or vibrations.

An operator may manually choose option to proceed to the identify phase, or to merely monitor the activity and go no further. If the CPV detector 2920 is in auto mode, then it may automatically proceed to the identify phase. In some cases, a map is provided on a display for the operator, where all location information and identity information are provided on a topographical map of the area for the operator to keep track of the threats being tracked.

After the detect mode, the CPV detector may log a wireless remote control device activity on a give channel (e.g., channel n and band x). An operator may be alerted to the presence of any device, device accessory or device controller in range. Detected CPVs are listed on a display, e.g., on a topographical map of an in-range area.

At block 3005 the CPV detector may receive radio transmission from a CPV. In certain examples, aspects of the described operations may be performed by detection component 2540 as described with reference to FIG. 25.

At block 3010 the CPV detector may feed the radio transmission to the processor. In certain examples, aspects of the described operations may be performed by detection component 2540 as described with reference to FIG. 25.

At block 3015 the CPV detector may alert a CPV detector operator. In certain examples, aspects of the described operations may be performed by operator module 2570 as described with reference to FIG. 25. The CPV detector operator 2925 may be as shown in FIG. 29

At block 3020 the CPV detector may present detection options to CPV operator. In certain examples, aspects of the described operations may be performed by operator module 2570 as described with reference to FIG. 25.

At block 3025 the CPV detector may identify detection option. In certain examples, aspects of the described operations may be performed by operator module 2570 as described with reference to FIG. 25.

At block 3030 the CPV detector may initiate identification phase. In certain examples, aspects of the described operations may be performed by CPV detector 2450 and 2505 as described with reference to FIGS. 24 and 25.

Figure 31:
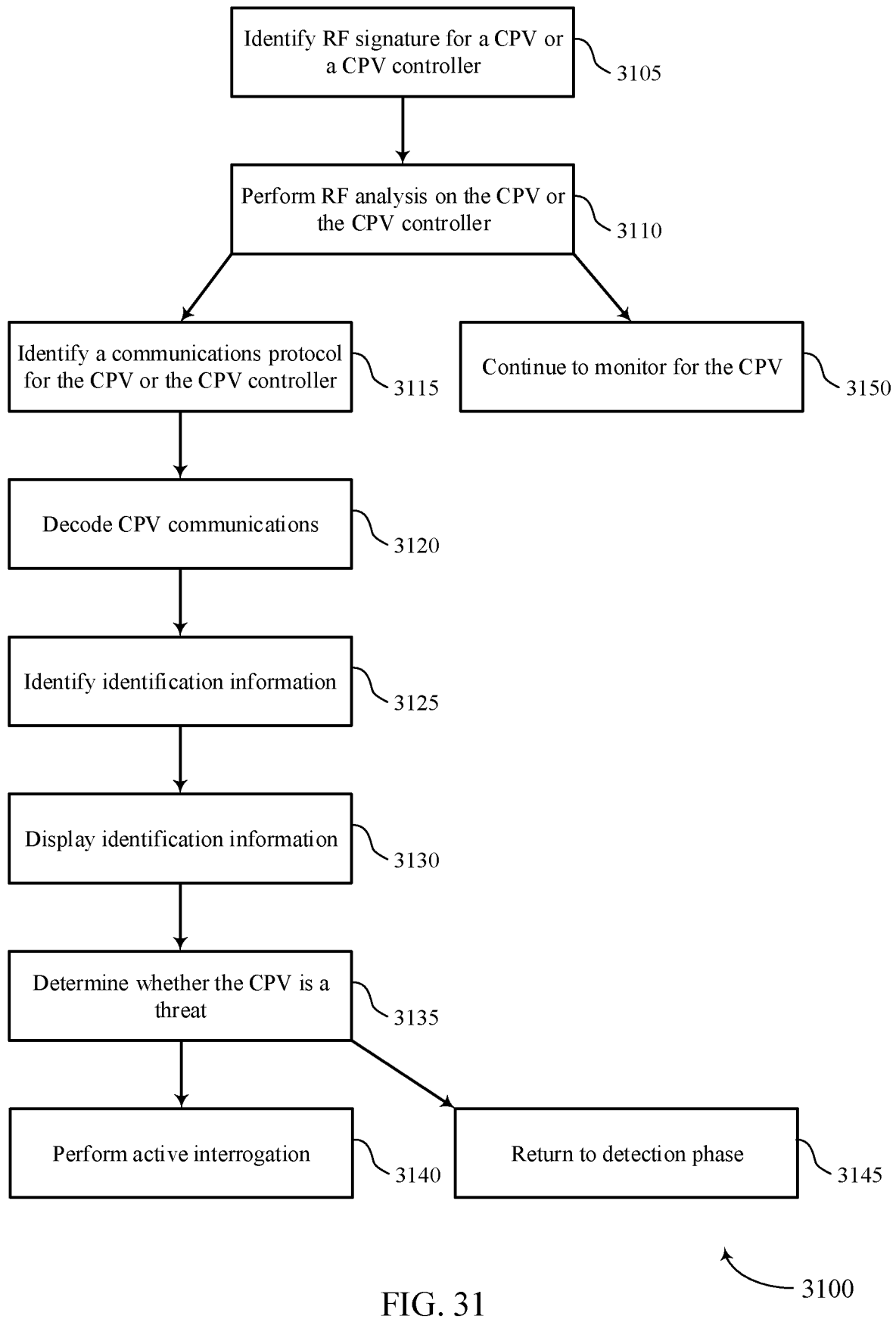

FIG. 31 shows a flowchart 3100 of a process for identification, detection, capture, seizure, and immobilization of CPV systems in accordance with aspects of the present disclosure. In some examples, a CPV detector may execute a set of codes to control functional elements of the CPV detector to perform the described functions. Additionally or alternatively, a CPV detector may use special-purpose hardware.

Once an intruder CPV is detected, the CPV CPV detector may enter an identification mode or phase. If the identification mode is chosen (manually or by an auto mode sequence), the RF data stream from that detected Intruder is analyzed for all identifying information to be collected and displayed to the CPV detection and intervention system. Identification information, at the outset, may even be a video stream that is then displayed to the CPV CPV detector in order to determine whether the device poses a threat or has malicious intentions so that the operator will continue to identify and then transition to capture right through deactivation. This is the passive identification mode, i.e., identification by mere passive "listening" to the data stream. The CPV detector computing device continues a thorough RF analysis to see if it can determine a match between the RF pattern it observes and RF patterns known to be derived from given manufacturer's protocols (e.g., using a protocol database). Once the correct protocol is determined for that Intruder, the CPV detector computing device can decode its telemetry data for any other identifying details such as GPS location, Flight Plan, Point of Launch, and battery condition (operating time remaining). Further, with this protocol, the CPV detector computing device can now encode messages and commands to the intruder that it will process just as it would process messages and commands from its CPV controller.

Thus, the CPV detector may perform passive, receiver only RF analysis on a stream of CPV data. The CPV detector derives information by passively analyzing the raw data stream being received. The data stream may be scanned for patterns/signatures in order to match it with typical patterns. The CPV detector then determines whether the data stream is from a CPV, CPV controller, or CPV accessory. If the data is from a CPV or CPV controller, the CPV detector may determine a correct protocol by RF analysis. If a CPV detector identifies a match with data patterns/signatures of known drone manufacturer communication protocols, it may infer that this is the protocol being used by the CPV. Once the protocol is determined, the CPV detector may use the protocol to decode drone packets (chunks of information in the data stream) and perform drone packet content analysis for anything of interest.

At block 3105 the CPV detector may identify RF signature for a CPV or a CPV controller. In certain examples, aspects of the described operations may be performed by identification component 2545 as described with reference to FIG. 25.

At block 3110 the CPV detector may perform RF analysis on the CPV or the CPV controller. In certain examples, aspects of the described operations may be performed by identification component 2545 as described with reference to FIG. 25. If the analysis indicates the presence of a CPV, the process may proceed to block 3115. Otherwise, the process may proceed to block 3150.

At block 3115 the CPV detector may identify a communications protocol for the CPV or the CPV controller. In certain examples, aspects of the described operations may be performed by identification component 2545 as described with reference to FIG. 25.

At block 3120 the CPV detector may decode CPV communications. In certain examples, aspects of the described operations may be performed by identification component 2545 as described with reference to FIG. 25.

At block 3125 the CPV detector may identify identification information. In certain examples, aspects of the described operations may be performed by identification component 2545 as described with reference to FIG. 25.

At block 3130 the CPV detector may display identification information. In certain examples, aspects of the described operations may be performed by operator module 2570 as described with reference to FIG. 25.

At block 3135 the CPV detector may determine whether the CPV is a threat. In certain examples, aspects of the described operations may be performed by identification component 2545 as described with reference to FIG. 25. If the CPV is a threat, the process may proceed to block 3140. Otherwise, the process may proceed to block 3145.

At block 3140 the CPV detector may perform active interrogation. In certain examples, aspects of the described operations may be performed by identification component 2545 as described with reference to FIG. 25.

At block 3145 the CPV detector may return to detection phase. In certain examples, aspects of the described operations may be performed by detection component 2540 as described with reference to FIG. 25.

At block 3150 the CPV detector may continue to monitor for the CPV. In certain examples, aspects of the described operations may be performed by detection component 2540 as described with reference to FIG. 25.

Figure 32:
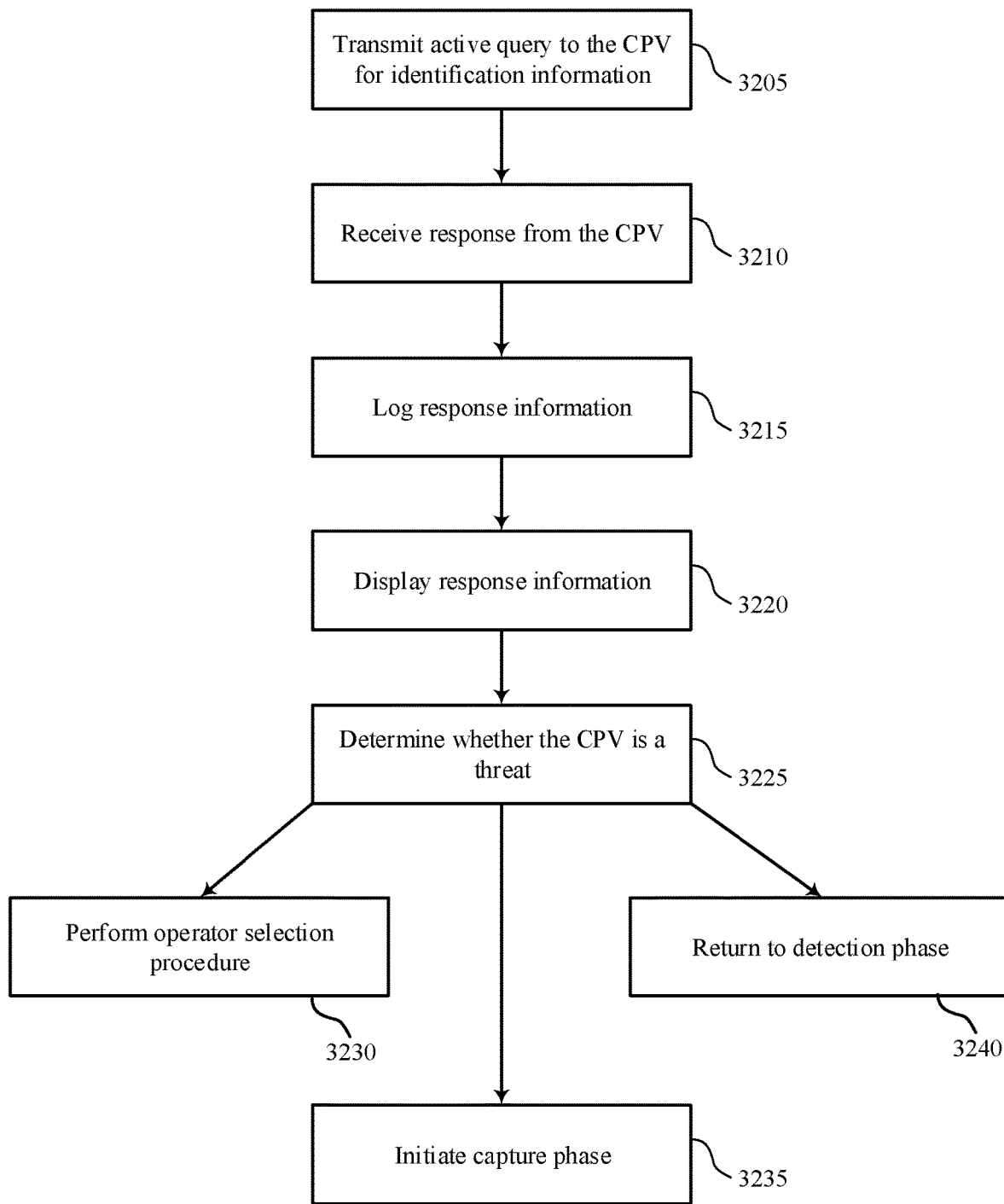

FIG. 32 shows a flowchart 3200 of a process for identification, detection, capture, seizure, and immobilization of CPV systems in accordance with aspects of the present disclosure. In some examples, a CPV detector may execute a set of codes to control functional elements of the CPV detector to perform the described functions. Additionally or alternatively, a CPV detector may use special-purpose hardware.

Once an intruder CPV is passively detected, the CPV detection and intervention system may enter an active identification mode or phase. The CPV CPV detector issues properly encoded queries and receives requested information to be decoded and displayed to the operator. At this point, the CPV CPV detector has the option to take full command of the device and to completely eliminate any further control or connection with its original controller. If this is desired by the CPV CPV detector or is in auto mode, it requires a transition to capture mode.

Thus, the CPV detector may be used to gather and record information from a CPV relevant to identification. The system may use RF analysis of a CPV communications stream to derive correct communications protocol in order to decode details of device broadcast communications (i.e., deep packet inspection).

Prior to active identification, the CPV CPV detector may be located in range for receiving CPV communications. The CPV detector computing device may have onboard access to a database of remote controlled device manufacturers and the protocols that they established for their device-to-device or device-to-controller communications and commands. The CPV detector may have detected radio activity on a given radio channel, and accessed a main control communication channel for CPV, CPV controller, or CPV node.

During active identification, the CPV detector may use an identified communication protocol to actively (i.e., using a radio transmitter) communicate with the CPV itself, i.e., query the drone/CPV for any and all information about itself that is available. The scope of the communication may be limited by the manufacturer's protocol as to the information available for queries. During active identification, the CPV detector may transmit inquiries to the CPV for launch location, destination, other information. The CPV detector may then notify the operator of critical ID information including: a CPV profile, text information, map/location information, and whether the CPV is classified as a threat.

The operator may then be given a choice to enter the capture phase or to proceed with detection or identification of other CPVs. For example, the CPV detector may go back to detecting drones in general, and merely track the current CPV (i.e., since it is whitelisted). After active identification, a communication link is established, and the CPV detector may have the same control over the CPV as the CPV controller. However, the CPV remains under the control of the CPV controller.

At block 3205 the CPV detector may transmit active query to the CPV for identification information. In certain examples, aspects of the described operations may be performed by identification component 2545 as described with reference to FIG. 25.

At block 3210 the CPV detector may receive response from the CPV. In certain examples, aspects of the described operations may be performed by identification component 2545 as described with reference to FIG. 25.

At block 3215 the CPV detector may log response information. In certain examples, aspects of the described operations may be performed by identification component 2545 as described with reference to FIG. 25.

At block 3220 the CPV detector may display response information. In certain examples, aspects of the described operations may be performed by operator module 2570 as described with reference to FIG. 25.

At block 3225 the CPV detector may determine whether the CPV is a threat. In certain examples, aspects of the described operations may be performed by identification component 2545 as described with reference to FIG. 25. In some cases, the process may proceed to block 3230. If the device is in auto mode, it may automatically proceed to block 3235. If the CPV is not a threat (i.e., it is whitelisted), the process may proceed to block 3240.

At block 3230 the CPV detector may perform operator selection procedure. In certain examples, aspects of the described operations may be performed by identification component 2545 as described with reference to FIG. 25.

At block 3235 the CPV detector may initiate capture phase. In certain examples, aspects of the described operations may be performed by capture component 2555 as described with reference to FIG. 25.

At block 3240 the CPV detector may return to detection phase. In certain examples, aspects of the described operations may be performed by detection component 2540 as described with reference to FIG. 25.

Figure 33:
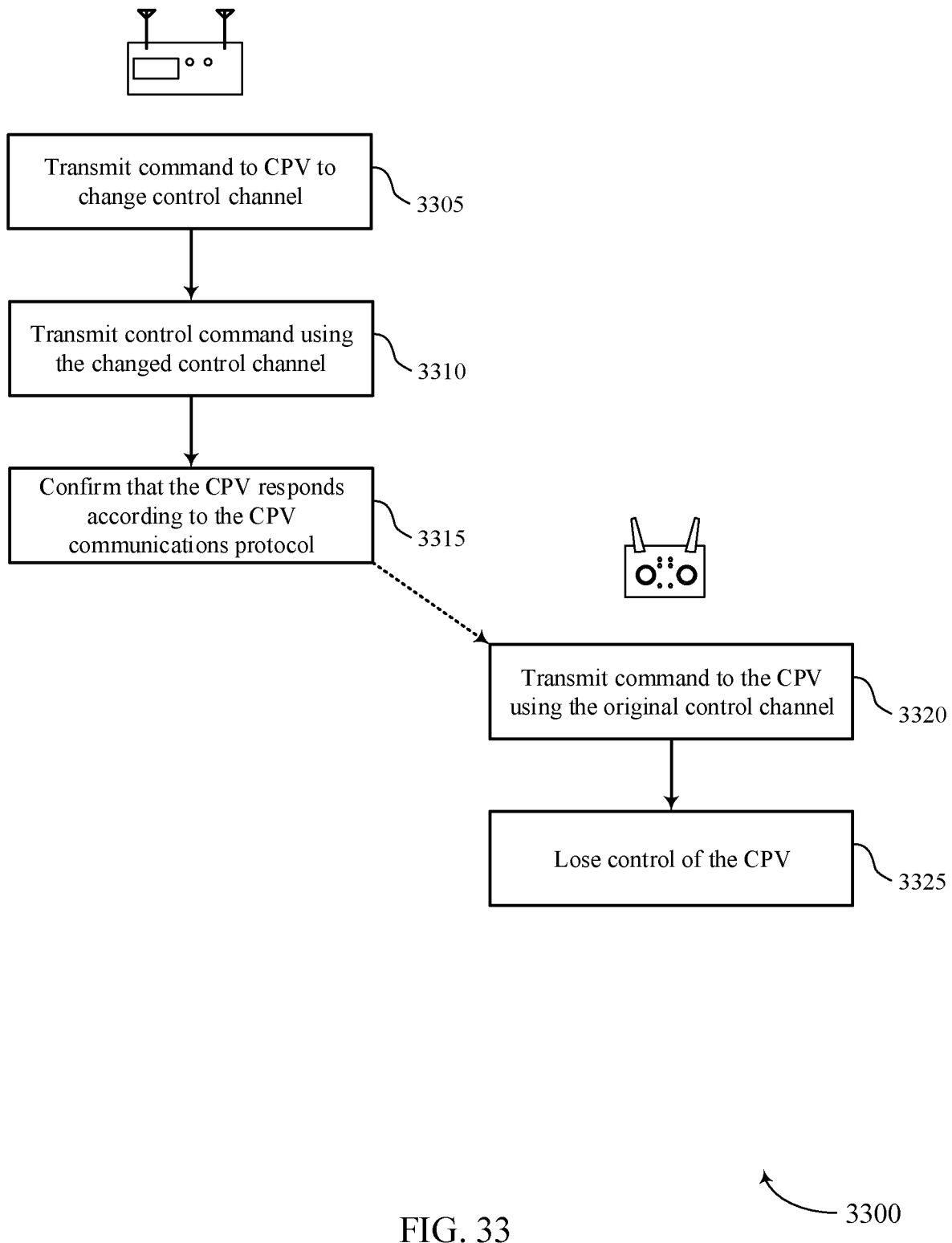

FIG. 33 shows a flowchart 3300 of a process for identification, detection, capture, seizure, and immobilization of CPV systems in accordance with aspects of the present disclosure. In some examples, a CPV detector may execute a set of codes to control functional elements of the CPV detector to perform the described functions. Additionally or alternatively, a CPV detector may use special-purpose hardware.

Once a CPV has been fully identified, the CPV detector may enter capture phase or mode. Capture corresponds to the full and exclusive command and control of the intruder. Capture may be accomplished by issuing a command to the CPV to change command and control channel to reduce interference problems on current channel" (a fairly common controller command in channel interference cases.) The original CPV controller does not process this command since it may not have the capability to process commands issued to it. In some case, the command appears to be coming from the original CPV controller. Therefore, the original CPV controller may have no indication that the command and control channel has changed and will remain on its channel with no knowledge of the change. Meanwhile, the CPV has changed its command and control channel to the one commanded exclusively by the CPV CPV detector, so the CPV detector becomes the exclusive controller for the intruder now, fully capable of command and control by use of the protocol.

The basic function of the capture mode is to take full control of an intruder CPV by replacing the CPV controller with the CPV detection and intervention system as controller. This may exclude the original CPV controller from any further communication with the CPV. Prior to entering capture mode, a radio receiver may have established reliable communication reception with the CPV, the CPV may be under full control of its CPV controller using a CPV communication protocol. In some cases, the CPV detector operator may be legally authorized to take control of private property.

The CPV controller uses CPV communication protocol to actively communicate with the intruder CPV. In some cases, when faced with channel interference, the CPV controller may command the CPV to change its current command channel (i.e., the communication channel or main channel) to another channel chosen by the CPV controller. However, the communication protocols may not reveal the new channel to the listening CPV controller. Thus, the original intruder CPV controller may have no way to find the CPV. Thus, the original intruder CPV may be completely severed from the CPV. Thus the CPV detection and intervention system may be in full, exclusive control of the intruder CPV. In some cases, the CPV detection and intervention system issues a position hold command which tells drone/CPV to stay at current altitude and coordinates while awaiting further directions.

At block 3305 the CPV detector may transmit command to CPV to change control channel. In certain examples, aspects of the described operations may be performed by capture component 2555 as described with reference to FIG. 25.

At block 3310 the CPV detector may transmit control command using the changed control channel. In certain examples, aspects of the described operations may be performed by capture component 2555 as described with reference to FIG. 25.

At block 3315 the CPV detector may confirm that the CPV responds according to the CPV communications protocol. In certain examples, aspects of the described operations may be performed by capture component 2555 as described with reference to FIG. 25.

At block 3320 the original CPV controller may transmit command to the CPV using the original control channel. However, these commands may not be received by the CPV (as the CPV has changed to another channel). In certain examples, aspects of the described operations may be performed by CPV controller 2435 as described with reference to FIG. 24.

At block 3325 the original CPV controller may lose control of the CPV. In certain examples, aspects of the described operations may be performed by CPV controller 2435 as described with reference to FIG. 24.

Figure 34:
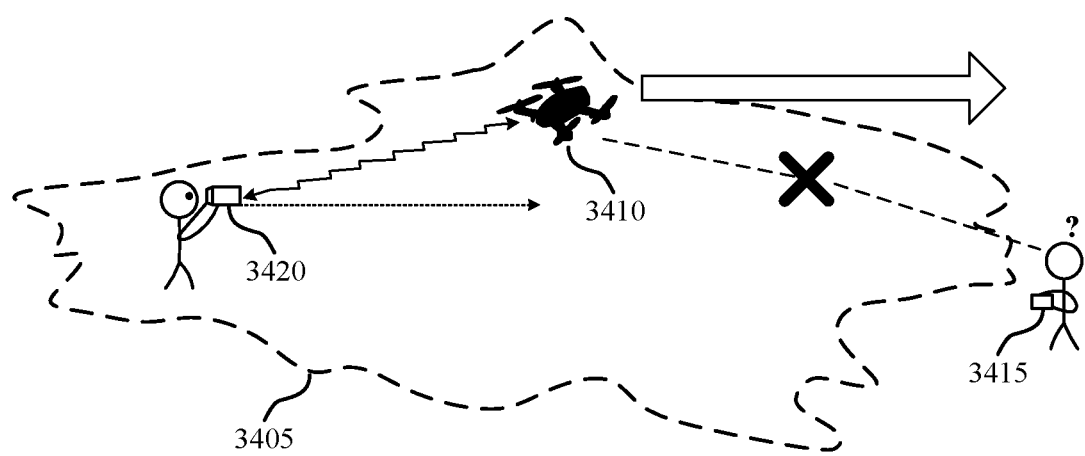
FIG. 34 shows a diagram of a CPV seizure phase in accordance with aspects of the present disclosure.
Figure 34:
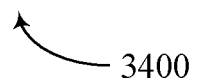

FIG. 34 shows a diagram 3400 of a CPV seizure phase in accordance with aspects of the present disclosure. Diagram 3400 may include controlled area 3405, CPV 3410, CPV controller 3415, and CPV detector 3420.

A CPV 3410 may encroach on geographically controlled area 3405, which may interfere with the operations of law enforcement, emergency response, or other authorized operations. The controlled area 3405 may be the site of a natural disaster, a crime scene, a sensitive location such as a nuclear power plant, or any other geographic location where restricting CPV activity is desired.

After the CPV 3410 is detected, identified, and captured, CPV controller 3415 may no longer have any communication or control with CPV 3410. Rather, the operator of CPV detector 3420 may have complete control of CPV 3410. In some cases, CPV detector 3420 may control CPV 3410 independently without direct intervention from an operator.

CPV detector 3420 may then seize CPV 3410 and either direct it to a new location, command it to land, command it to retain its position, or immobilize/deactivate it. In some cases, CPV detector 3420 may relocate CPV 3410 using a geocoding subsystem to identify its location and select a new target location. In some cases, CPV 3410 may leave the controlled area 3405 according to direction from CPV detector 3420 and may then be deactivated.

CPV 3410 may incorporate aspects of CPV 105 and 305 and 2410 as described with reference to FIGS. 1, 3, and 24. CPV controller 2915 may incorporate aspects of CPV controller 2435 as described with reference to FIG. 24. CPV detector 2450 may be operated by law enforcement personnel, a first responder, or another authorized user and may incorporate aspects of CPV detectors 2450 and 2505 as described with reference to FIGS. 24 and 25.

Figure 35:
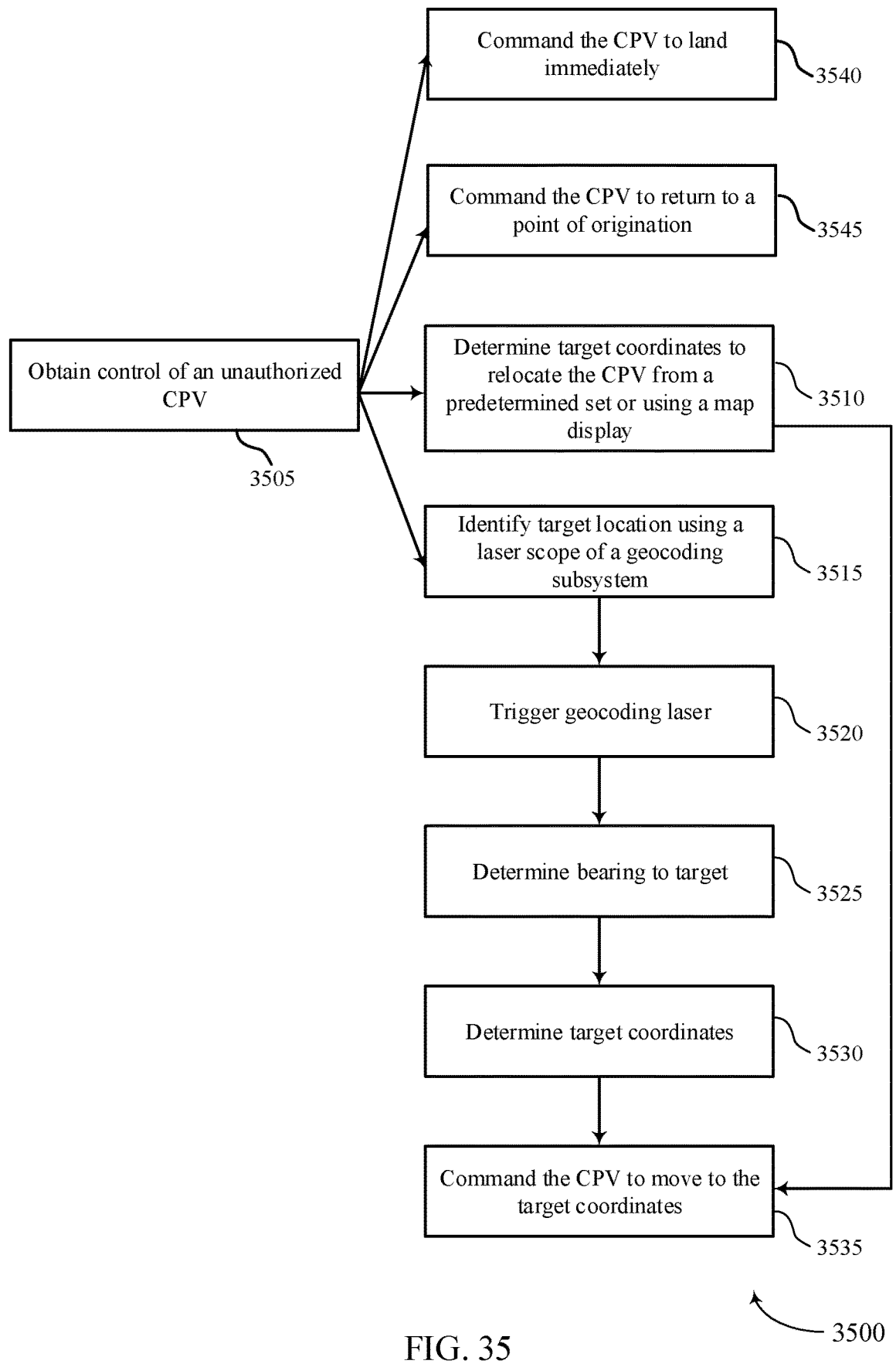
FIGS. 35 and 36 show flowcharts of a process for identification, detection, capture, seizure, and immobilization of CPV systems in accordance with aspects of the present disclosure.

FIG. 35 shows a flowchart 3500 of a process for identification, detection, capture, seizure, and immobilization of CPV systems in accordance with aspects of the present disclosure. In some examples, a CPV detector may execute a set of codes to control functional elements of the CPV detector to perform the described functions. Additionally or alternatively, a CPV detector may use special-purpose hardware.

After capture of a CPV, the CPV detector may enter the seize phase of mode. Seizure is the active exercise of physical and logical control over the CPV after the capture mode has completed by determination of the protocol and issuance of the commands necessary to assign full command and control to the CPV detection and intervention system over the CPV to the exclusion of its original controller. Seizure may lower or eliminate the risk that a CPV presents.

The first two available options during seizure are: command the intruder to return to its launch point (its origin) or to command the intruder to immediately stop where it is, land if needed, then deactivate itself. The latter is an emergency maneuver in cases where there is little or no time to reroute the intruder, the operator determines that it must be out of the way immediately regardless of any secondary risks.

The next options available to the CPV detector involve the eventual goal of re-routing the intruder to a safe location where it will deactivate itself and become available for physical custody of authorities who may need to enforce rules or regulations on the owner or operator of the seized device, and to impound it as evidence or for retrieval.

The CPV detector may determine a relatively safe target location as a destination for the intruder, a place to deactivate it. In some cases, there may be at least three options including: utilize a predetermined target destination; choose a target destination based on a touchscreen map and a finger indication on that map; or choose a target destination by visual spotting through the optical scope of the geocoding subsystem.

The geocoding subsystem, typically attached and integrated into the CPV detector, can be used for visual choice of target destination by, sighting down the scope at the desired target and triggering the distance measuring laser. The geocoding subsystem computing device utilizes unique software and algorithms to produce accurate geo coordinates for the visually located target. The calculation may be based on the input from the distance measuring laser: distance from CPV detector to target; input from the sub-meter GPS that gives the exact position of the CPV detection and intervention system itself; and, the input from a 3-axis MEMS gyroscope that gives the bearing on the target from the CPV detector. With these three qualities, the precise position for the target destination can be calculated by the geocoding subsystem software running on the geocoding computing device. Once calculated, this target position can be used to define the final destination for the intruder.

At block 3505 the CPV detector may obtain control of an unauthorized CPV. In certain examples, aspects of the described operations may be performed by capture component 2555 as described with reference to FIG. 25.

At block 3510 the CPV detector may determine target coordinates to relocate the CPV from a predetermined set or using a map display. In certain examples, aspects of the described operations may be performed by Seizure component 2560 as described with reference to FIG. 25.

At block 3515 the CPV detector may identify target location using a laser scope of a geocoding subsystem. In certain examples, aspects of the described operations may be performed by geocoding subsystem 2482 and 2535 as described with reference to FIGS. 24 and 25.

At block 3520 the CPV detector may trigger geocoding laser. In certain examples, aspects of the described operations may be performed by geocoding subsystem 2482 and 2535 as described with reference to FIGS. 24 and 25.

At block 3525 the CPV detector may determine bearing to target. In certain examples, aspects of the described operations may be performed by geocoding subsystem 2482 and 2535 as described with reference to FIGS. 24 and 25.

At block 3530 the CPV detector may determine target coordinates. In certain examples, aspects of the described operations may be performed by geocoding subsystem 2482 and 2535 as described with reference to FIGS. 24 and 25.

At block 3535 the CPV detector may command the CPV to move to the target coordinates. In certain examples, aspects of the described operations may be performed by Seizure component 2560 as described with reference to FIG. 25.

At block 3540 the CPV detector may command the CPV to land immediately. In certain examples, aspects of the described operations may be performed by Seizure component 2560 as described with reference to FIG. 25.

At block 3545 the CPV detector may command the CPV to return to a point of origination. In certain examples, aspects of the described operations may be performed by Seizure component 2560 as described with reference to FIG. 25.

Figure 36:
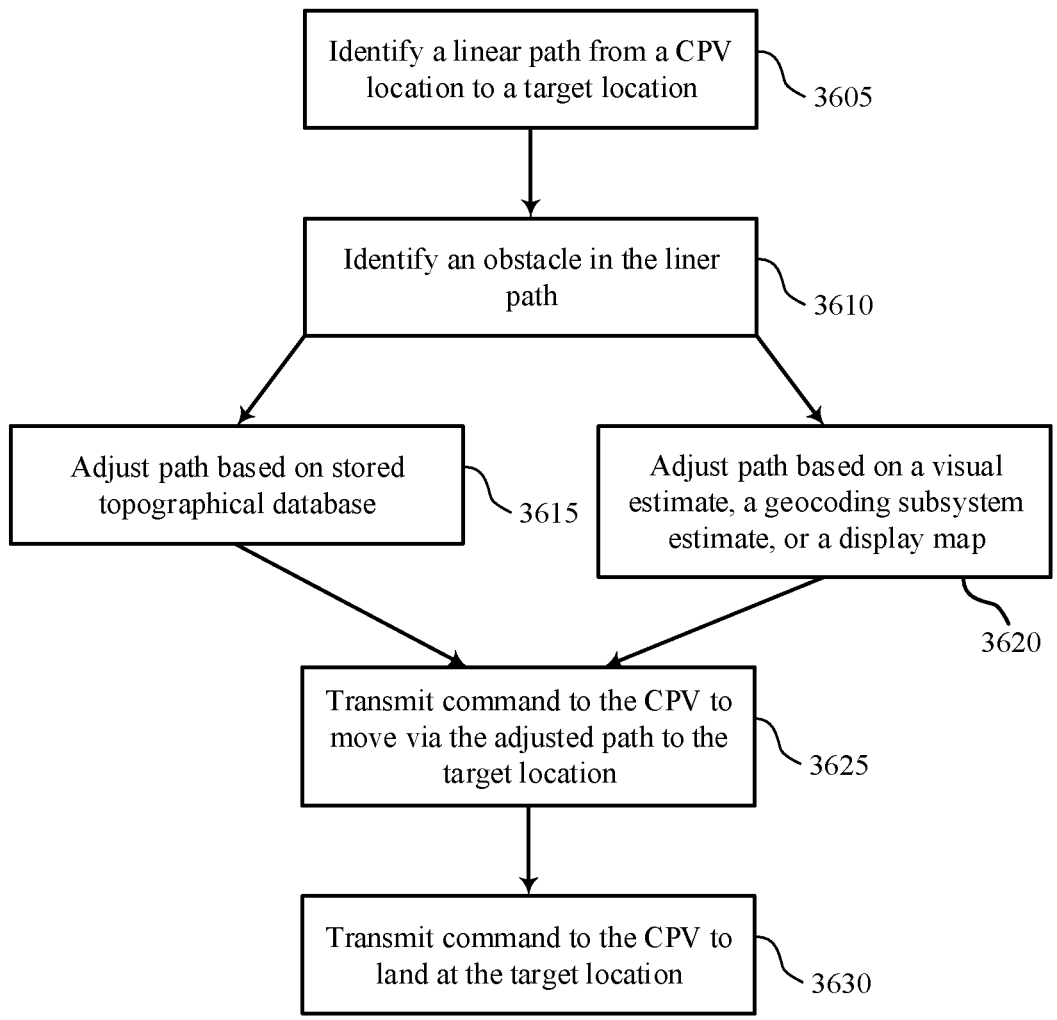

FIG. 36 shows a flowchart 3600 of a process for identification, detection, capture, seizure, and immobilization of CPV systems in accordance with aspects of the present disclosure. In some examples, a CPV detector may execute a set of codes to control functional elements of the CPV detector to perform the described functions. Additionally or alternatively, a CPV detector may use special-purpose hardware.

In some cases, the CPV detector may detect an obstacle during relocation of a CPV and may utilize an obstacle avoidance mode or function. Thus, to minimize risk the CPV CPV detector may consider whether there are any obstacles in a linear path where natural features or structures (or other vehicles) would interfere with relocation. Collisions between drones and obstructions can be very dangerous (some batteries are highly unstable and can explode or burst into flames.)

The purpose of the collision avoidance mode is to determine an obstacle-free path from the intruder at its current coordinates over to the target destination coordinates at altitude. When this path is determined, the intruder may simply follow the path to safely arrive directly above the target destination, where it can be commanded to land vertically and deactivate itself right there as desired. Inputs to this mode include: current intruder altitude (if flying device), coordinates of the CPV, and coordinates of the target destination. If no obstacles are observed in the linear path from the intruder's coordinates to the target destination geo coordinates, then the intruder may simply be commanded to move to the target geo coordinates and land if necessary.

However, if any obstacles, or potential obstacles are observed, either visually or by map representation, the CPV's path to the target destination must be adjusted to avoid those obstacles. First consider adjustments in altitude (vertical). The simplest approach supported by the CPV detector is to set the intruder altitude so that it clears the tallest obstacle along the path. In that way, the CPV can move by the linear path to the target destination without collision. The required adjustments may be made to the altitude automatically by features in the CPV detection and intervention system, and there are provisions for manual, incremental altitude adjustments by the CPV detection and intervention system. This may be referred to as vertical collision avoidance.

There is another option for clearing obstacles in a path, the horizontal dimension. The path may be adjusted to avoid obstacles horizontally by the CPV detector changing the path on the CPV detector map display. The CPV detector may use the CPV detector touchscreen display to adjust the displayed path with one or more incremental horizontal movements around obstacles drawn on that display by the CPV detector. Essentially, the operator sets a waypoint or waypoints for very simple, incremental subpaths around each obstacle, culminating with an obstacle free path with the required waypoint(s) now included.

The auto mode for collision avoidance can automatically set vertical and horizontal waypoints given an accurate, up-to-date set of topographical maps and structural features. Similarly, a CPV detector may be given the option to utilize either vertical, horizontal, or both methods to adjust the path to avoid collisions.

At block 3605 the CPV detector may identify a linear path from a CPV location to a target location. In certain examples, aspects of the described operations may be performed by Seizure component 2560 as described with reference to FIG. 25.

At block 3610 the CPV detector may identify an obstacle in the liner path. In certain examples, aspects of the described operations may be performed by Seizure component 2560 as described with reference to FIG. 25. Based on an operator selection, the process may proceed to either block 3615 or 3620.

At block 3615 the CPV detector may adjust path based on stored topographical database. In certain examples, aspects of the described operations may be performed by Seizure component 2560 as described with reference to FIG. 25.

At block 3620 the CPV detector may adjust path based on a visual estimate, a geocoding subsystem estimate, or a display map. In certain examples, aspects of the described operations may be performed by Seizure component 2560 as described with reference to FIG. 25.

At block 3625 the CPV detector may transmit command to the CPV to move via the adjusted path to the target location. In certain examples, aspects of the described operations may be performed by Seizure component 2560 as described with reference to FIG. 25.

At block 3630 the CPV detector may transmit command to the CPV to land at the target location. In certain examples, aspects of the described operations may be performed by Seizure component 2560 as described with reference to FIG. 25.

Figure 37:
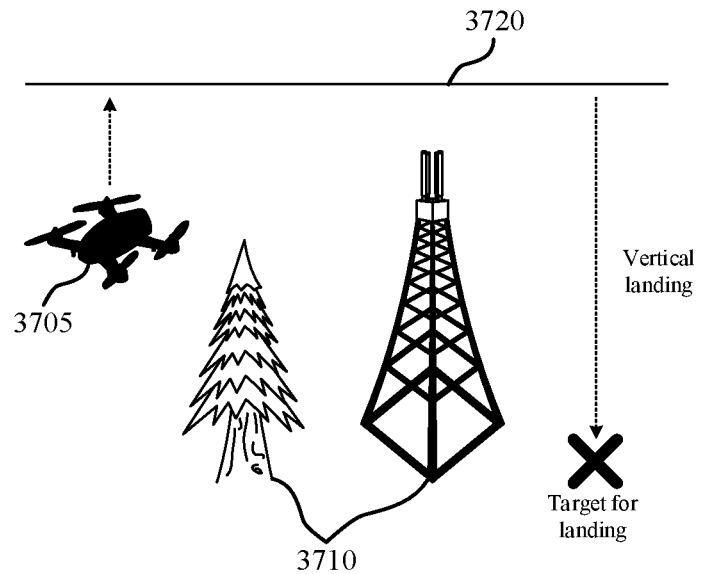
FIG. 37 shows a diagram of avoidance collisions procedure in accordance with aspects of the present disclosure.
Figure 37:
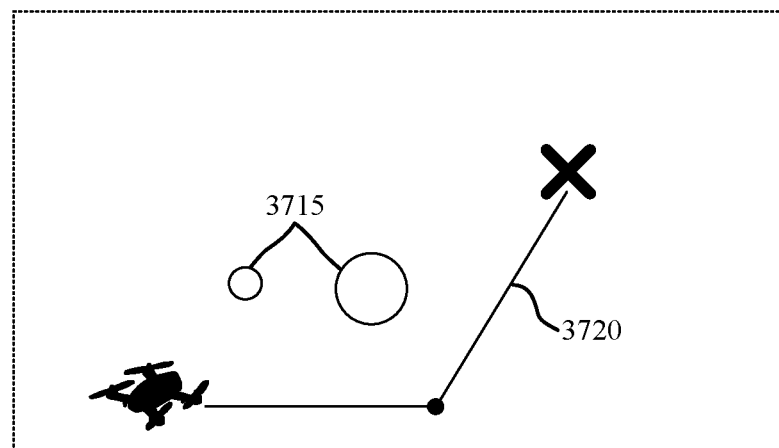

FIG. 37 shows a diagram 3700 of collision avoidance in accordance with aspects of the present disclosure. Specifically, diagram 3700 illustrates examples of path adjustment for a seized CPV 3705 to avoid vertical obstacles 3710 and horizontal obstacles 3715 by selecting an obstacle free path 3720. CPV 3705 may incorporate aspects of CPV 105 and 305 and 2410 as described with reference to FIGS. 1, 3, and 24.

The CPV detector may provide for collision avoidance. Prior to executing collision avoidance, the intruder device controller may have lost its communications link to the intruder device and be unable to reestablish communications. The non-intruder CPV controller may establish a new an exclusive communications channel to the intruder device, input commands with a communications protocol for full control of the intruder device. In one example of collision avoidance, upon establishing the new communications channel, the CPV controller may command the device to immediately land. After landing, the device may be either on the ground, in unknown condition, or in the custody of authorities. In another example of collision avoidance, the CPV controller may command the device to hold position at altitude, at which point the operator may make one of several decisions. In this example, the operator may command the device to return to the custody of its owner.

Another option may include commanding the CPV to move to given coordinates, and to subsequently land to allow for seizure by authorities. Other options may include: sending the CPV to a target location selected from predetermined target coordinates; sending the CPV to a predetermined save target; sending the CPV to the operator's location; sending the CPV to a target location selected by touching a map display; selecting select a target location by use of an optical spotting scope; selecting a target location by use of an optical scope with a geocoding laser; and using the geocoding laser integrated subsystem to measure the distance from the chosen landing location, derive the operator position by onboard GPS, derive the bearing on the visually spotted target coordinates, utilize software algorithm that may produce precise target coordinates for the visually located target, and sending the CPV to the target coordinates.

Collision avoidance may involve determining an obstacle free path 3720 for the CPV to move to the target coordinates. An obstacle free path 3720 may be a straight line between the CPV and the target location. The obstacles for a safe path to the target location may be determined at the current altitude and vertically avoided in one or more of the following ways: visually avoided by the operator, in which the operator may use the geocoding laser to determine the height of the visually determined highest obstacle, and subsequently adjust the CPV's altitude a set number of feet above the calculated height, and sent to the target location; the operator may map the obstacles automatically or through the process described previously to calculate the height of each obstacle, and subsequently add the obstacle to a map, and direct the CPV on a course in which the CPV adjusts its altitude dynamically to a set number of feet above each obstacle. The obstacles may also be avoided horizontally in one or more of the following ways: the operator may offset portions of the straight line path on the display map to avoid marked obstacles by an automatic process or by manually dragging a finger to manipulate the path; the CPV detector computing device may compile waypoints to construct an obstacle free updated flight path to the target location, and the CPV may use the new path along with a final landing waypoint in order to reach a target location.

Additional Description

Some of the functional units described in this specification have been labeled as modules, or components, to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for interacting with a radio frequency remote-controlled vehicle, comprising:
    at least one computing device including a processor, non-transitory memory and a plurality of applications configured to run on the processor;
    at least one database subsystem coupled to the computing device;
    at least one radio receiver coupled to the computing device and configured to select specific radio signals;
    wherein the system is configured to:
        scan a radio frequency spectrum;
        detect a vehicle by intercepting at least a portion of communication protocol data carried by a radio frequency transmission, wherein the communication protocol data is in conformance with a wireless communication protocol, wherein the communication protocol data is sent between the vehicle and a remote controller of the vehicle, wherein the communication protocol data is configured to provide information and commands;
        receive communication protocol-conformant data, wherein the communication protocol-conformant data received includes at least one of data sent from the vehicle and data sent to the vehicle in conformance with the wireless communication protocol;
        using at least a portion of the communication protocol-conformant data, determine if the vehicle is a threat;
        upon determining that the vehicle is a threat, perform the steps of:
        using at least the received communication protocol-conformant data to identify the wireless command protocol used by the remote controller to remotely control the vehicle;
        determining new data to be sent to the vehicle;
        conforming the new data to the identified wireless command protocol; and
        sending the protocol-conformant new data to the vehicle, whereby upon receiving the protocol-conformant new data the vehicle processes the encoded transmissions protocol-conformant new data using the identified wireless command protocol as if the protocol-conformant new data were sent from the remote controller.

2. The system of claim 1, wherein:
    the system comprises a radio transmitter.

3. The system of claim 2, wherein the system configured to detect the vehicle further comprises using the radio transmitter to send radio transmissions to the vehicle, whereby the vehicle sends radio transmissions.

4. The system of claim 1, wherein the system is further configured to: create a new identifier for the vehicle using at least a portion of the received communication protocol-conformant data, wherein the new identifier uniquely identifies the vehicle.

5. The system of claim 1, wherein the system is further configured to:
    query the vehicle for at least one of information about the vehicle and about vehicle activity, wherein the query is based on the identified command protocol.

6. The system of claim 1, wherein the system is further configured to:
    perform at least one of modifying, removing, and corrupting data stored on the vehicle.

7. The system of claim 1, wherein:
    the protocol-conformant new data sent to the vehicle includes a command to change a control and command channel for the vehicle.

8. The system of claim 1, wherein the system is further configured to:
    determine a distance from a geocoding subsystem to the vehicle;
    determine a current location of the geocoding subsystem;
    determine a bearing from the geocoding subsystem to the vehicle; and
    determine a location of the vehicle based on the distance, the current location, and the bearing.

9. The system of claim 8, wherein:
    the geocoding subsystem is coupled to a processor and includes a 3-axis MEMS gyroscope, at least one target spotting device, and a sub-meter GPS receiver.

10. The system of claim 1, wherein the system is further configured to:
    send transmissions to the vehicle such that communication between the vehicle and the remote controller of the vehicle is disrupted.

11. The system of claim 1, wherein the system is further configured to:
    target the vehicle; and
    launch at least one disabling charge at the vehicle.

12. The system of claim 11, wherein:
    the at least one disabling charge produces one of a low temperature fireball, a graphite cloud, a magnetic powder, and an adhesive coating.

13. The system of claim 1, wherein the determining if the vehicle is a threat comprises using at least one element included in communication protocol-conformant data received from the vehicle, wherein the element is one of vehicle location, vehicle heading, vehicle altitude, vehicle speed, remote controller location, vehicle launch location, and communication protocol type.

14. A method for managing cyber-physical devices, comprising:
    scanning a radio frequency spectrum;
    detecting a vehicle by intercepting at least a portion of communication protocol data carried by a radio frequency transmission, wherein the communication protocol data is in conformance with a wireless communication protocol, wherein the communication protocol data is sent between the vehicle and a remote controller of the vehicle, wherein the communication protocol data is configured to provide information and commands;
    receiving communication protocol-conformant data, wherein the communications protocol-conformant data received includes at least one of data sent from the vehicle and data sent to the vehicle in conformance with the wireless communication protocol;
    using at least a portion of the communication protocol-conformant data, determining if the vehicle is a threat; and
    upon determining that the vehicle is a threat, perform the steps of:
        using at least the received communication protocol-conformant data to identify the wireless command protocol used by the remote controller to remotely control the vehicle;
        determining new data to be sent to the vehicle;
        conforming the new data to the identified wireless command protocol; and
        sending the protocol-conformant new data to the vehicle, whereby upon receiving the protocol-conformant new data the vehicle processes the protocol-conformant new data using the identified wireless command protocol as if the protocol-conformant new data were sent from the remote controller.

15. The method of claim 14, wherein detecting the vehicle further comprises: using a radio transmitter to send radio transmissions to the vehicle, whereby the vehicle sends radio transmissions.

16. The method of claim 14, further comprising:
creating a new identifier for the vehicle using at least a portion of the received communication protocol-conformant data, wherein the new identifier uniquely identifies the vehicle.

17. The method of claim 14, further comprising:
querying the vehicle for at least one of information about the vehicle and about vehicle activity, wherein the query is based on the identified command protocol.

18. The method of claim 14, further comprising:
performing at least one of modifying, removing, and corrupting data stored on the vehicle.

19. The method of claim 14, wherein:
the protocol-conformant new data sent to the vehicle includes a command to change a control and command channel for the vehicle to a specified channel.

20. The method of claim 14, further comprising:
determining a distance from a geocoding subsystem to the vehicle;
determining a current location of the geocoding subsystem;
determining a bearing from the geocoding subsystem to the vehicle; and
determining a location of the vehicle based on the distance, the current location, and the bearing.

21. The method of claim 20, wherein:
the geocoding subsystem is coupled to a processor and includes a 3-axis MEMS gyroscope, at least one target spotting device, and a sub-meter GPS receiver.

22. The method of claim 14, further comprising:
sending transmissions to the vehicle such that communication between the vehicle and at least one controller of the vehicle is disrupted.

23. The method of claim 14, further comprising:
targeting the vehicle; and
launching at least one disabling charge at the vehicle.

24. The method of claim 23, wherein:
the at least one disabling charge produces one of a low temperature fireball, a graphite cloud, a magnetic powder, and an adhesive coating.

\* \* \* \* \*

UNITED STATES PATENT AND TRADEMARK OFFICE
CERTIFICATE OF CORRECTION

PATENT NO. : 11,064,363 B2
APPLICATION NO. : 15/729550
DATED : July 13, 2021
INVENTOR(S) : Fox et al.

Page 1 of 1

It is certified that error appears in the above-identified patent and that said Letters Patent is hereby corrected as shown below:

In the Claims

Claim 1, Column 61, Lines 43-44, delete "encoded transmissions protocol-conformant" and insert --protocol-conformant--.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*